US007133661B2

(12) United States Patent
Hatae et al.

(10) Patent No.: US 7,133,661 B2
(45) Date of Patent: Nov. 7, 2006

(54) EMERGENCY INFORMATION NOTIFYING SYSTEM, AND APPARATUS, METHOD AND MOVING OBJECT UTILIZING THE EMERGENCY INFORMATION NOTIFYING SYSTEM

(75) Inventors: Yasuhiko Hatae, Tokyo (JP); Shuji Usui, Hachioji (JP); Yoshifumi Nakamura, Tokorozawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 725 days.

(21) Appl. No.: 10/076,402

(22) Filed: Feb. 19, 2002

(65) Prior Publication Data

US 2002/0115423 A1 Aug. 22, 2002

(30) Foreign Application Priority Data

Feb. 19, 2001 (JP) .................................... 2001-042537
Jun. 19, 2001 (JP) .................................... 2001-185688

(51) Int. Cl.
*H04Q 7/20* (2006.01)

(52) U.S. Cl. ............................ 455/404.1; 455/404.2; 455/418; 701/35

(58) Field of Classification Search .............. 455/404.1, 455/404.2, 418, 456.1; 701/35
See application file for complete search history.

(56) References Cited

U.S. PATENT DOCUMENTS

| | | | | |
|---|---|---|---|---|
| 5,933,080 A | | 8/1999 | Nojima | |
| 6,002,326 A | * | 12/1999 | Turner | 340/426.1 |
| 6,141,611 A | * | 10/2000 | Mackey et al. | 701/35 |
| 6,246,933 B1 | * | 6/2001 | Bague | 701/35 |
| 6,630,884 B1 | * | 10/2003 | Shanmugham | 340/436 |
| 2001/0005217 A1 | * | 6/2001 | Hamilton et al. | 348/148 |

FOREIGN PATENT DOCUMENTS

| | | |
|---|---|---|
| JP | 8235484 | 9/1996 |
| JP | 8235491 | 9/1996 |
| JP | A-9-297838 | 11/1997 |
| JP | A-11-165661 | 6/1999 |
| JP | A-2000-205890 | 7/2000 |
| JP | A-2001-243579 | 9/2001 |

OTHER PUBLICATIONS

"NTT DoCoMo Technical Journal", pp. 18–22, Oct. 1, 2000.
"ITS Industry and Economy 2001", pp. 54–60, May 1, 2001.

* cited by examiner

*Primary Examiner*—Erika A. Gary
(74) *Attorney, Agent, or Firm*—Mattingly, Stanger, Malur & Brundidge, P.C.

(57) ABSTRACT

An emergency notifying apparatus of a moving object, having: image pick-up devices for picking up a part of the moving object and surroundings thereof, a video recording apparatus for recording signals related to the images taken by the image pick-up devices according to an output from at least one of shock sensors for detecting a shock applied to the moving object, a thermal sensor for detecting a heat or a temperature in a given portion of the moving object, and a manual switch, and a control unit for generating a signal for transmitting the image signals recorded in the recording apparatus to a given station via a radio communication device.

10 Claims, 42 Drawing Sheets

FIG. 41

| POSITION INFORMATION / MOVING DIRECTION | CENTRAL UPPER PORTION | RIGHT-HAND PORTION | LOWER PORTION | LEFT-HAND PORTION |
|---|---|---|---|---|
| NORTH | 9n | 9e | 9s | 9w |
| WEST | 9w | 9n | 9e | 9s |
| SOUTH | 9s | 9w | 9n | 9e |
| EAST | 9e | 9s | 9w | 9n |

EMERGENCY INFORMATION NOTIFYING SYSTEM, AND APPARATUS, METHOD AND MOVING OBJECT UTILIZING THE EMERGENCY INFORMATION NOTIFYING SYSTEM

BACKGROUND OF THE INVENTION

The present invention relates to a notifying system such as, for example, a traffic accident emergency notifying system affecting an operation of a moving object such as an automobile and more particularly to a technology which enables a center station to make more rapid arrangements for sending a rescue party on optimum emergency cars or the like by notifying the center station of an occurrence of a trouble quickly and a content thereof accurately by means of a transmission of image information (video information) even if any trouble occurs to the automobile, for example, in case of an accident disabling a driver of the automobile to make a response.

In addition, the present invention relates to an improvement of a mobile terminal, namely, a mobile phone and a radio communication system for the mobile phone whose communication function is partially limited in case of some trouble which has occurred to the mobile phone, a mobile phone owner, or an automobile on which the mobile phone is mounted, for example, in case of a shock or an impact applied by a collision, a heated condition or a temperature rise caused by a fire, or a decrease of a temperature inside the automobile caused by a decrease of an air temperature or the like.

Referring to FIG. 7, there is shown a typical block configuration of an emergency information notifying system using a conventional technology such as, for example, an automobile. Referring to FIG. 8, there is shown a diagram of assistance in explaining an appearance of the moving object in which the emergency information notifying system is installed, as shown in FIG. 7. In addition, a typical configuration of an emergency information notifying system utilizing the conventional technology is shown in FIG. 9.

In FIG. 7, there is shown a shock sensor 1*f*. This shock sensor 1*f* is mounted at a forefront of the automobile. Furthermore, there are shown an airbag device 2, a Global Positioning System receiver (GPS receiver) 3, and an antenna 3*a* of the Global Positioning System (GPS).

In this condition, if the shock sensor 1*f* detects a shock, the airbag device 2 works as a result of the detection to reduce a shock given to passengers inside the automobile and to protect them with an output of airbag working information 2*a*. On the other hand, the GPS receiver 3 outputs position or location and time information 3*b* of the automobile. These airbag working information 2*a* and the position and time information 3*b* are transmitted to an emergency notification control unit 4 to generate a notification signal 4*a* for notifying an occurrence of an accident involving the detected shock, a time of the automobile at the occurrence of the accident and a position of that. The notification signal 4*a* is supplied to a mobile phone 5 and then the mobile phone 5 automatically transmits the signal, thereby notifying the accident to the center station shown in FIG. 9 such as, for example, an emergency information center 30' by a radio communication or via a communication network 32.

The emergency information center 30' checks the occurrence of the accident on the automobile 10 and its position by means of the received notification signal 4*a* and have a passenger, particularly, a driver explain an accident situation via the mobile phone 5. Then, the center selects emergency cars to be dispatched to an accident site out of patrol cars, ambulance cars, fire engines, tow cars and the like and arranges them on the basis of the checked content or the content of the explanation.

If there is no response from the driver via the mobile phone 5 to the emergency information center 30' by which the center cannot receive the explanation of the accident situation in this condition, it is determined that there has occurred "a serious accident putting a driver in an unconscious state (consciousness disorder) or the like" and a patrol car is dispatched first on the basis of the determination. Then, according to the situation of the accident site checked by the patrol car, emergency cars such as ambulance cars, fire engines, tow cars or the like are dispatched.

Furthermore, without an output of the airbag working information 2*a*, an emergency notification can be made by a driver's manipulation of an emergency notification switch 6, in the same manner as with the output of the airbag working information 2*a*.

An introduction of this system enables an emergency notification without a need for looking for a public telephone or an emergency telephone occurrence of an emergency such as an accident and therefore the emergency information center 30' can locate the position of the accident site quickly even if a passenger is unhinged or the passenger is in an unknown place, thereby enhancing first aid and critical care effects.

In JP-A-9-297838, there is disclosed a technology of, for example, taking photographs of a car in an accident damaged as a result of the accident involving a shock as described above, comparing the image with a previously registered image of the car having no damage, and of calculating an assessed amount of a damage insurance according to the damage on the basis of a difference obtained by the comparison. In this technology, however, the assessed amount of the damage insurance is just calculated based on only a situation of a single car in the accident to be assessed and, for example, in an accident involving a plurality of automobiles, the assessed amount cannot be determined unless a proportion of mutual liabilities is determined and only a single car image indicating the extent of damage is insufficient to calculate the proportion of the liabilities.

In "NTT DoCoMo Technical Journal" (pp. 18–22, issued on Oct. 1, 2000) and "ITS Industry and Economy 2001" (pp. 54–60, issued on May 1, 2001), there is described an example of an emergency notification service at an occurrence of a car accident with a mobile phone. In U.S. Pat. No. 5,933,080, there is described a notification from an automobile to a Mayday center. In JP-A-11-165661, there is disclosed transmitting information on a vehicle driving condition to a base station. In JP-A-2000-205890, there is disclosed notifying a call center of accident occurrence information. In JP-A-2001-243579, there is disclosed notifying a monitoring center of passenger information when an accident occurs. In the notifying systems described in the above literature and publication, there is disclosed a transmission of identification information (character information) related to a driver or a vehicle in an accident to a given station, but there is no disclosure of recording images before and after the accident taken from the car in the accident and transmitting the images to the emergency notification center.

In a serious traffic accident affecting a human life, it is widely known that a time duration between an occurrence of an accident and an ambulance car arrival decides the first aid and critical care effects. Even in the above notifying systems having greatly improved notifying effects in comparison with the conventional notification depending on a public telephone or an emergency telephone, it is sometimes impossible to rapidly and optimally cope with an accident in case of a serious accident disabling the driver of the accident car to make a response.

In addition, in the above conventional technology described in JP-A-9-297838, an assessed amount of a damage insurance is just calculated based on only a situation of a single car in an accident to be assessed and, for example, in an accident involving a plurality of automobiles, an assessed amount can be determined only after a proportion of mutual liabilities is determined and only a single car image indicating the extent of damage is insufficient to calculate the proportion of the liabilities.

SUMMARY OF THE INVENTION

It is a first object of the present invention to enhance first aid and critical care effects in such a serious accident that may disable a driver to respond to a call for asking a question about the accident situation from an emergency information center in a notifying system. Furthermore, it is a second object of the present invention to enable an emergency information center to acquire video and sound records for use in analyzing causes of a traffic accident by grasping a situation before and after an accident occurrence rapidly and accurately.

Still further, it is a third object of the present invention to enable a casualty insurance company to analyze causes of a traffic accident immediately by grasping a situation before and after an accident occurrence rapidly and accurately in the casualty insurance company.

Furthermore, it is a fourth object of the present invention to temporarily limit a credit information transmission function of a mobile phone after an accident occurrence to enhance an accuracy of credit information (creditworthiness) transmitted from the mobile phone.

According to the present invention, there are provided an emergency information notifying apparatus, an accident information analyzing system, an apparatus for supporting a damage insurance service, an apparatus for providing an emergency notification service, a moving object, a method of supporting the damage insurance services related to an accident of the moving object, a method of controlling a mobile device at an accident occurrence, and a notification method in the emergency notifying system.

According to one aspect of the present invention, there is provided an emergency information notifying apparatus of a moving object, comprising: an image pick-up devices for picking up a part of the moving object and surroundings thereof, a video recording apparatus for recording video signals related to a plurality of the frame images picked up (taken) by the image pick-up devices according to an output from at least one of shock sensors for detecting a shock applied to the moving object, a thermal sensor for detecting a heat or a temperature in a given portion of the moving object, and a manual switch, and a control unit for generating a signal for transmitting the video signals recorded in the recording apparatus to a given station via a radio communication device.

According to another aspect of the present invention, there is provided an emergency information notifying system between a moving object and a notification center, wherein the moving object has image pick-up devices for picking up a part of the moving object and surroundings thereof, a video recording apparatus for recording video signals related to the images taken by the image pick-up devices according to an output from at least one of shock sensors for detecting a shock applied to the moving object, a thermal sensor for detecting a heat or a temperature in a given portion of the moving object, and a manual switch, and a control unit for generating a signal for transmitting the video signals recorded in the recording apparatus to the notification center via a radio communication device and wherein the notification center has a transmitter-receiver for an external communication and, if a communication line is established between the notification center and the moving object, it requests a transmission of the video signals from the moving object, receives the video signals, and notifies at least one of a police station, a fire station, a security company (a security guard company), a mobile phone company, a casualty insurance company, and a road service company of an accident occurrence at the moving object via the transmitter-receiver.

According to still another aspect of the present invention, there is provided a system for analyzing information transmitted from a moving object in an accident, comprising: a recording apparatus for recording video information including video signals taken by image pick-up devices mounted on the moving object and information on an operating condition of the moving object, means for reading out video information for each frame image, namely, frame image information from the recording apparatus, means for detecting an outline of an image for the read frame image information, means for calculating a correlation with other frames regarding image areas to be enclosed by the outline according to the obtained outline, and means for determining that an object related to an image area having the maximum size collided with the moving object among image areas if said correlation strength is equal to or higher than a given strength.

According to a further aspect of the present invention, there is provided an apparatus for receiving information recorded by a moving object in an accident via a communication network and processing the information to support a damage insurance service, comprising: a communication device connected to the communication network, a storage device for storing information on a damage insurance contract related to the moving object and information received by the communication device via the communication network with the received information including video information of a part of the moving object and its surroundings picked up from the moving object, a retrieval device for reading out information related to the damage insurance contract of the moving object by retrieving information in the storage device according to a notification of an accident occurrence at the moving object received by the communication device, and a display unit for displaying the information received by the communication device and the information read after the retrieval.

According to a still further aspect of the present invention, there is provided an apparatus for receiving information recorded by a moving object in an accident via a communication network and processing the information to provide an emergency notification service, comprising: a communication device connected to the communication network, a storage device for storing information on a contract with a customer receiving the emergency notification service and information received by the communication device via the communication network with the received information including video information of a part of the moving object and its surroundings picked up from the moving object, a retrieval device for reading out information related to a damage insurance contract of the moving object by retrieving information in the storage device according to a notification of the accident occurrence at the moving object received by the communication device, a display unit for displaying the information received by the communication device and the information read after the retrieval, and a transmitter for transmitting the received information to another organization via the communication network by using the communication device on the basis of the information on the contract or the received information.

According to another aspect of the present invention, there is provided a moving object, comprising: image pick-up devices for picking up a part of the moving object and surroundings thereof, a video recording apparatus for recording video signals related to the images taken by the image pick-up device according to an output from at least one of shock sensors for detecting a shock applied to the moving object, a thermal sensor for detecting a heat or a temperature in a given portion of the moving object, and a manual switch, and a control unit for outputting the video signals recorded in the recording apparatus as radio transmission signals.

According to still another aspect of the present invention, there is provided a method of supporting damage insurance services related to an accident at a moving object in a casualty insurance company by utilizing a notifying system covering a notification center, the moving object, and the casualty insurance company connected with each other via a communication network, comprising the steps of: receiving an accident occurrence notification of the moving object and video information of a part of the moving object and surroundings thereof from the notification center via the communication network, determining whether to notify at least one of a police station, a fire station, a road service company, and a security company of the accident on the basis of the received information, and reading out information related to a damage insurance contract of the moving object by retrieving information in a storage device to perform the damage insurance service transactions of the accident at the moving object on the basis of the received information and the information read after the retrieval.

According to a further aspect of the present invention, there is provided a method of controlling a mobile device at an accident occurrence by utilizing a notifying system covering a notification center, a moving object on which the mobile device is installed, and a communication service company of the mobile device connected with each other via a communication network, comprising the steps of: the communication service company's receiving an accident occurrence notification of the moving object from the notification center via the communication network and transmitting a control signal for inhibiting a read-out operation of a part or all of credit information related to an owner of the mobile device stored in a storage device of the mobile device installed on the moving object in response to the accident occurrence notification.

According to a still further aspect of the present invention, there is provided a notifying method in an emergency notifying system covering a moving object and a notification center connected with each other via a communication network, wherein the moving object images a part of the moving object and surroundings thereof, the picked up video signals are recorded into a recording apparatus according to whether a given level is reached in an output from at least one of shock sensors for detecting a shock applied to the moving object and a thermal sensor for detecting a heat or a temperature in a given portion of the moving object or according to an output of a manual switch and the notification center is called by using the communication device, the notification center establishes a communication line between the communication center and the moving object in response to the call from the moving object and requests a transmission of the signals from the moving object by using the communication device, the moving object transmits the image signals recorded into the recording apparatus to the notification center via the communication device in response to the request of the notification center, and the notification center receives the image signals and notifies at least one of a police station, a fire station, a security company, a mobile phone company, a casualty insurance company, and a road service company of an accident occurrence at the moving object via a transmitter-receiver.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing a typical block configuration of a conventional emergency information notifying system of;

FIG. 41 is a table of assistance in explaining an example of signaler information transmitted from the traffic signal apparatus;

DESCRIPTION OF THE EMBODIMENTS

Figure 1:
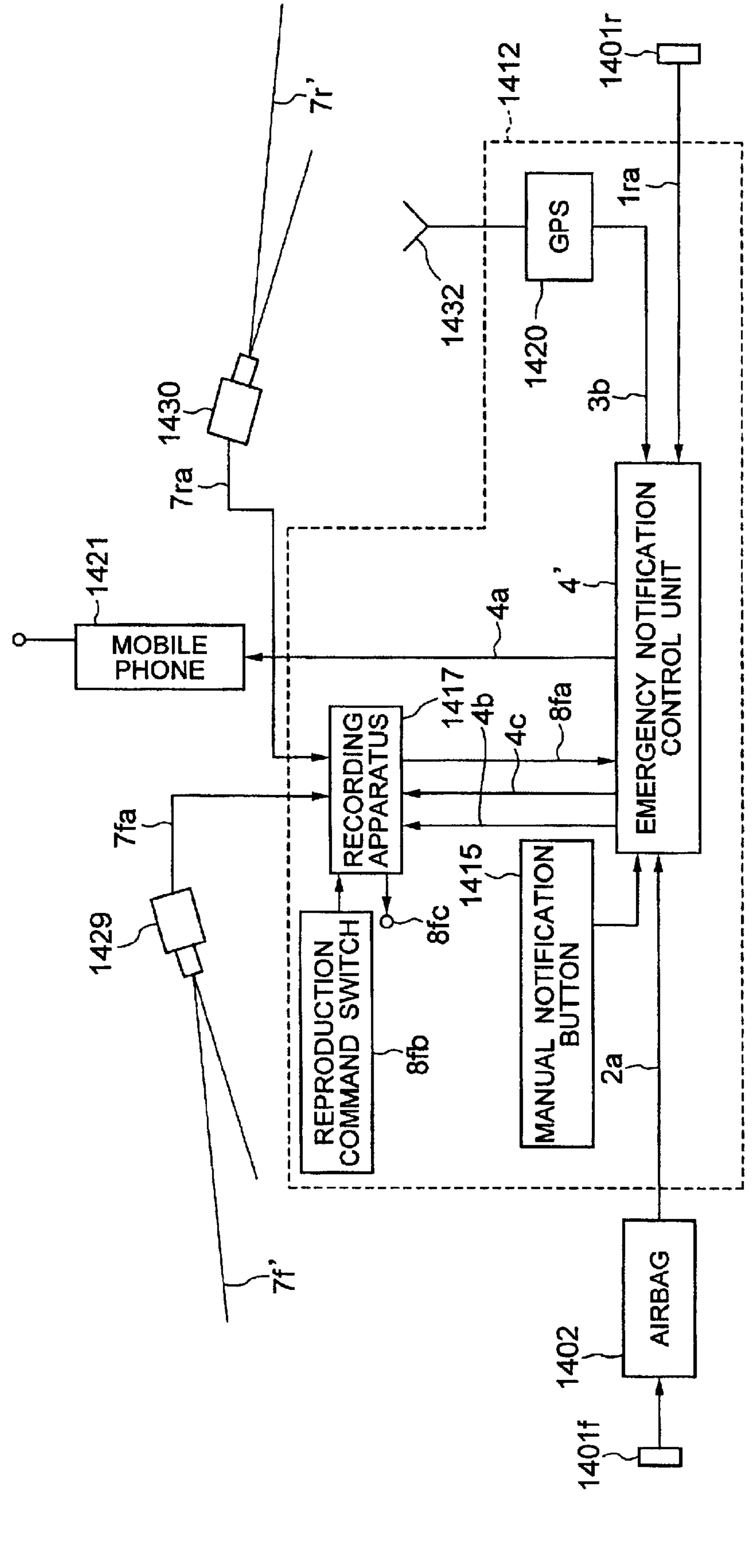
FIG. 1 is a diagram showing a block configuration of a first embodiment of an emergency information notifying system according to the present invention.
Figure 2:
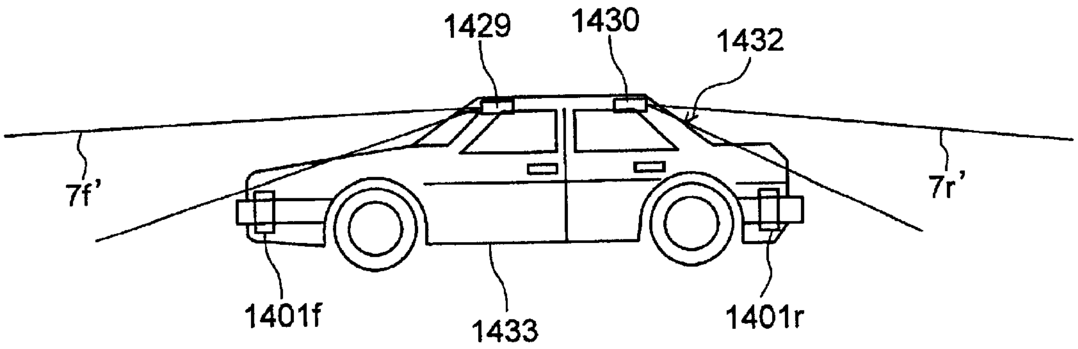
FIG. 2 is a diagram of assistance in explaining an appearance of the moving object having the emergency information notifying system shown in FIG. 1.

The embodiments of the present invention will now be described hereinafter with reference to the accompanying drawings. Referring to FIG. 1, there is shown a diagram of a typical block configuration of an emergency information notifying system installed in a moving object such as, for example, an automobile according to the present invention. Referring to FIG. 2, there is shown a diagram of assistance in explaining an appearance of the automobile shown in FIG. 1. Furthermore, referring to FIG. 10, there is shown a entire configuration of a notifying system according to the present invention.

In FIG. 1, there are shown shock sensors 1401*f* and 1401*r*. The shock sensor 1401*f* is mounted at the front of the automobile. The shock sensor 1401*r* is mounted at the rear of the automobile. There are also shown an airbag device 1402, a GPS receiver 1420, and an antenna 1432 of the GPS receiver 1420.

If the shock sensor 1401*f* detects a shock and its shock strength is equal to or greater than a given value, the airbag device 1402 works to absorb the shock applied to a passenger for protection and outputs airbag working information 2*a*. On the other hand, the GPS receiver 1420 outputs position and time information 3*b* of the automobile. These airbag working information 2*a* and the position and time information 3*b* are transmitted to an emergency notification control unit 4', thereby generating a notification signal 4*a* for notifying an accident occurrence involving the detected shock and an automobile position at the accident occurrence. The notification signal 4*a* is supplied to a mobile phone 1421 and then automatically transmitted by the mobile phone 1421, so as to notify a center station shown in FIG. 1 such as, for example, en emergency information center (notification service center) 30.

The emergency information center 30 checks the accident occurrence at the automobile and its position by means of the received notification signal 4*a* and receives an explanation of an accident situation from a passenger, particularly, a driver via the mobile phone 1421. Then, the center selects emergency cars to be dispatched to the accident site out of patrol cars, ambulance cars, fire engines, tow cars and the like and dispatches them on the basis of the checked and explained contents.

The operation set forth hereinabove is performed also when the shock sensor 1401*r* at the rear portion detects a shock, a shock signal 1*ra* is output as a result of the detection, and it is transmitted to the emergency notification control unit 4'.

An image pick-up device, a television camera (TV camera) is shown at 1429. The TV camera 1429 is mounted at the front of the automobile. Reference numeral 7*f'* indicates a visual field of the TV camera 1429. In addition, another TV camera is shown at 1430. The TV camera 1430 is mounted at the rear side of the automobile. Reference numeral 7*r'* indicates a visual field of the TV camera 1430. The TV cameras can be set in such a picking up direction that a part of the automobile comes in sight at the lower side of the fields 7*f'* and 7*r'*. This makes it possible to check a cause of the shock applied to the automobile from the images of the partially picked up automobile in more detail. Video signals 7*fa* and 7*ra* obtained by picking up the front and rear portions of the automobile by using the TV cameras 1429 and 1430 and sound signals inside and outside the automobile (not shown) are supplied to an iterative recording apparatus 1417 to be recorded.

The iterative recording apparatus 1417 is assumed to be capable of recording given video signals, sound signals, and other signal information according to the present invention for a given period such as, for example, 20 sec. The iterative recording apparatus 1417 can be a nonvolatile memory. After the recording for 20 sec, it is assumed that older records are sequentially deleted and new image data are recorded in the record area from which they are deleted and that this operation is repeated. Receiving a recording stop command signal 4*b* transmitted from the emergency notification control unit 4' on the basis of the airbag working signal 2*a* or the shock signal 1*ra*, the iterative recording apparatus 1417 is assumed to stop the iterative recording operation after a lapse of 10 sec.

This stop operation causes the iterative recording apparatus 1417 to record and retain the video signals and sound signals for a period of time from 10 sec previous to an arrival of the airbag working signal 2*a* and the shock signal 1*ra* at the emergency notification control unit 4' to 10 sec after the arrival.

The iterative recording apparatus 1417 can be strictly sealed to prevent the content of the records obtained by the above operation from being tampered. Furthermore, it can be configured in such a way of disabling new writing once the apparatus receives the recording stop command signal 4*b*. According to this, the circumstantial evidence of the accident is rightly kept and helps to draw up material of investigation of a police station and a insurance company.

Unless a driver responds to an inquiry into the accident situation to the driver via the mobile phone 1421 from the emergency information center 30, for example, after a lapse of 11 sec or longer, the emergency information center 30 determines an occurrence of a serious accident such as the driver's lying unconscious. Then, the emergency information center 30 transmits a signal for instructing an automobile 1433 to reproduce and transmit contents of the records in the iterative recording apparatus 1417. The automobile 1433 receives the command signal by means of the mobile phone 1421, by which the emergency notification control unit 4' transmits a reproduction command signal 4*c* to the iterative recording apparatus 1417, thereby outputting the video and sound signals in the iterative recording apparatus 1417 in response to the command signal 4*c*. The position and time information 3*b* obtained from the GPS receiver 1420 in the emergency notification control unit 4' is superposed on the reproduction signal 8*fa* output from the iterative recording apparatus 1417 and then sent to the mobile phone 1421 so as to be transmitted to the emergency information center 30. The notification can be made without receiving the command signal from the center 30; for example, the reproduction signal 8*fa* output from the iterative recording apparatus 1417 may be automatically transmitted to the emergency information center after a lapse of a given period of time after the shock is detected.

The emergency information center 30 determines a situation of an accident site by using video signals and sound signals which it has received. Then, according to a result of the determination, the center can select optimum emergency cars to be dispatched to the accident site out of patrol cars, ambulance cars, fire engines, tow cars and the like and arrange them.

Unless the airbag working signal 2*a* or the shock signal 1*ra* is output, the driver or others can notify the accident by operating a manual notification button 1415 in the same manner as with the signal output. In addition, the driver or others can send out the reproduction signal 8*fa* of the iterative recording apparatus 1417 to the emergency information center 30 by operating a reproduction command switch 8*fb* in response to a request of the emergency information center 30.

If the iterative recording apparatus 1417 is put in a reproduction state, the video signals from the TV cameras 1429 and 1430 and the sound signals obtained by recording sounds inside and outside the automobile are output from a monitor terminal 8*fc*. Therefore, according to the viewing monitor screens on a monitor (not shown) connected to the terminal the angle of field of the TV cameras 1429 and 1430 can be checked or images can be viewed in the automobile without the mobile phone.

In FIG. 1, the portions enclosed by a dotted line 1412 can be integrated into a single unit or module so that they can be easily mounted on a vehicle. In some cases, however, one or more blocks in the area enclosed by the dotted line 1412 can be composed of a plurality of units.

Figure 4:
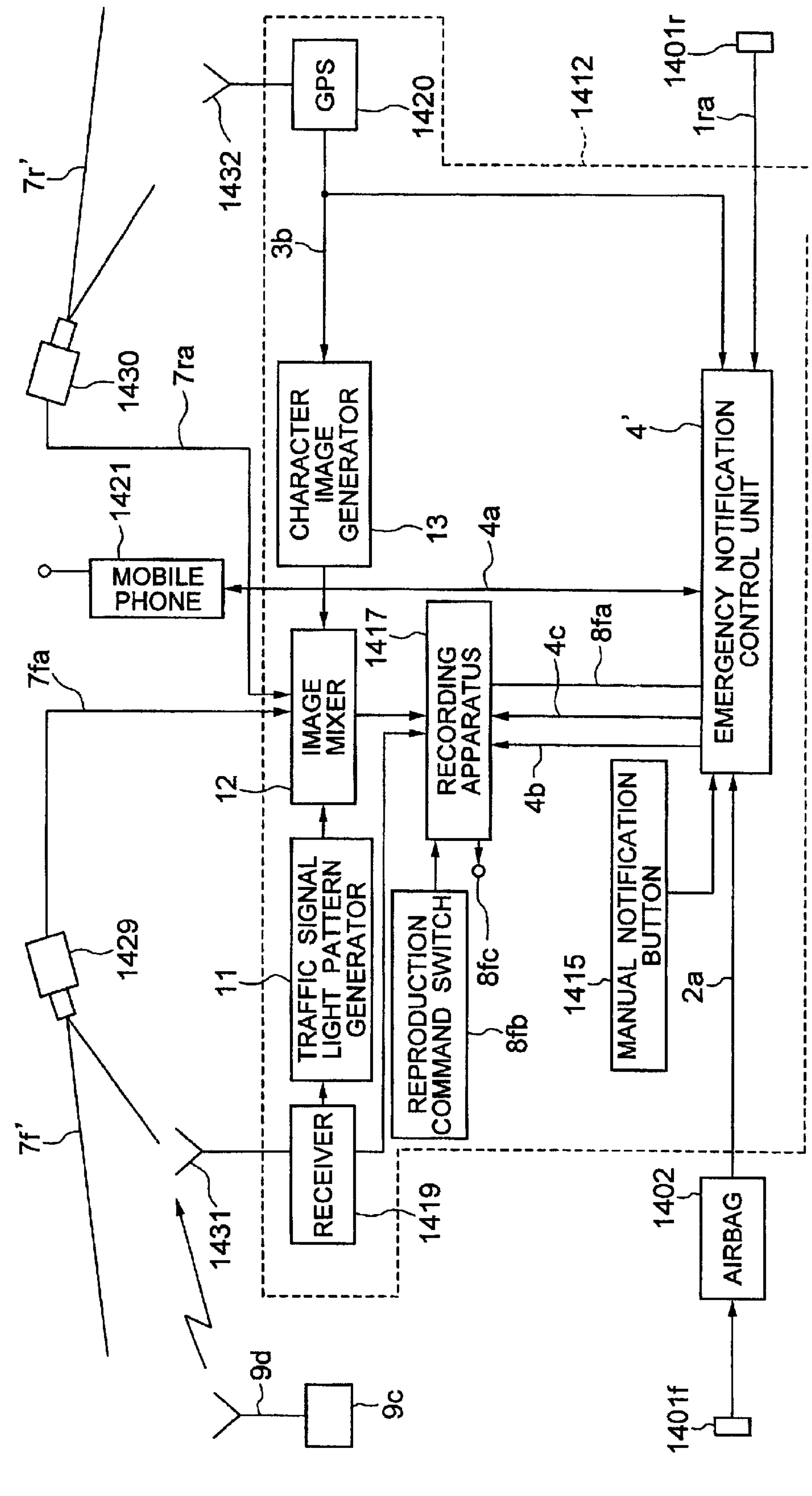
FIG. 4 is a diagram showing a block configuration of a second embodiment of the present invention.
Figure 6A:
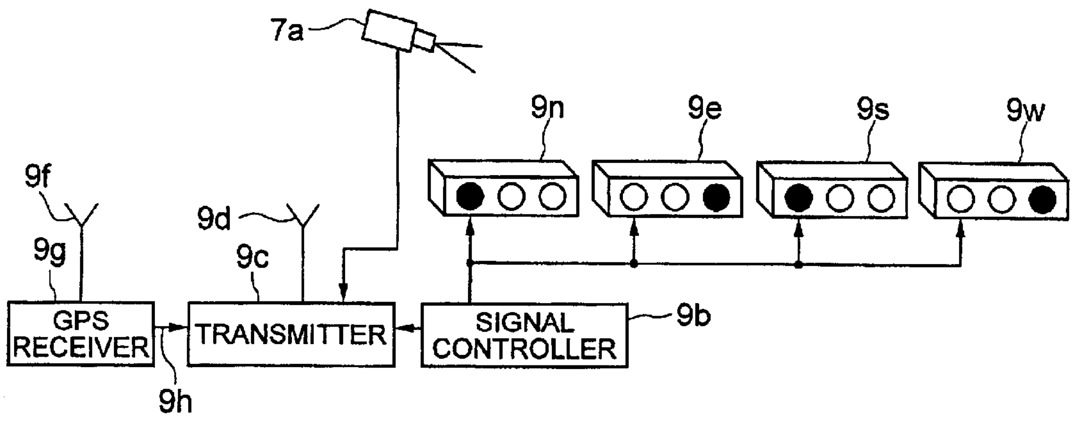
FIGS. 6A and 6B are diagrams showing typical block configurations of a traffic signal apparatus and image pick-up device connected to the traffic signal apparatus in an example of a notifying system according to the present invention.
Figure 6B:
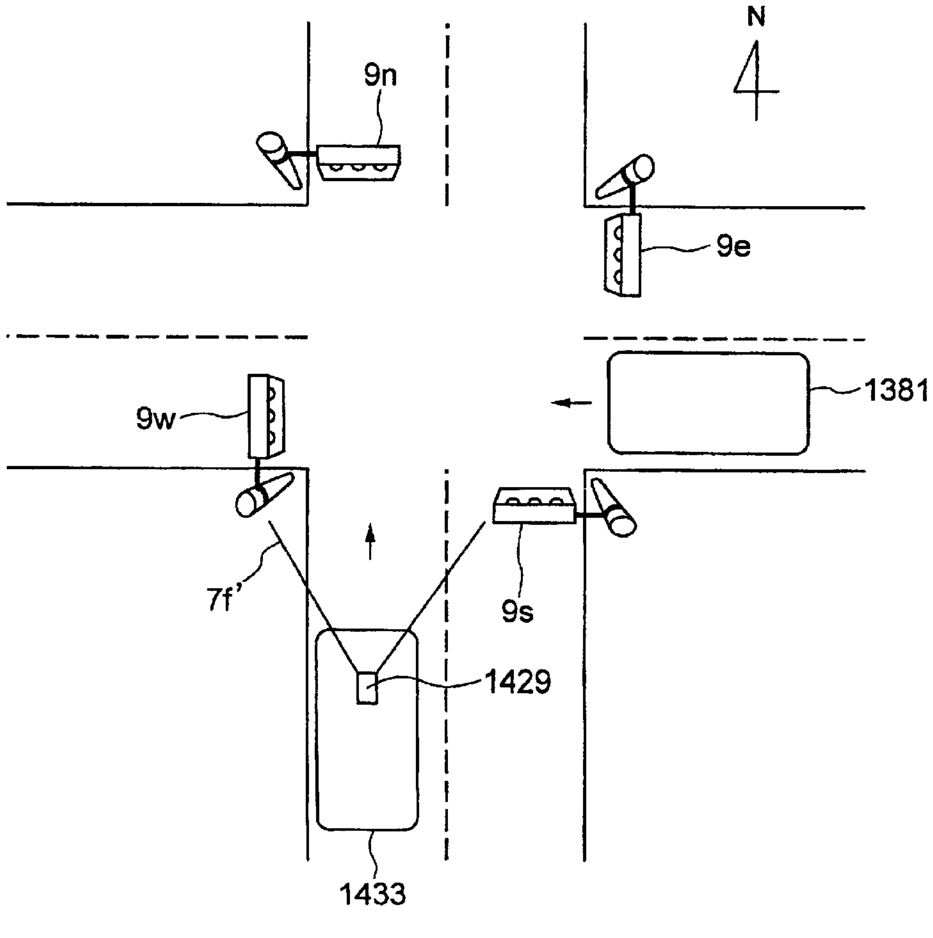
Figure 7:
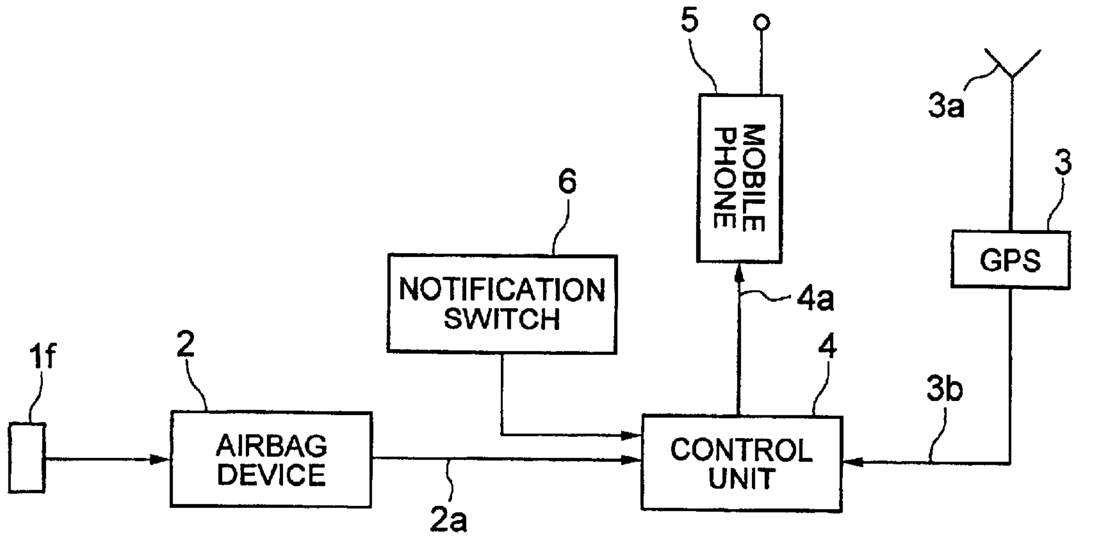
Figure 8:
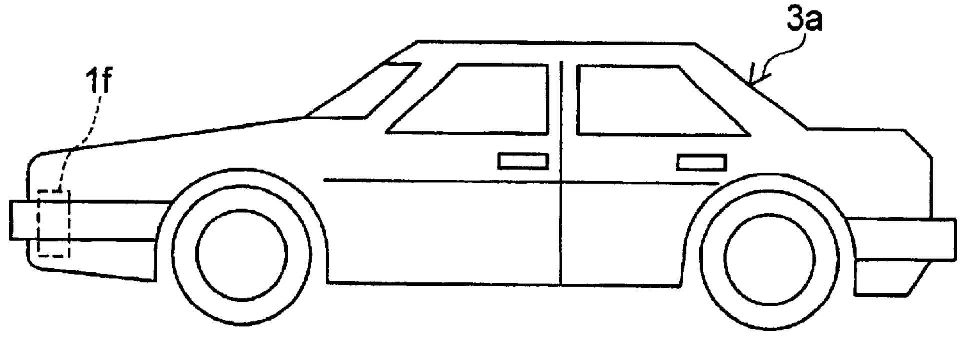
FIG. 8 is a diagram of assistance in explaining an appearance of the moving object emergency information notifying system shown in FIG. 7.
Figure 9:
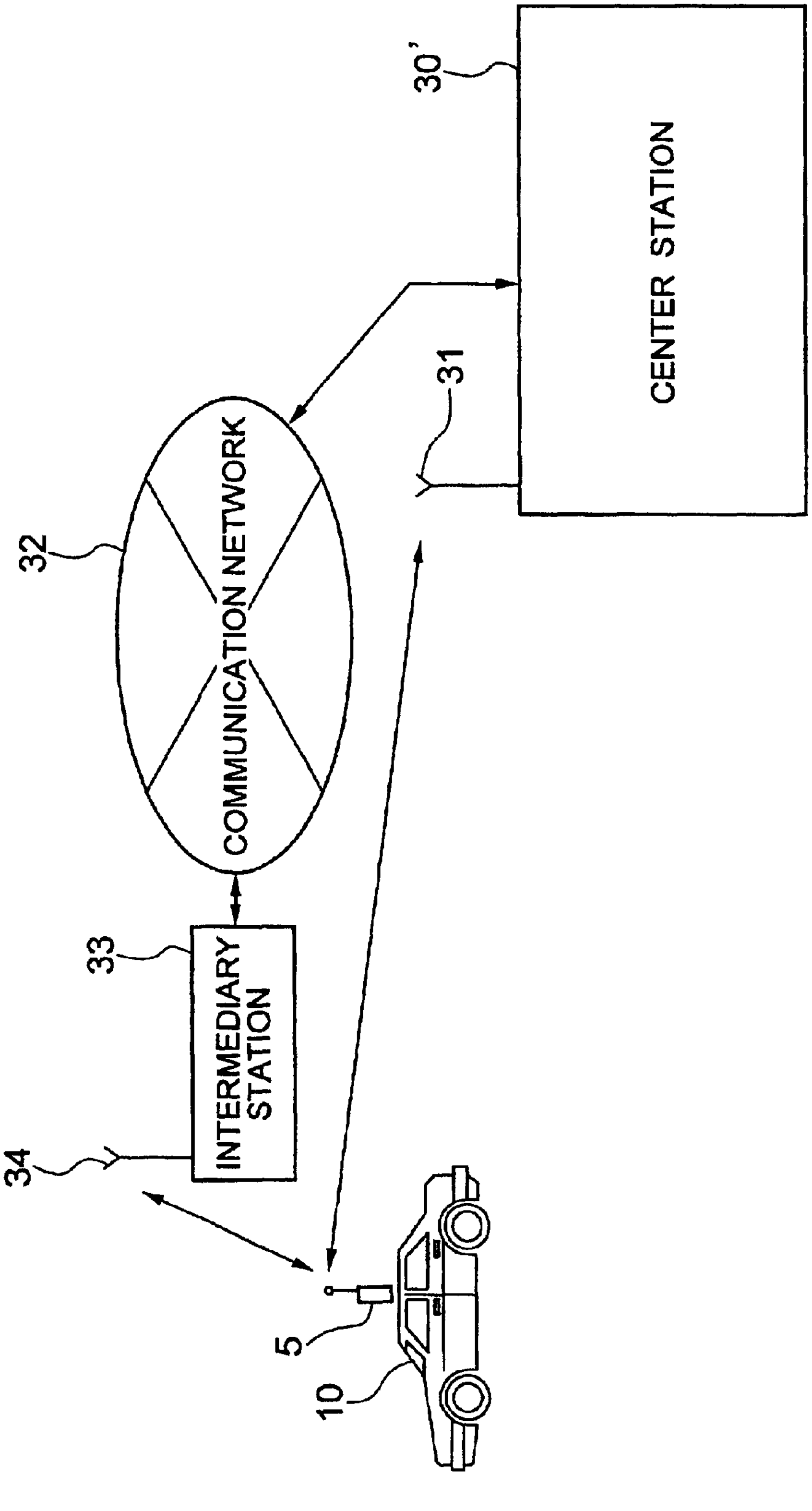
FIG. 9 is a diagram showing a typical configuration of a conventional emergency information notifying system.

Referring to FIG. 4, there is shown a diagram of a block configuration of a second embodiment of the present invention in which the same elements as for other diagrams are given like reference characters. Referring to FIGS. 6A and 6B, there are shown typical block configurations of a traffic signal apparatus and an image pick-up device connected to the traffic signal apparatus in an example of a notifying system according to the present invention.

In FIGS. 6A and 6B, reference characters 9*n*, 9*e*, 9*w*, and 9*s* designate traffic signalers or traffic lights. For automobiles running on respective roads crossing at an intersection while approaching the intersection, the signalers 9*n*, 9*e*, 9*w*, and 9*s* can display signals for braking controls of whether the automobiles stop for a given period of time at a given point on this side of the intersection. Referring to FIG. 6B, there is shown an example of the intersection, an arrangement of the signalers 9*n*, 9*e*, 9*w*, and 9*s* at the intersection, and conditions of two running automobiles 1433 and 1381. In FIG. 6B, it is assumed that the roads extending in the north, south, east and west cross at the intersection in the left-hand traffic. The signalers 9*n*, 9*e*, 9*s*, and 9*w* indicate whether an automobile running in the north, east, south, and west can approach the intersection in this order, respectively. The automobile 1433, which is running in the north, is a moving object according to the present invention shown in FIG. 4. The automobile 1381 is running in the west. The number of signalers is not limited to four, but may be various according to an intersection.

Furthermore, a signal controller 9*b* in FIG. 6A controls all signalers at the intersection, for example. A transmitter 9*c* receives control information related to traffic signal controls of the signalers 9*n*, 9*e*, 9*w*, and 9*s* such as, for example, lighting color information from the signal controller 9*b* and wirelessly transmits it to the surrounding of the intersection. There is shown a transmitting antenna 9*d*. The traffic signal apparatus comprises these signalers 9*n*, 9*e*, 9*w* and 9*s*, the signal controller 9*b*, the transmitter 9*c*, and the transmitting antenna 9*d*.

Furthermore, in FIG. 6A, there is shown an image pick-up device 7*a*. This image pick-up device 7*a* picks up a situation of a range as bird's-eye view in which an automobile may brake in response to the indication of a signal of the traffic signal apparatus, for example, a given range from the above given point on this side of the intersection to the inside thereof. Video signals obtained by picking up with the image pick-up device 7*a* are input to the transmitter 9*c* in the example of this diagram and then wirelessly transmitted to the surrounding of the intersection in the same manner as for the above lighting color information.

Further, the video signal of bird's-eye view showing the vehicles and traffic situation in the intersection picked up by the image pick-up device 7*a* may be transmitted in addition to the time signal of date/hour/minute/second and the positional information 9*h* of the intersection received by the GPS antenna 9*f* and the GPS receiver 9*g* via the transmitter 9*c* and the transmission antenna 9*d*.

The traffic signal lighting information obtained from the signal controller 9*b* and the intersection positional information obtained from the GPS receiver 9*f* may be transmitted as data from the transmitter 9*c* and the transmission antenna 9*d*. Such information data may be received and utilized at the receiver side so that the information data is processed in patterning by a pattern generator (not shown), a character image generator not shown) and a mixer (not shown) in a same manner as the embodiment of FIG. 4 described below, and the patterned signal may be superimposed on the image of bird's-eye view of the intersection and transmitted it as same as the embodiment of FIG. 3.

It should be noted that in the second embodiment shown in FIG. 4 has a receiver 1419, a receiving antenna 1431, a traffic signal light pattern generator 11, an image mixer 12, and a character image generator 13 besides the block configuration shown in the first embodiment. This receiver 1419 receives transmission signals including the signal lighting color information or video signals obtained by the image pick-up device 7*a* from the transmitter 9*c*. Among the signals received by the receiver 1419, a lighting color information signal is input to the traffic signal light pattern generator 11, where a traffic signal light pattern signal is formed, and further there is obtained a signal generated by superposing the traffic signal light pattern signal on the video signal from the front TV camera 1429 at a position around an area where the related signaler 9*n* is picked up by means of the image mixer 12, and then it is recorded into the iterative recording apparatus 1417. On the other hand, the video signal received by the receiver 1419 is associated with a video signal from the TV camera 1429 and recorded to the iterative recording apparatus 1417.

Furthermore, in FIG. 4, the character image generator 13 generates character pattern signals representing the position and time information 3*b* obtained from the GPS receiver 1420 on the basis thereof. Then, the character pattern signal is superposed on a blank portion of the video signal from the front TV camera 1429 by the image mixer 12. The superposed video signal is recorded to the iterative recording apparatus 1417. It is also possible to execute the superposition of the traffic signal light pattern signal and that of the character pattern signal independently of each other.

Figure 3:
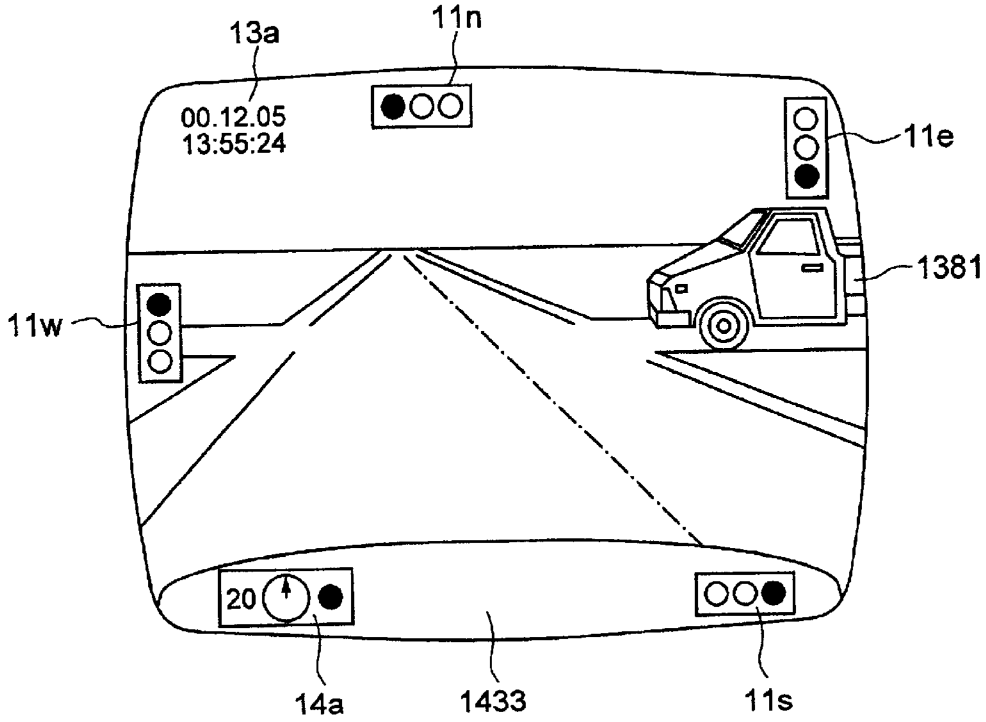
FIG. 3 is a diagram showing an example of an image display based on video signals according to the present invention.

At this point, FIG. 3 shows an example of an image display with the video signals after the above superposition. In this diagram, for example, there is shown an image of a vision in front of the automobile 1433 picked up from the TV camera 1429 mounted on the automobile 1433 with a part thereof taken when the automobile 1433 is to come to the intersection on a left-hand traffic road system. Furthermore, another automobile 1381 is entering the intersection area from the right-hand side of the image, ignoring the red light (a stop command signal at the signal 9*w*).

Figure 10:
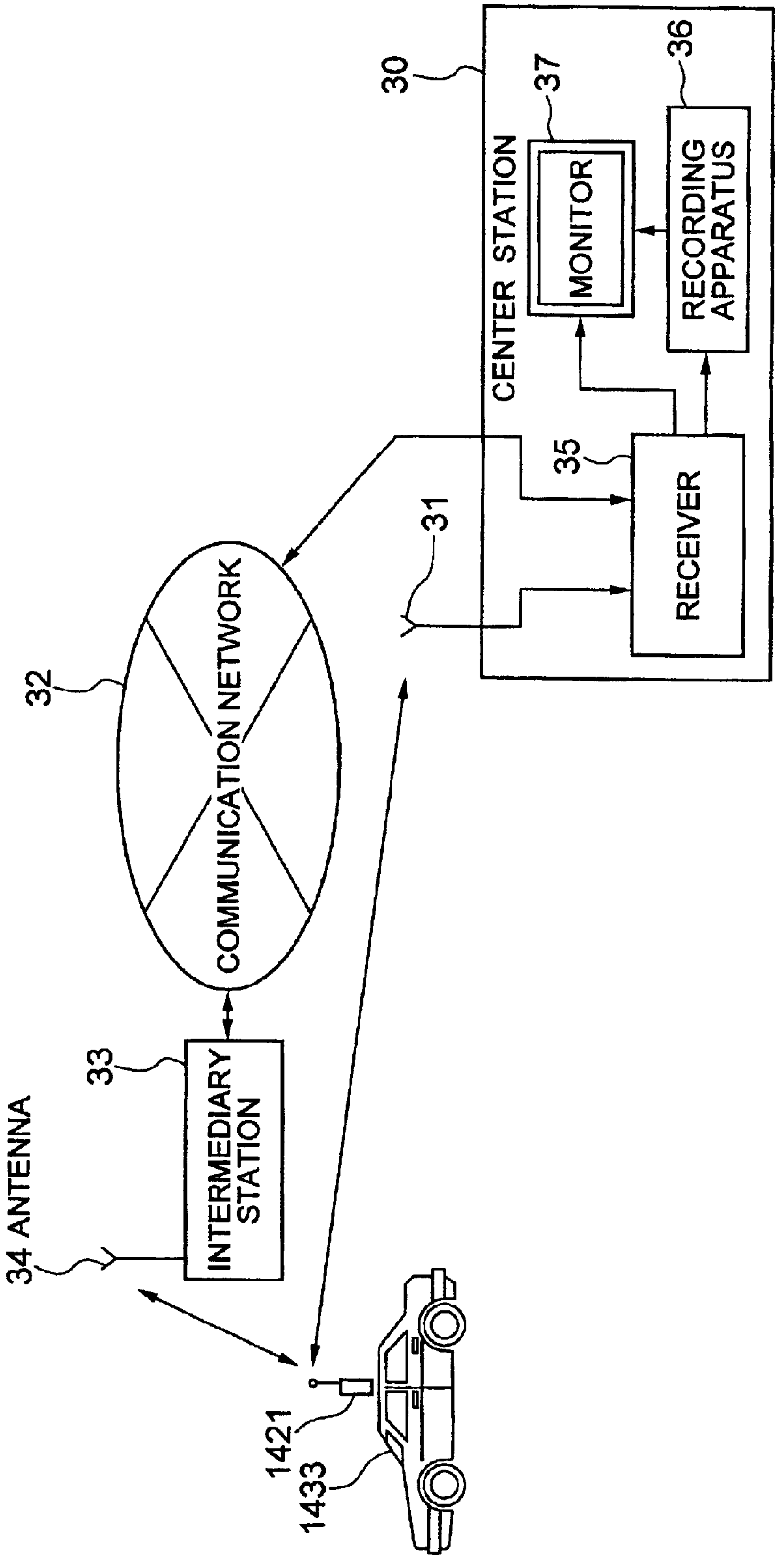
FIG. 10 is a diagram showing a configuration of an emergency information notifying system according to the present invention.

Furthermore, reference characters 11*n*, 1*w*, 11*s* and lie designate lighting pattern indications of the signalers 9*n*, 9*w*, 9*s* and 9*e* for instructing the automobiles 1433, 1381 and others running toward the intersection on the roads in the four directions led to the intersection to brake. In addition, there is shown an example of a time indication 13*a* displayed by means of the character pattern signals generated by the character image generator 13. At this point, these lighting pattern indications are displayed by means of traffic signal light pattern signals and the traffic signal light pattern signals are generated by the above traffic signal light pattern generator 11 and superposed on the video signals from the TV camera 1429 by the image mixer 12. In this example, the light pattern indication 11*n* is related to the signaler 9*n* for instructing the automobile 1433 to brake. This light pattern indication 11*n* indicates an example of pattern indicating permission for the automobile 1433 to enter the intersection at the picking up timing in this image. On the other hand, the lighting pattern indication 11*w* is related to the signaler 9*w* for instructing the vehicle 1381 to brake. Additionally, this lighting pattern indication 11*w* indicates inhibition for the vehicle 1381 to enter the intersection at the picking up timing in this image. Accordingly, if the vehicle 1433 collides with the automobile 1381 after this image is taken, which results in generating a shock, and video signals for displaying the image shown in FIG. 3 are stored in the iterative recording apparatus 1417 of the automobile 1433, the stored video signals are transmitted to the center 30 as shown in FIG. 10, and they are reproduced and displayed on a monitor 37 installed at the center 30, by which it is easily checked that a cause of the collision is a violation of the forbidden approach to the intersection of the automobile 1381. The cause of the collision may be easily determined from the image of FIG. 3 in combination with the image of bird's-eye view of the intersection associated with the time information.

Figure 40:
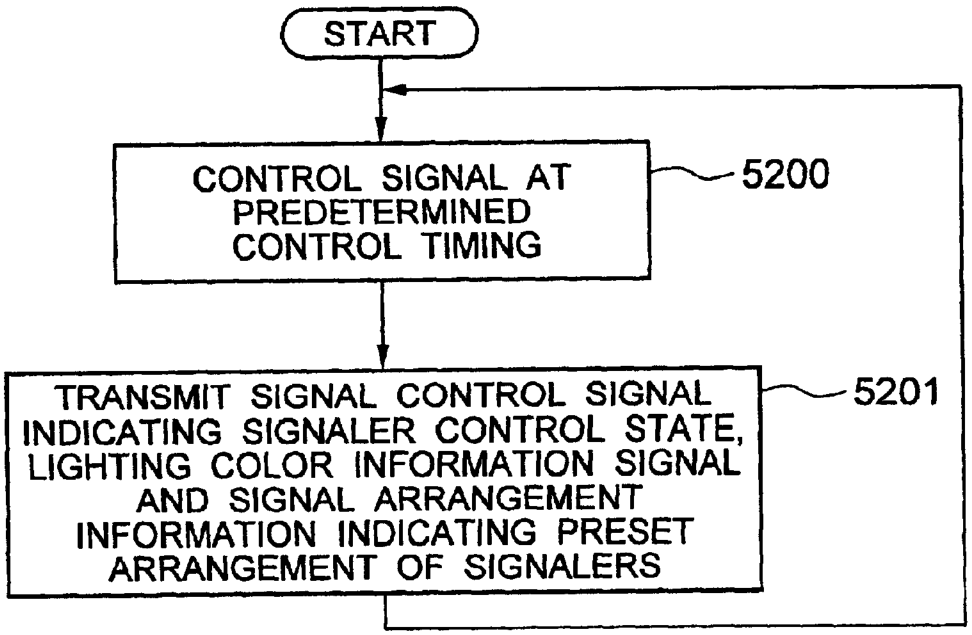
FIG. 40 is an operation flowchart of a traffic signal apparatus.

Subsequently, an example of operation of the traffic signal apparatus will be described below by using FIG. 40. In step 5200, the respective signalers are controlled regarding their lighting operations according to given control timings. Next, in step 5201, there are transmitted a lighting color information signal which is a signaler control signal indicating a control state of the signaler and a signaler information signal indicating an arrangement of the signalers installed at the intersection. Then, these steps are iterated.

This signaler information signal includes information indicating the number of all installed signalers arranged at the intersection and a moving direction of a vehicle which should follow each signaler of the signaler as shown in FIG. 41. Furthermore, in an example of the signaler information in FIG. 41, there is superposed position information for use in superposing a traffic signal light pattern image corresponding to each signaler on the image screen taken by the front camera 1429 of the automobile 1433. It is a signaler 9*n* that instructs the automobile 1433 running in the north direction shown in FIG. 6B. Therefore, the traffic signal light pattern image 11*n* (FIG. 3) of the signaler 9*n* is displayed according to the signaler information signal in the central upper portion of the image screen (FIG. 3). Further, the traffic signal light pattern image 11*e* of the signaler 9*e* is displayed in the right hand of the image screen, the traffic signal light pattern image 11*s* of the signaler 9*s* is displayed at the bottom of the image screen, and the traffic signal light pattern image 11*w* of the signaler 9*w* is displayed in the left hand of the image screen.

Figure 42:
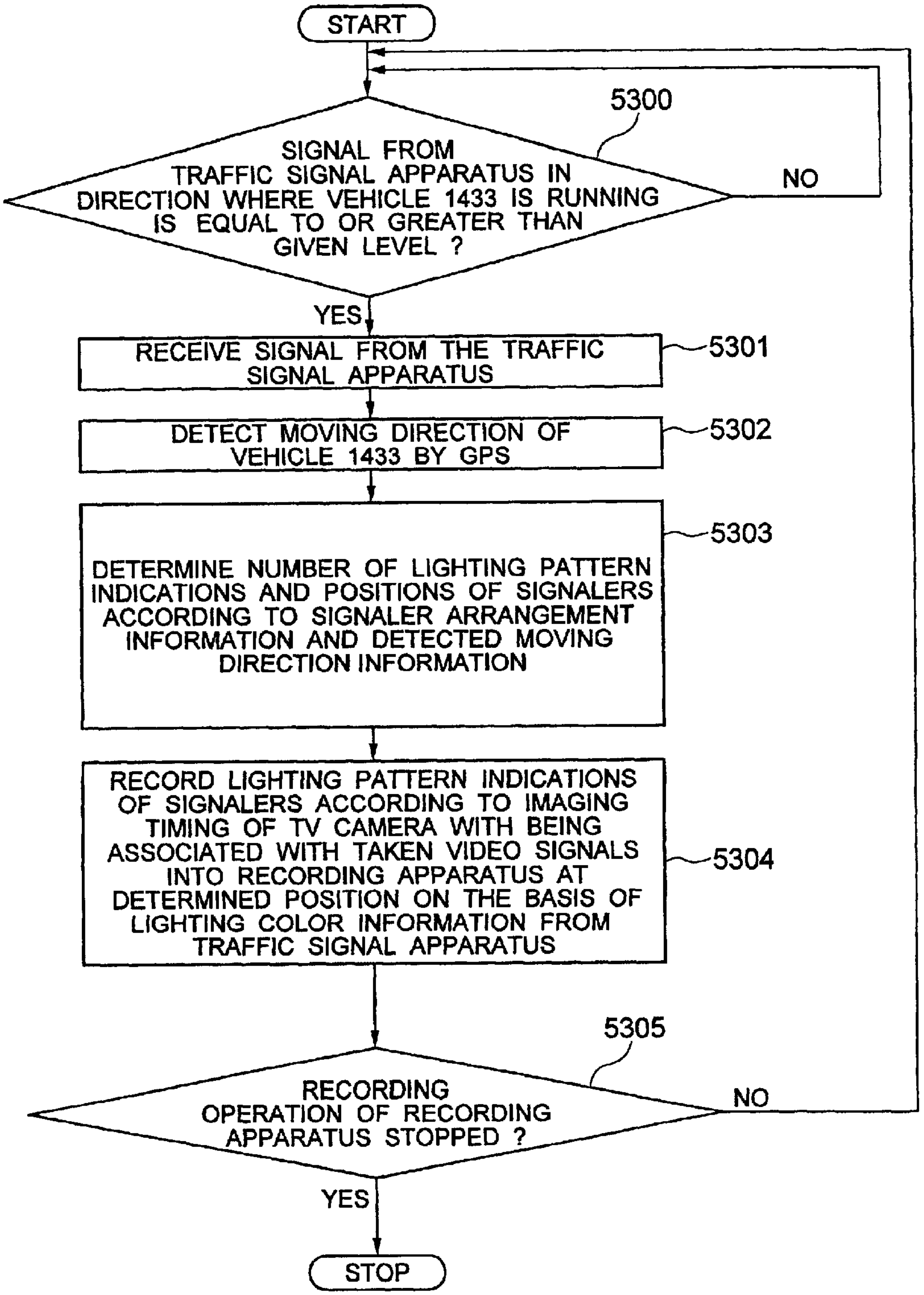
FIG. 42 is an operation flowchart for an automobile to receive and process a signaler information signal.

Next, an example of operation of the object vehicle, the automobile 1433 will be described below by using FIG. 42. In step 5300, it is determined whether a signal from the traffic signal apparatus shown in FIG. 6A in the direction of the running automobile 1433 is equal to or greater than a given level; if so, it is determined that the automobile approaches the intersection and then the control proceeds to step 5301. If not, the operation in the step 5300 is performed again. In the step 5301, the automobile receives the lighting color information signal and the signaler information signal, which are signals from the traffic signal apparatus. Subsequently, in step 5302, the GPS receiver 1420 detects the moving direction of the automobile 1433 (the north in the example shown in FIG. 6B). Next, in step 5303, the number of lighting pattern indications and their positions of the signalers, which indicate the content of the control for the signalers indicated with being adjusted to the images taken by the TV camera 1429 are determined according to signaler arrangement information and the moving direction information detected in the step 5302 in the signaler information from the traffic signal apparatus. Furthermore, in step 5304, lighting pattern indications of the signalers according to the picking up timings of the TV camera 1429 are associated with the taken video signals and recorded in the iterative recording apparatus 1417 at the determined position on the basis of the lighting color information signal from the traffic signal apparatus. Then, in step 5305, it is determined whether the recording operation of the iterative recording apparatus 1417 has been stopped. If not, the control returns to the step 5300; if so, this processing is terminated.

In the above-mentioned example operation, the steps 5301 and the proceeding steps are executed when it is determined that the signal from the traffic signal apparatus is equal or greater than the predetermined level in the step 5300. However, the step 5300 may be replaced by the step wherein a distance between the automobile 1433 and the intersection is determined based on the data including positional information of the intersection obtained from the GPS receiver 9*f* via the transmitter 9*c* and the transmission antenna 9*d* and positional information of the automobile obtained from the GPS receiver 1420, and the next step 5301 is proceeded when the determined distance is shorter than a predetermined length.

In FIG. 3, if there is a considerably long distance from the TV camera 1429 to the intersection, the signaler 9*n* in the forward direction is picked up in the visual field of the TV camera 1429 and the lighting color of the signal of the signaler can be checked thereby. If the automobile approaches the intersection further, however, the signaler 9*n* ahead of the automobile becomes outside the visual field of the TV camera 1429. Therefore, according to the present invention, the image of the TV camera 1429 is associated with the signal lighting color information immediately before the accident at the superposition so that the situation can be checked, by which the lighting colors of the signals can be checked very easily and more reliably.

Furthermore, by using the TV camera 1430, the lighting colors can be checked in the same manner as for the above in such a case that a shock is applied to the rear portion of the automobile.

According to this second embodiment, the iterative recording apparatus 1417 records and retains the video and sound signals for a period from a certain timing previous to an arrival of the airbag working signal 2*a* and the shock signal 1*ra* such as, for example, 10 sec previous to the arrival to a certain timing thereafter such as, for example, 10 sec after the arrival together with the ever-changing lighting color information of the signalers, in addition to the action and effect of the above first embodiment. Therefore, the retained video signals enable more accurate analysis of causes of traffic accidents. Furthermore, if a moving object is provided with a warning device for giving a warning in advance to its wrong approach to an intersection caused by missing the red light utilizing the received signal lighting color information, the warning device can give the driver a warning for a purpose of preventing an accident or it is possible to prevent an accident by operating a brake of the automobile together with the warning to prevent the accident.

Figure 5:
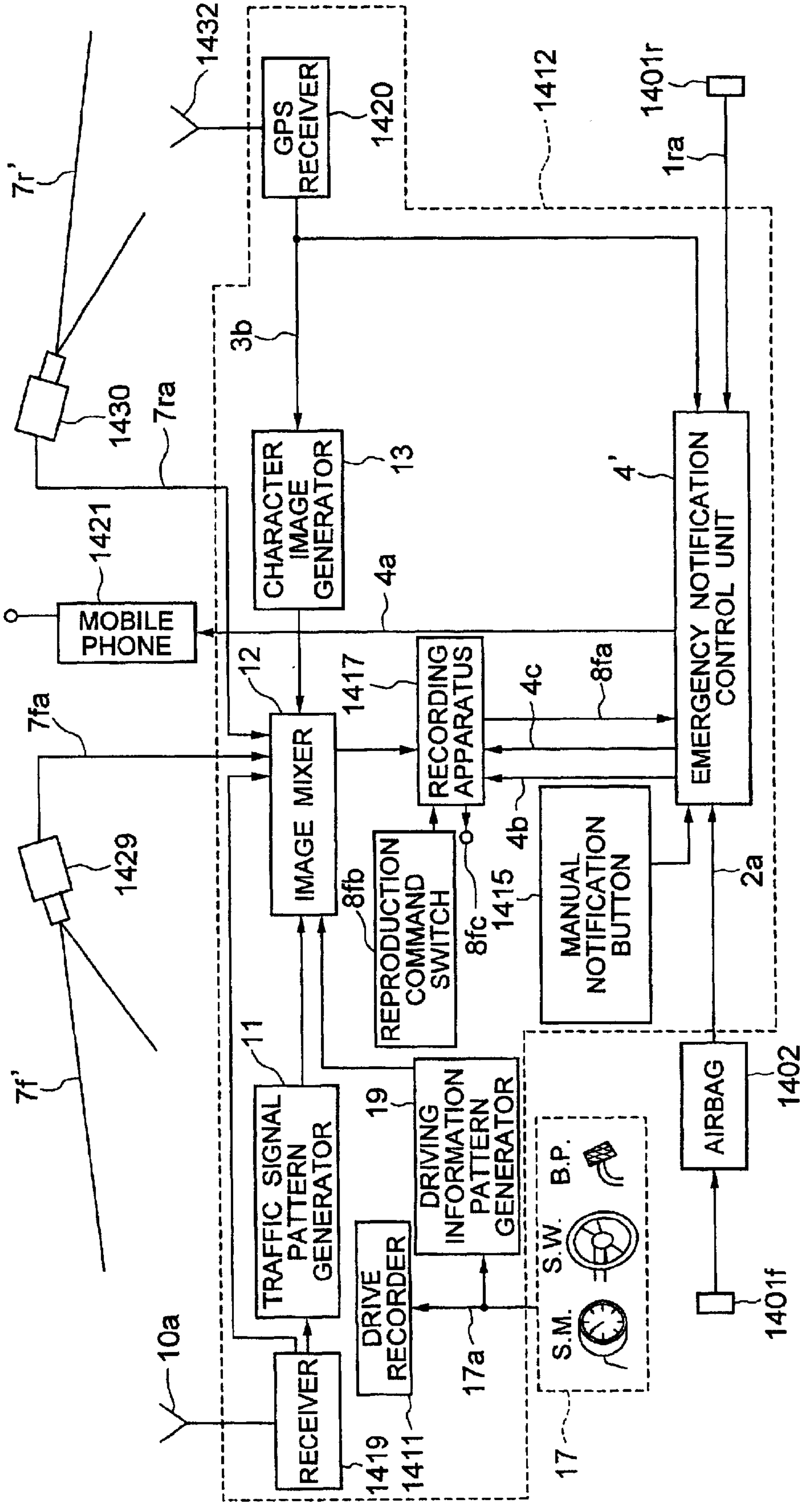
FIG. 5 is a diagram showing a block configuration of a third embodiment of the present invention.

Referring to FIG. 5, there is shown a diagram of a block configuration of a third embodiment according to the present invention, in which the same elements as for the diagram shown in FIG. 1 are given like reference characters. In this diagram, driving equipments 17 indicating an automobile running condition and including a speed meter, a steering wheel, and a brake pedal of the automobile have a device for monitoring these conditions or situations, in other words, the running condition and braking operating condition, and various monitoring information (the running condition and braking operating condition monitoring information) obtained from the driving equipment 17 such as, for example, a vehicle speed, a steering angle, a stoplight lighting or other driving information 17*a* is supplied to a drive recorder 1411 and used for a driving management. In addition to those, vehicle speed, steering angle, and stoplight lighting pattern signals are generated by a driving information pattern generator 19 according to the driving information 17*a* and then superposed on a blank area of the image of the front TV camera 1429 by the image mixer 12. After that, video signals for displaying the vehicle speed, the steering angle, and the stoplight lighting patterns in the blank area with the superposition are supplied and recorded to the iterative recording apparatus 1417.

Furthermore, the above automobile 1433 can be provided with a sensor device for checking a situation of a passenger on the automobile to record the situation in the iterative recording apparatus 1417 according to an output result of the sensor device. The sensor device can be, for example, an image pick-up device for picking up the passenger or the above mobile phone can be used instead.

As set forth hereinabove, with recording video signals into the iterative recording apparatus 1417, the recorded video signals can be transmitted to the center 30.

A vehicle speed, steering angle, and stoplight lighting pattern 14*a* shown in FIG. 3 is a pattern display made by the superposed video signal and it can be associated with the image of the TV camera while checking the signal lighting color information immediately before the accident or automobile driving information.

The present invention is not limited to the above description, but various constitutions can be added within the scope of the present invention; for example, it is possible to acquire the position information and the time information singly or in combination from positioning means other than the Global positioning system (GPS), to integrate the iterative recording apparatus, the reproduction command switch, and the monitor terminal into a TV camera or an emergency notification control unit or to divide them so as to be put into containers, and to use the front TV camera for detecting a white line on roads or for measuring a distance from an automobile ahead. Otherwise, the rear TV camera can be used for checking the backward at garaging or parking. Furthermore, a signal lighting color information receiver 1419 can be used for warning to missing a signal light. In addition, the position and time information, the signal lighting color information, and the driving information can be supplied and recorded to the iterative recording apparatus in the form of data without any conversion to patterns nor characters.

The moving object can be an object not only ground vehicles, but also vehicles moving on the water or in the air. Additionally, even if various types of communication equipment are used as the radio transmission equipment instead of the mobile wireless telephone, it is possible to realize the notifying system according to the present invention.

Furthermore, according to the present invention, the video signal 7*fa* and the video signal 7*ra* can be recorded and retained according to a detection result of one of the shock sensor 1401*f* and the shock sensor 1401*r* and it is also possible to operate them independently of each other in such a way that the video signal 7*fa* is recorded and retained according to a detection result of the shock sensor 1401*f* and the video signal 7*ra* is recorded and retained according to a detection result of the shock sensor 1401*r*.

Still further, the airbag device 1402 can be for use in protecting not only passengers, but also goods on the automobile.

Figure 11:
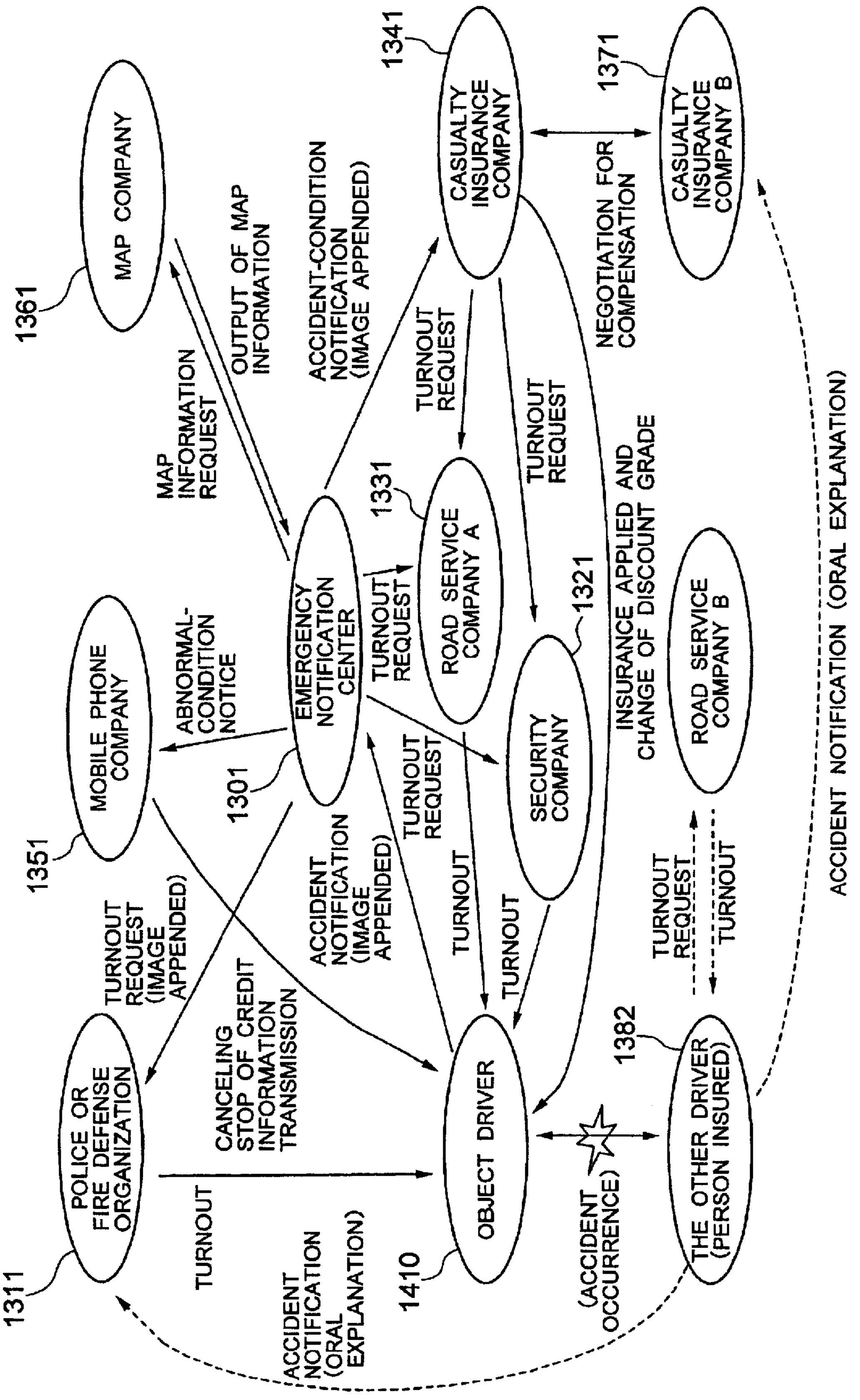
FIG. 11 is a schematic explanatory diagram of assistance in schematizing and explaining association between respective persons and organizations concerned in an emergency system applied with the present invention.

Furthermore, the embodiment of the present invention will be described below in further detail by referring to diagrams. In FIGS. 11 to 39, the same reference numerals as in FIGS. 1 to 10 designate basically identical elements. Referring to FIG. 11, there is shown a schematic explanatory diagram of assistance in schematizing and explaining relations between respective persons and organizations concerned in an emergency system applied with the present invention. The emergency notification center 1301 contracts with a person, a corporation, or an organization to provide an emergency settlement service if a specified person or a specified automobile (moving object) met an accident. Identification information about the person or automobile to get the service specified in the contract is registered in the emergency notification center 1301. The identification information includes a name, an address, a driver's license number, a mobile phone number, a vehicle registration number or other identification codes. In the embodiment described by referring to FIG. 11 to FIG. 13, an automobile driver 1410 and an automobile 1433 driven by the driver 1410 are objects of the emergency settlement service at the accident from the emergency notification center 1301. Hereinafter, the driver 1410 is referred to as object driver and the vehicle 1433 driven by the object driver 1410 is referred to as object vehicle. The object driver 1410 is assumed to have contracted with a casualty insurance company A1341 for a damage insurance service regarding an accident the driver met with in driving the automobile 1433. It is assumed that an automobile 1381 of the other party causing a collision with the object vehicle 1433 and its driver 1382 are not registered as objects of the emergency settlement service for an accident. Hereinafter the automobile 1381 and the driver 1382 are referred to as the other vehicle and the other driver. In an example shown in this diagram, there are illustrated various mutual relations generated by an accident between the vehicle 1433 of the object driver 1410 and the vehicle 1381 of the other driver 1382. The "object driver" is a person to get the notification service of the emergency notification center and in this example the driver is also a person insured of an automobile insurance. In other words, the object driver notifies the emergency notification center (notification servicing center) 1301 of an occurrence of this accident. The emergency notification center 1301 transmits position information of the vehicle in the accident received at the notification to a map company (a map information company) 1361 and then the map company 1361 transmits map information according to the position information to the emergency notification center 1301. The emergency notification center 1301 checks a place-name and an address of the accident site on the basis of the map information and then, if necessary, requests one or both of a police organization and a fire defense organization corresponding to the place-name and the address to turn out.

In addition, the emergency notification center 1301 notifies the casualty insurance company A 1341 making an insurance contract with the object driver 1410 of the occurrence of the accident. The casualty insurance company A 1341 requests a road service company A 1331 and a security company 1321 to turn out to the accident site. The emergency notification center 1301 sometimes makes these requests, if necessary.

Furthermore, the emergency notification center 1301 outputs an abnormal-condition notice to a mobile phone company 1351 in response to the accident occurrence notification from the object driver 1410.

With the above turnout requests and the abnormal-condition notice, the police or fire defense organization 1311 sends emergency cars or helicopters for the object driver 1410 and the road service company A 1331 and the security company 1321 also send guards and tow cars.

The mobile phone company 1351 which has received the abnormal-condition notice limits the transmission function of the credit information recorded in a memory of the mobile phone used by the object driver 1410. Therefore, the mobile phone company 1351 transmits a control signal for limiting the function to the mobile phone, thereby stopping the credit information transmission of the mobile phone. The "credit information" includes a personal password number and a credit card number used for services an owner of a mobile phone gets with the mobile phone such as, for example, Internet banking or Internet shopping. These numbers are stored in the memory of the mobile phone and there is a need for keeping the security to prevent others from reading them in any case.

The casualty insurance company A 1341 performs insurance service transactions regarding the accident of the accident occurrence notification. For example, the company negotiates for compensation with a casualty insurance company B 1371 contracting with the other driver 1382 and then contacts the object driver 1410 for an insurance application and notifies the object driver of a change in a discount grade of an insurance fee related to this accident.

Figure 12:
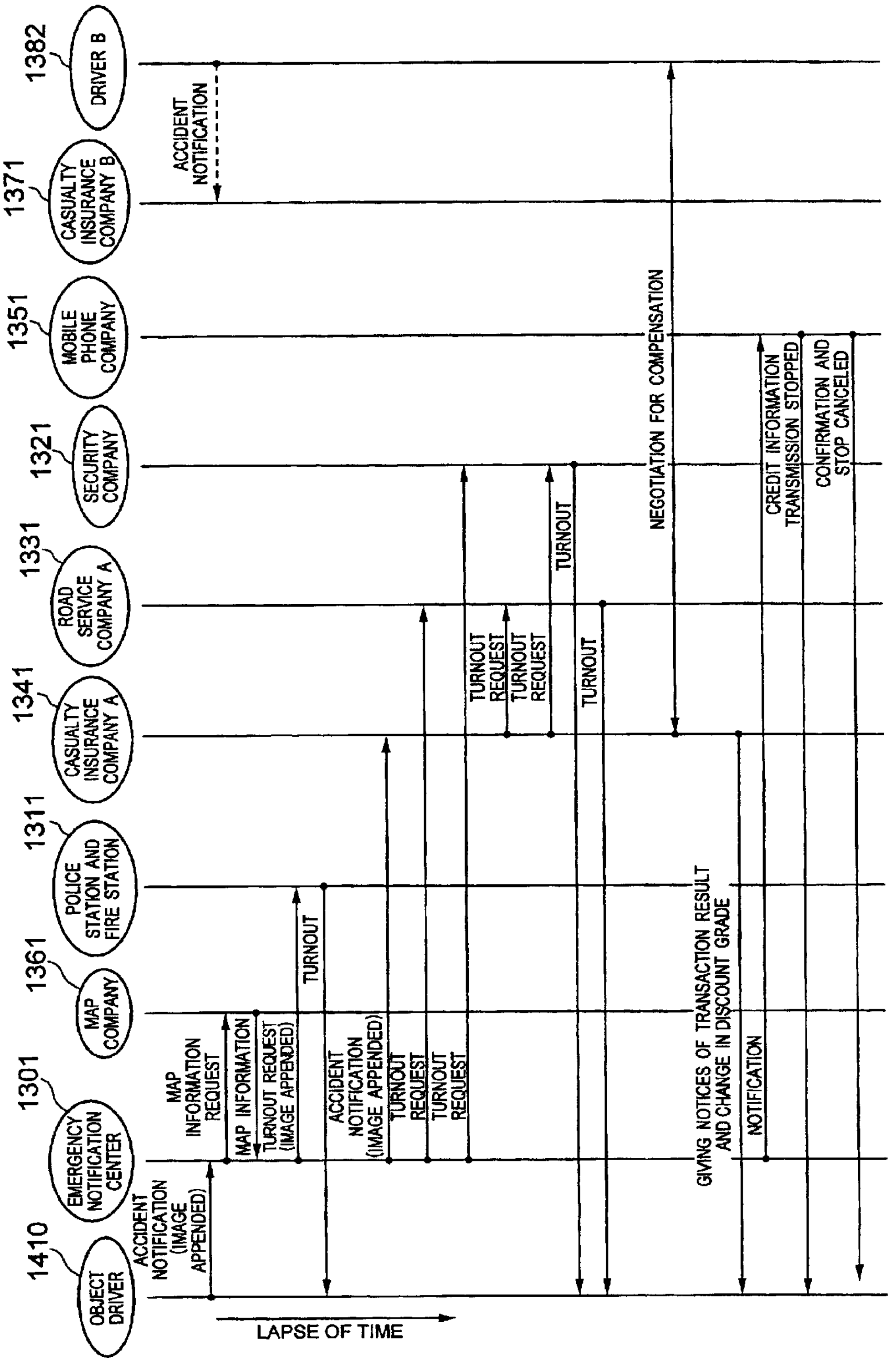
FIG. 12 is a diagram of assistance in explaining an example of communication in the emergency system shown in FIG. 11.

Referring to FIG. 12, there is shown a detailed explanatory diagram of assistance in explaining an example of communication in an emergency system shown in FIG. 11.

In this diagram, the object driver 1410 notifies the emergency notification center 1301 of the occurrence of the accident, first. After that, as described above, the emergency notification center 1301 communicates with parties to be contacted such as the map company 1361, the police or fire defense organization 1311, the casualty insurance company A 1341, the road service company A 1331, the security company 1321, and the mobile phone company 1351 by transmitting the position information, requesting them to turn out, giving the accident occurrence notification, asking for sending cars or personnel, and giving an abnormal-condition notice. It should be noted that FIG. 12 shows only an example of an order in which the emergency notification center 1301 communicates with respective parties to be contacted and therefore any other orders are applicable.

Figure 13:
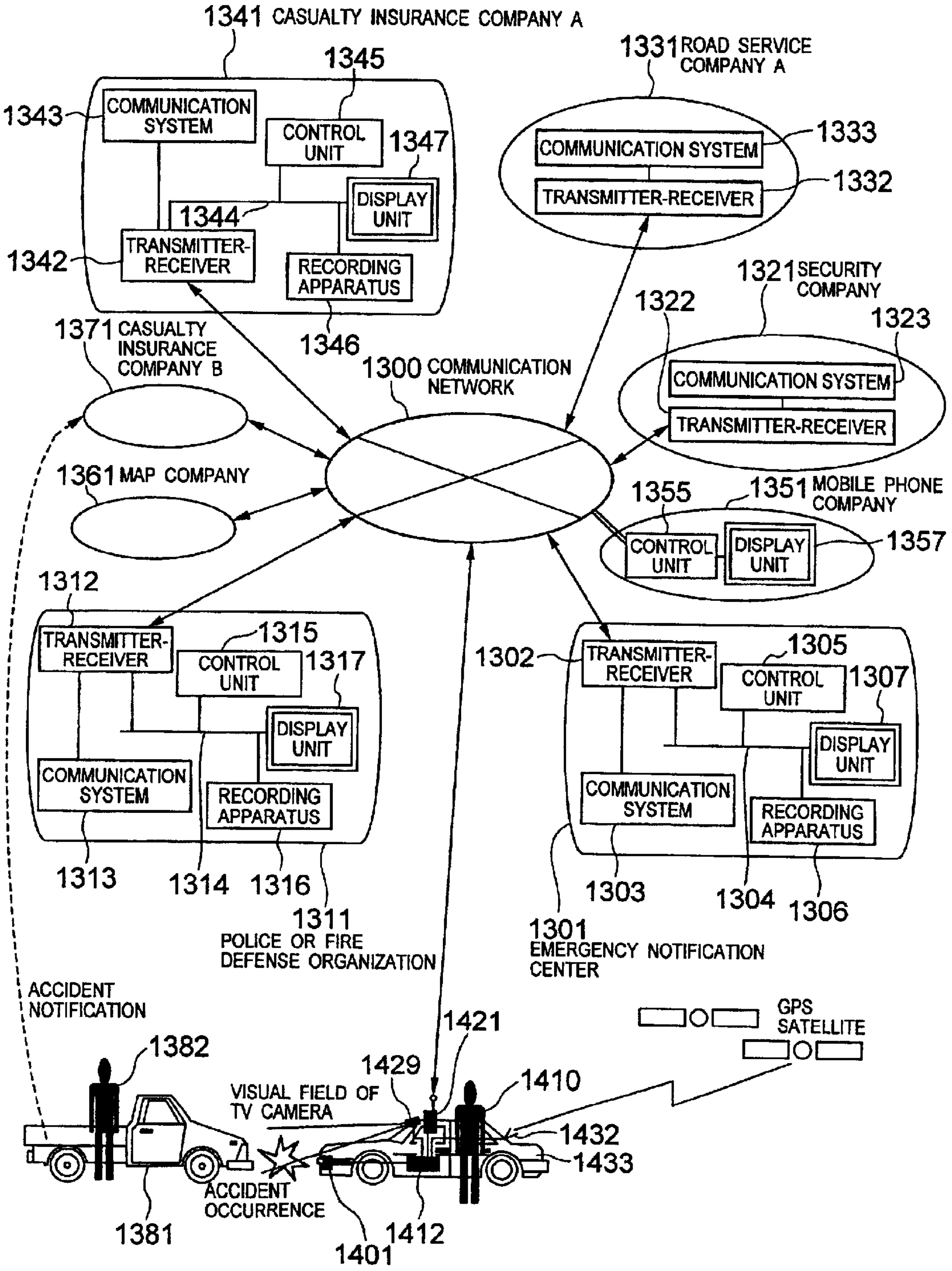
FIG. 13 is a diagram showing the other embodiment of the present invention, which is a system utilizing a communication network.

Referring to FIG. 13, there is shown a diagram of a typical configuration of another embodiment according to the present invention, which is a system utilizing a communication network. In this diagram, the object driver 1410 is riding the object vehicle 1433. In an example shown in this diagram, there is described a case of an accident between the registered vehicle 1433 and the other vehicle 1381 that the other driver 1382 is riding. The object vehicle 1433 has a shock sensor 1401, a GPS antenna 1432, an in-vehicle device 1412, and a mobile phone 1421. The term "object vehicle" means a vehicle to get the notification service and it is the vehicle which has notified the emergency notification center of an accident occurrence.

The mobile phone 1421 mounted on the object vehicle 1433 communicates with a transmitter-receiver 1302 of the emergency notification center 1301 via the communication network 1300. The emergency notification center 1301 also mutually communicates with the map company 1361, the police or fire defense organization 1311, the casualty insurance company A 1341, the security company 1321, the road service company A 1331, or the mobile phone company 1351 via the communication network 1300. In addition, the mobile phone company 1351 can communicate with the mobile phone 1421. Furthermore, the casualty insurance company A 1341 and the casualty insurance company B 1371 can communicate with each other via the communication network 1300.

The emergency notification center 1301 has a transmitter-receiver 1302 for a communication via the communication network 1300 and the transmitter-receiver 1302 is connected to a communication system 1303 for an operator to make a call. The transmitter-receiver 1302, a control unit 1305 for various controls, a recording apparatus 1306 for recording various files and operation programs or software, and a display unit 1307 for performing input-output operations for the operator are mutually connected via a signal bus 1304.

As for the police or fire defense organization 1311 and the casualty insurance company A 1341, they also have transmitter-receivers 1312 and 1342, communication systems 1313 and 1343, control units 1315 and 1345, recording apparatuses 1316 and 1346, display units 1317 and 1347, and signal buses 1314 and 1344, respectively.

The security company 1321 and the road service company A 1331 have transmitter-receivers 1322 and 1332 and communication systems 1323 and 1333 for communications via the communication network 1300, respectively. The mobile phone company 1351 has a control unit 1355 capable of controlling networks connected to the communication network 1300 and a display unit 1357 connected to the control unit 1355.

Figure 14:
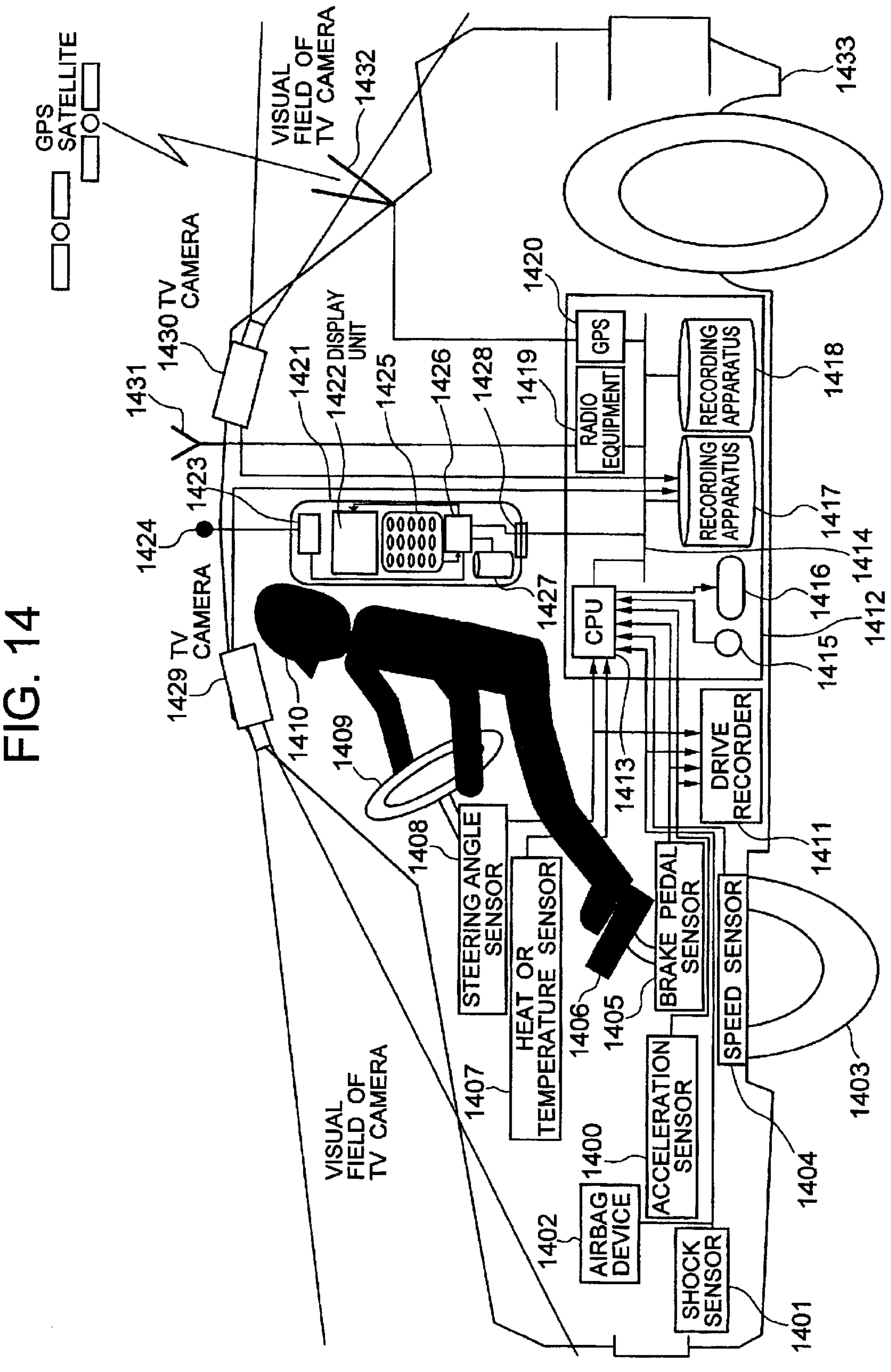
FIG. 14 is a diagram showing a block configuration of an embodiment installed in a moving object according to the present invention.

Referring to FIG. 14, there is shown a diagram of a block configuration of an embodiment mounted on a moving object according to the present invention. In this diagram, the moving object is an object vehicle 1433 having the object driver 1410 aboard. The object vehicle 1433 has a shock sensor 1401 for detecting a shock energy applied to he object vehicle 1433 and an airbag device 1402 for operating to protect passengers if the shock sensor 1401 detects a shock equal to or greater than a given amount, for example, a shock externally applied at a deceleration rate higher than a deceleration rate generated by a braking operation.

The object vehicle 1433 further has a steering wheel 1409 and a brake pedal 1406 as the control devices operated by the object driver 1410, a steering angle sensor 1408 for detecting a steering angle as a sensor for detecting an operating condition of the brake, and a brake pedal operating condition sensor 1405 for detecting a brake pedal operating condition. In addition, it has a vehicle speed sensor 1404 detecting a rotational speed of the wheel 1403 of the object vehicle 1433. As a sensor for detecting the vehicle speed, it is possible to use not only a sensor detecting the rotational speed of the wheel, but a sensor calculating it according to the rotational speed or the like of an axle or an engine.

Sensor signals output from the shock sensor 1401, the vehicle speed sensor 1404, the brake pedal operating condition sensor 1405, and the steering angle sensor 1408 are input to a drive recorder 1411 for recording an operating condition of the object vehicle 1433 and then the sensor signal values are recorded with being associated with the detected time. Concurrently with this, these sensor signals are input to a CPU 1413 of the in-vehicle device 1412 for signal processing.

Besides the above various sensors, the vehicle may have a heat or temperature sensor 1407 (hereinafter, referred to as a thermal sensor) for detecting a heat quantity (a detected amount of heat) or a temperature in a given portion of the object vehicle 1433, for example, in a chamber having a passenger aboard. Accordingly, by detecting an abnormal heat generation, for example, an increase of a heat quantity (a detected amount of heat) or a temperature rise at an occurrence of a fire at a car or by detecting a temperature drop which may occur when a temperature inside the car drops to a level hindering the passenger from keeping his or her temperature due to a sharp drop of the temperature or the like, a wider range of an abnormal condition can be detected. Sensor signals output from the thermal sensor 1407 are input to the CPU 1413 of the in-vehicle device 1412 for signal processing in the same manner as for the above sensor signals.

The in-vehicle device 1412 mounted on the object vehicle 1433 forms a main portion of an apparatus for notifying the emergency notification center 1301 from the moving object when an abnormal condition occurs in the moving object. This in-vehicle device 1412 further has a manual notifying button 1415 enabling the emergency notification center 1301 to be notified by a manual operation of pressing down, an indicator 1416 for indicating a condition of the in-vehicle device 1412 such as an emergency notifying operating condition, a signal bus 1414, and the CPU 1413, an video and sound data recording apparatus 1417, an recording apparatus 1418, radio equipment 1419, and a GPS receiver 1420 mutually connected via the signal bus 1414.

Among those, the video and sound data recording apparatus 1417 is the iterative recording apparatus in the above, which is connected to the TV camera 1429 and the TV camera 1430. Video signals acquired by picking up with the TV cameras are input and recorded into the video and sound data recording apparatus 1417. The TV camera 1429 is for use in picking up a scene ahead of the object vehicle 1433, including a part of the front portion of the object vehicle. In addition, the radio equipment 1419 is connected to the communication antenna 1431. The radio equipment 1419 receives a signal from the traffic signal apparatus. The received signal includes a signaler control signal of the traffic signal apparatus and an video signal of picking up a situation of a traffic road such as an intersection where a traffic signal apparatus is installed. The received signal control signal or the image signal of picking up the traffic road are input to the recording apparatus 1418 and recorded there. Furthermore, the GPS receiver 1420 is connected to a GPS antenna 1432. The GPS receiver 1420 receives a reference signal transmitted from a GPS satellite, thereby generating latitude information, longitude information, and altitude information indicating a location of the object vehicle 1433 at receiving the reference signal and time information. The generated information is input to the recording apparatus 1418 and recorded there. The functions of the ratio equipment 1419 and the antenna 1431 may be included in the mobile phone 1421 and the antenna 1424.

The recording apparatus 1418 records "an emergency notification service contract number" corresponding to the object vehicle 1433. Otherwise, it is possible to previously record "a notified destination phone number" which is a communication dial number (a telephone dial signal) for calling the emergency notification center 1301.

Furthermore, the in-vehicle device 1412 has an adapter 1428 and is connected to the mobile phone 1421 via the adapter 1428, by which they exchange data mutually. Furthermore, as the adapter 1428, the in-vehicle device 1412 can be wirelessly connected with the mobile phone 1421 for communications by using a wireless communication function.

The mobile phone 1421 has a key button 1425 for an input-output operation performed by an operator and a display unit 1422 and further has a transmitter-receiver 1423 provided with a transmitting or receiving antenna 1424. These respective portions of the mobile phone 1421 are connected to the CPU 1426 and controlled thereby. The CPU 1426 is connected to the in-vehicle device 1412 via the adapter 1428. In addition, the CPU 1426 is connected to a storage device 1427, which stores records of various files and operating programs or software. The storage device 1427 also stores a record of "a mobile phone number" which is a communication dial number (phone number) for calling the mobile phone 1421. It is also possible to record "the notified destination phone number" of the emergency notification center 1301 in the storage device.

Figure 15:
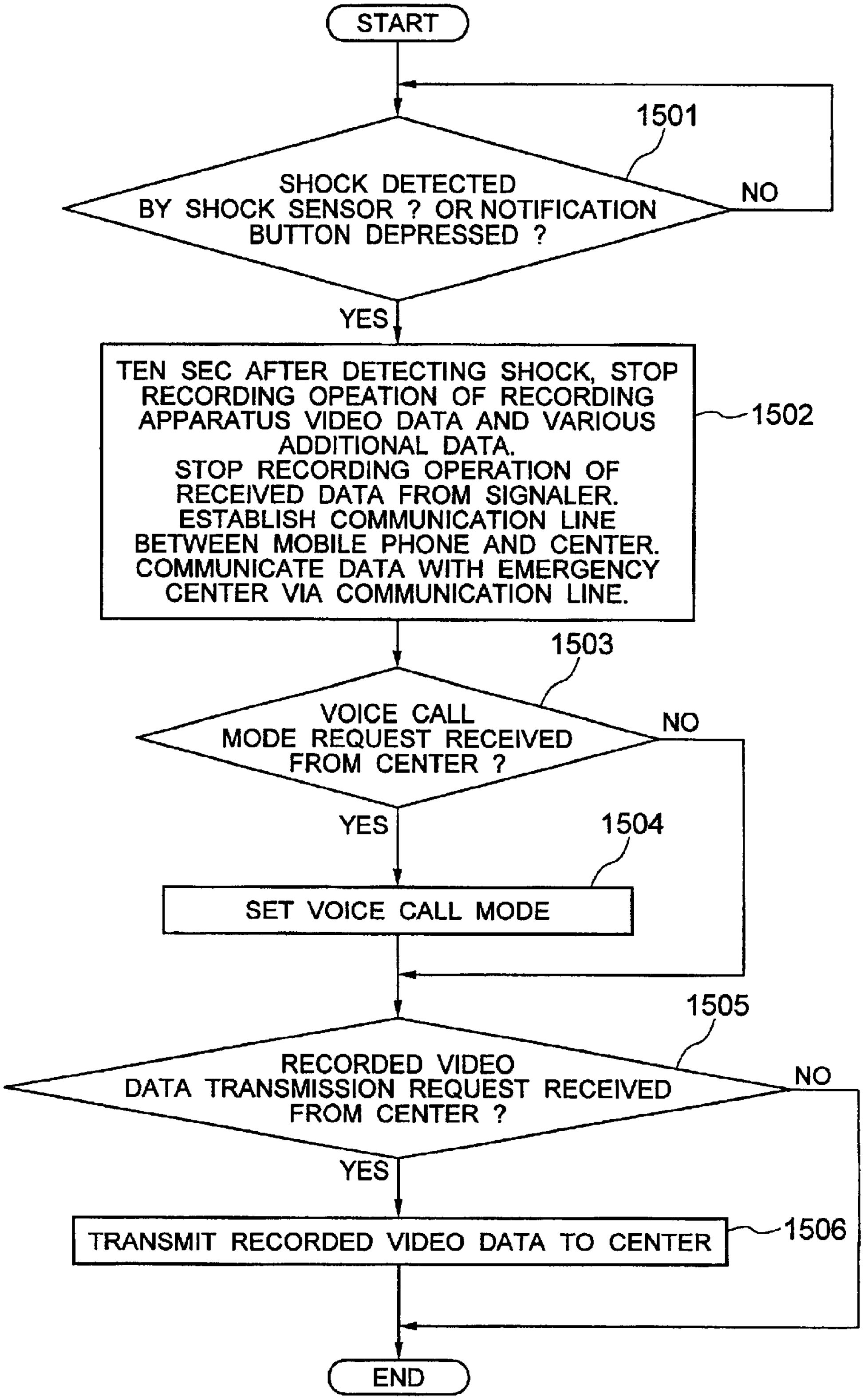
FIG. 15 is a diagram showing an example of an operation flowchart of a moving object according to the present invention shown in FIG. 14.

Referring to FIG. 15, there is shown a diagram of an example of an operation flowchart of the embodiment shown in FIG. 14 object according to the present invention. First, in step 1501, the CPU 1413 of the in-vehicle device 1412 of the moving object determines whether or not the shock sensor 1401 detects a shock or the manual notification button 1415 is depressed; if it is "No," the determination is iterated. If it is "Yes," the control proceeds to step 1502. In the step 1502, a recording operation of the video and sound data recording apparatus 1417 is stopped 10 sec after detecting the shock. This enables video signals of images taken before and after the occurrence of the shock to be recorded and retained in the video and sound data recording apparatus 1417 regarding the video signals from the TV cameras 1429 and 1430 and the video signals transmitted from the traffic signal apparatus via the radio equipment (receiver) 1419.

While it is described that the signals are recorded and retained in the operation according to the content detected by the shock sensor 1401 in the step 1501 and the step 1502 in the example of this chart, it is also possible to record and retain the signals according to the content detected by the thermal sensor 1407 instead.

Furthermore, in the step 1502, the in-vehicle device 1412 dials the emergency notification center 1301, which is a destination for calling "the notified destination phone number" recorded in the above, via the mobile phone 1421. This enables an establishment of a communication line between the mobile phone 1421 and the emergency notification center 1301 via the communication network 1300. Then, after the establishment of the communication line, they mutually communicate data; the object vehicle 1433 transmits "the emergency notification service contract number," "the mobile phone number," and "the abnormal-condition position information" and "the abnormal-condition time information" which are position information and the time information at occurrence of the abnormal condition acquired from the GPS receiver, respectively, via the mobile phone 1421.

Next, in step 1503, it is determined whether the emergency notification center 1301 requests to enter a voice call mode for an operation to make a voice call. Unless the center 1301 requests to enter the voice call mode, the control proceeds to step 1505. If the center 1301 requests to enter the voice call mode, the control proceeds to step 1504. In the step 1504, the center is caused to enter the voice call mode to enable a voice call between the communication system 1303 of the center 1301 and the mobile phone 1421. Then, the object driver 1410 on the object vehicle 1433 has a conversation with a voice call operator of the center 1301 by means of the voice call, by which they can mutually confirm the accident situation, the accident settlement schedule or the like. In addition, if there is no voice contact from a passenger or the like of the object vehicle 1433 for a given period of time or longer after entering the voice call mode, the voice call operator of the center 1301 can determine that there is much possibility of the passenger or the like in an unconscious state due to the accident. Then, the voice call operator of the center 1301 can rapidly ask the police or fire defense organization 1311 to turn out afterward on the basis of the determination.

While the voice call operator of the center 1301 communicates with the object driver 1410 by using the communication system 1303 in this embodiment, the present invention is not limited, but the center 1301 can be provided with an artificial intelligence (AI) (not shown) capable of communicating with the object driver 1410 or of determining the above possibility with the AI connected to the transmitter-receiver 1302; the AI can communicate with the object driver 1410 to determine the above in the same manner as for the voice call operator. The AI comprises a computer, software executed by the computer, an input-output interface for connecting the computer with peripheral devices, a sensor and the like.

Next, in the step 1505, it is determined whether there is a request of the emergency notification center 1301 to transmit video data, in other words, to transmit the video signals from the TV cameras 1429 and 1430 and the video signals from the traffic signal apparatus before and after the occurrence of the shock, having been recorded and retained in the step 1502, to the emergency notification center 1301. This transmission request is made by issuing a transmission request signal from the center 1301 if the center 1301 determines that there is a need for transmitting the recorded video signals from the object vehicle 1433 to the center 1301 in view of the content of the data communication in the step 1502 or the content of the voice call in the step 1504. Unless there is a request of the center 1301 to transmit the recorded video data to the center 1301, this flow processing is terminated. If there is a request of the center 1301 to transmit the recorded video data, the control proceeds to step 1506. In the step 1506, the video signals recorded into the video and sound data recording apparatus 1417 of the in-vehicle device are transmitted to the emergency notification center 1301 via the mobile phone 1421. Then, processing in this flow is terminated.

Figure 16:
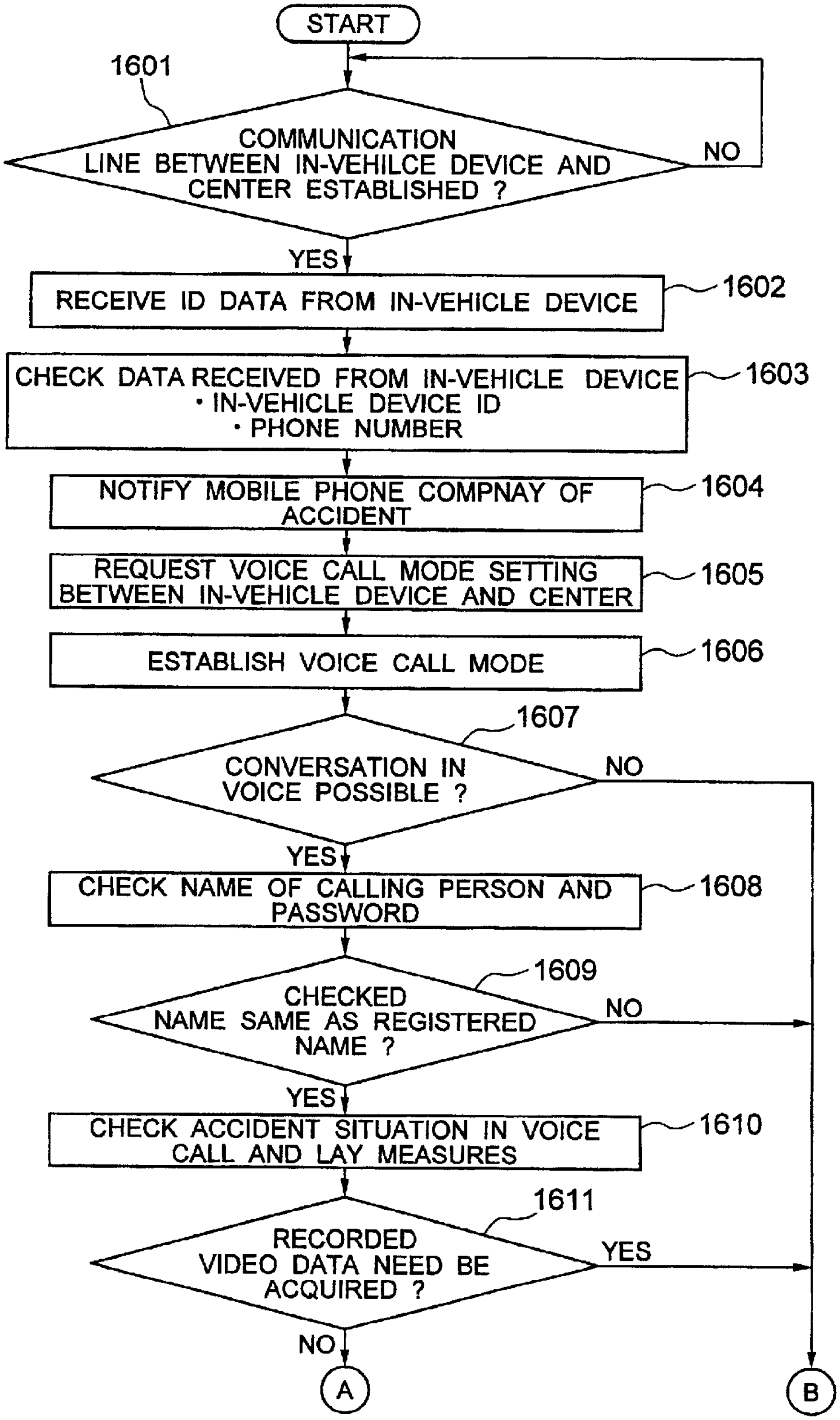
FIG. 16 is a diagram showing the first half of an example of an operation flowchart of an emergency notification center according to the present invention.
Figure 17:
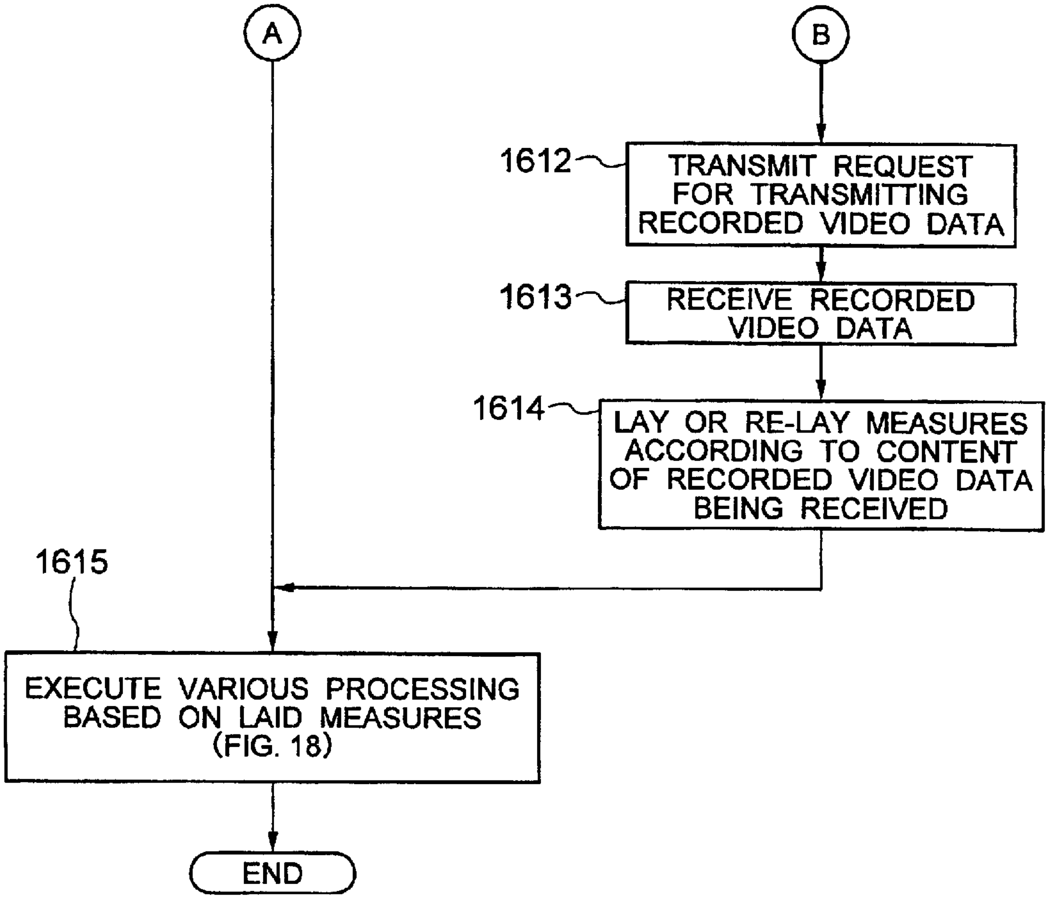
FIG. 17 is a diagram showing the latter half of the example of the operation flowchart of the emergency notification center according to FIG. 16.

Referring to FIG. 16, there is shown a diagram of the first half of an example of an operation flowchart of the emergency notification center according to the present invention. Referring to FIG. 17, there is shown a diagram of the latter half of the example of the operation flowchart of the emergency notification center according to FIG. 16. In the flowchart shown in FIG. 16, first in step 1601, the control unit 1305 of the emergency notification center 1301 determines whether a communication line is established between the object vehicle 1433 and the center 1301. If the communication line is established between the emergency notification center 1301 and the object vehicle 1433 via the communication network 1300, it is determined that an emergency is notified. If it is "No," the determination is iterated. If it is "Yes," the control proceeds to step 1602. In the step 1602, the transmitter-receiver 1302 of the emergency center 1301 receives "the emergency notification service contract number" retained in the recording apparatus 1418 of the in-vehicle device 1412 and "the mobile phone number" of the mobile phone 1421 as ID data signals via the established communication line or receives "the automatic/manual notification identification information." The received signals are recorded from the transmitter-receiver 1302 to the recording apparatus 1306 via the bus 1304 and, in step 1603, an ID data signal is checked by the control unit 1305. Subsequently, information related to the checked ID data signal, which is related information previously retained in an emergency notification service contract content database in the recording apparatus 1306, is compared with the received signal.

Next, in step 1604, the center notifies a mobile phone company 1351 related to "the mobile phone number" of the received mobile phone 1421 of "the mobile phone number" and an occurrence of an accident at the mobile phone 1421 having "the mobile phone number." For example, if the mobile phone retains credit information related to a financial transaction or the like, the mobile phone company 1351 having received this notification makes a control to temporarily inhibit operations of transmitting the credit information to the outside or of displaying it on the display unit in the communication network 1300 or in the mobile phone 1421 having "the mobile phone number." It should be noted that this notification is automatically transmitted as a notification signal or it is made orally by the operator using a telephone in response to the checked ID data from the mobile phone 1421 in the step 1603.

Next, in step 1605, the center 1301 transmits a signal for requesting the mobile phone 1421 to change to the voice call mode. If the voice call mode is established by the mobile phone 1421 or the in-vehicle device 1412 in response to the request signal in step 1606, the operation is put in a state of enabling a conversation between the object driver 1410 on the object vehicle 1433 and the voice call operator of the center 1301. Next, if there is a response from the object driver 1410 or other passengers in voice to an operator's call from the center 1301 in step 1607, a name of the responding person and a password are checked in the next step 1608. Then, if the name of the calling party checked in voice is matched with a name registered in a registered driver's name list corresponding to the ID data signal retained in the emergency notification service contract content database in the recording apparatus 1306 of the emergency notification center 1301 in step 1609, the voice call operator lays a method of coping with the accident by confirming the accident situation by a voice call in the nest step 1610. Then, it is determined whether there is a need for acquiring the recorded video data on the basis of the laid method of coping with the accident in the next step 1611. If not, the control proceeds to the next flow A; if so, the control proceeds to the next flow B.

As for processing following character B in the flowchart shown in FIG. 17, in step 1612, a request signal for requesting a transmission of the video signal retained in the object vehicle 1433 is first transmitted from the transmitter-receiver 1302 of the emergency center 1301 to the mobile phone 1421 via the communication network 1300. Then, in step 1613, the video signal recorded in the video and sound data recording apparatus 1417 of the in-vehicle device 1412 is transmitted via the mobile phone 1421 in response to the request signal received by the mobile phone 1421. Then, the transmitted video signal is received by the transmitter-receiver 1302 of the emergency center 1301. Furthermore, in step 1614, the video signal received by the transmitter-receiver 1302 is recorded into the recording apparatus 1306 via the signal bus 1304 and the video signal is displayed on the display unit 1307, by which the content of the video signal is checked to lay down or re-lay a method of coping with the accident according to a result of the check. After the step 1614, processing following character A described later is performed.

As for the processing following the character A, various types of processing is executed on the basis of the method of coping with the accident laid according to the above processing in step 1615. Next, a content of the processing in this step 1615 will be described in more detail. The processing in the step 1615 is executed by an operator or a computer (AI).

Figure 18:
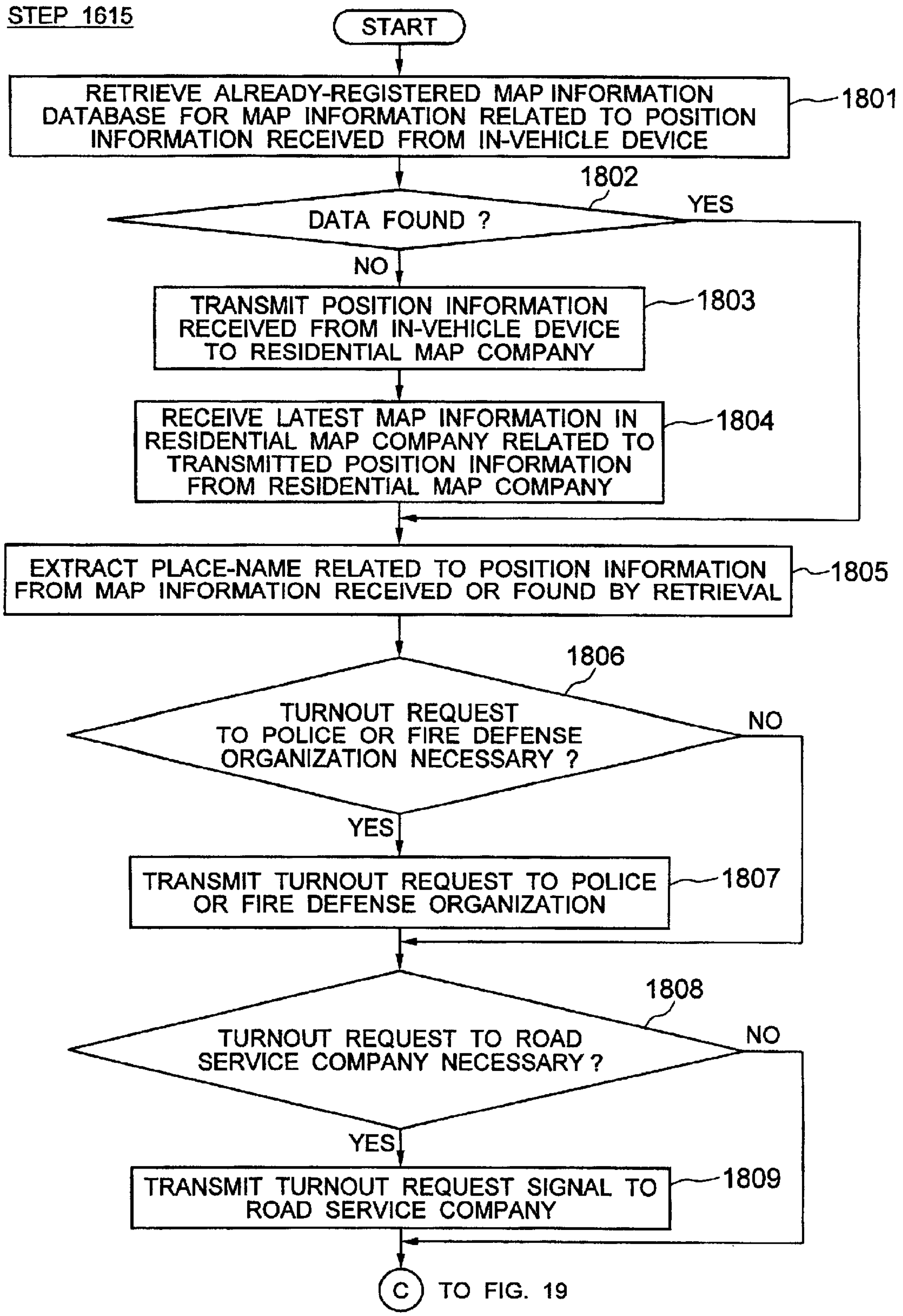
FIG. 18 is a diagram showing the first half of an example of an operation flowchart of assistance in explaining the operation flow in step 1615 shown in FIG. 17 in more detail.
Figure 19:
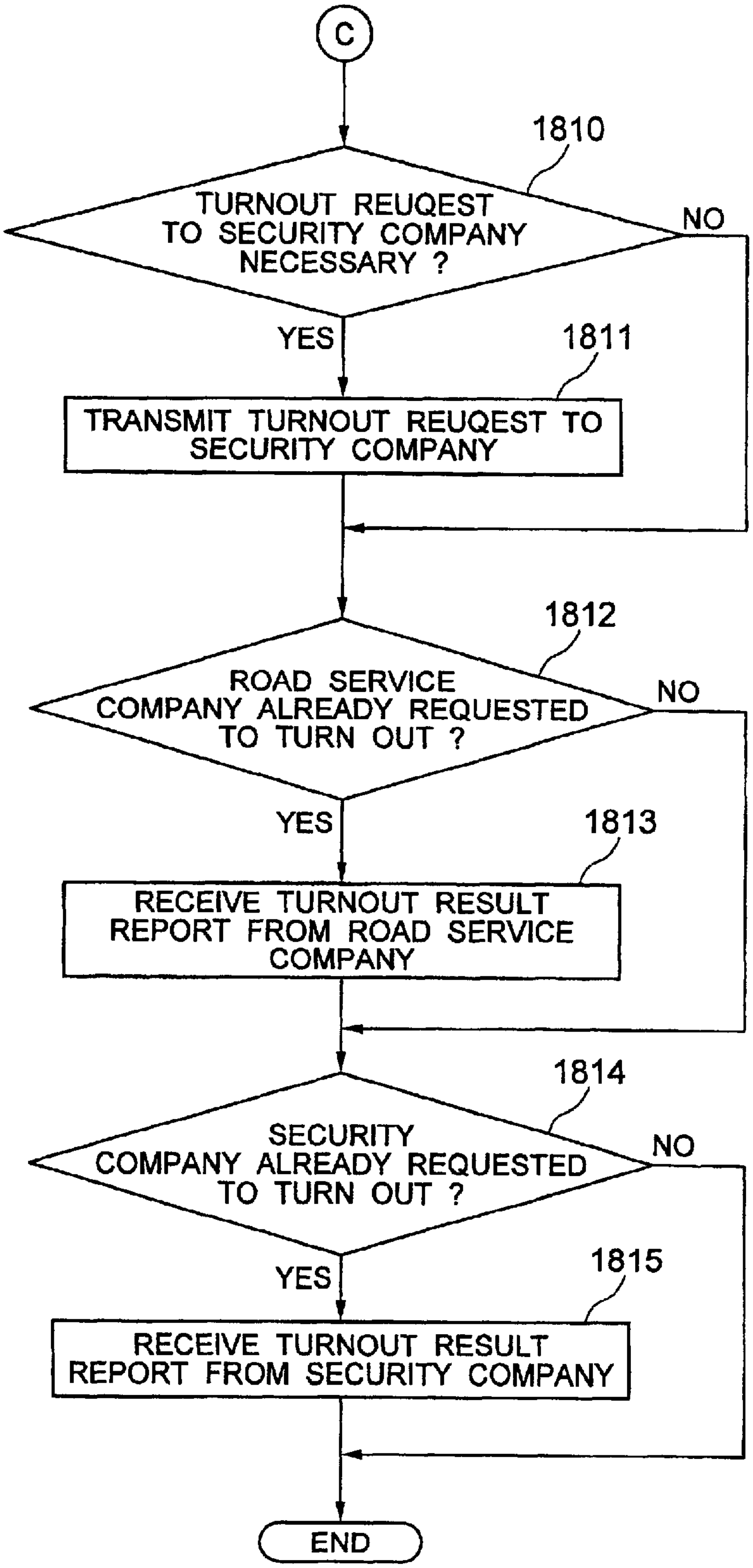
FIG. 19 is a diagram showing the latter half of the example of the operation flowchart according to FIG. 18.

Referring to FIG. 18, there is shown a diagram of the first half of an example of an operation flowchart of assistance in explaining the operation flow of the emergency notification center 1301 in step 1615 shown in FIG. 17 in more detail. Referring to FIG. 19, there is shown a diagram of the latter half of the example of the operation flowchart according to FIG. 18. In the flowchart shown in FIG. 18, first in step 1801, it is checked by retrieving that the map information according to "the position information" received from the object vehicle and recorded has already been recorded into the recording apparatus 1306. Next, if it is determined that the recorded map information exists in step 1802, the control proceeds to step 1805. Unless it is determined that the recorded map information exists, the control proceeds to step 1803. In the step 1803, "the position information" recorded from the transmitter-receiver 1302 to the recording apparatus 1306 is transmitted to the map company 1361 via the communication network 1300. Then, in step 1804, the map information transmitted from the map company 1361 via the communication network 1300 is received by the transmitter-receiver 1302, the received map information is input and recorded into the recording apparatus 1306 via the signal bus 1304, and a map based on the information is displayed on the display unit 1307. Then, in step 1805, a place-name and an address related to "the position information" in the above are extracted from the map information received from the map information company 1361 or the map information which has been previously retained in the recording apparatus 1306 and then the extracted place-name and address are displayed on the display unit 1307.

Next, in the step 1806, it is determined whether there is a need for asking the police or fire defense organization to turn out on the basis of the above laid method of coping with the accident; if it is determined that there is a need for the turnout, the control proceeds to step 1807. In the step 1807, the information recorded in the recording apparatus 1306 of the emergency notification center 1301, for example, a turnout request signal containing "the position information," "the abnormal-condition time information," and "the video data" together is transmitted to the police or fire defense organization 1311 via the communication network 1300. Otherwise, a notification with a voice call may be made. Furthermore, one or both of the police and fire defense organizations can be notified.

In step 1808, if it is determined whether there is a need for asking the road service company to turn out on the basis of the above laid method of coping with the accident; if it is determined that there is a need for the turnout, the control proceeds to step 1809. In the step 1809, the turnout request signal containing "the position information," "the abnormal-condition time information" and the like together is transmitted to, for example, the road service company A 1331 via the communication network 1300. Otherwise, a notification with a voice call may be made.

Furthermore, in step 1810 following character C shown in FIG. 19, it is determined whether there is a need for asking the security company to turn out on the basis of the laid method of coping with the accident; if it is determined that there is a need for the turnout, the control proceeds to step 1811. In the step 1811, the turnout request signal containing "the position information," "the abnormal-condition time information" and the like together is transmitted to, for example, the security company 1321 via the communication network 1300. Otherwise, a notification with a voice call may be made.

Next, if the road service company and the security company are asked to turn out, the transmitter-receiver 1302 receives turnout result reports transmitted by the road service company A 1331 and the security company 1321 via the communication network 1300, respectively and then inputs them to the recording apparatus 1306 via the signal bus to be recorded there.

Figure 20:
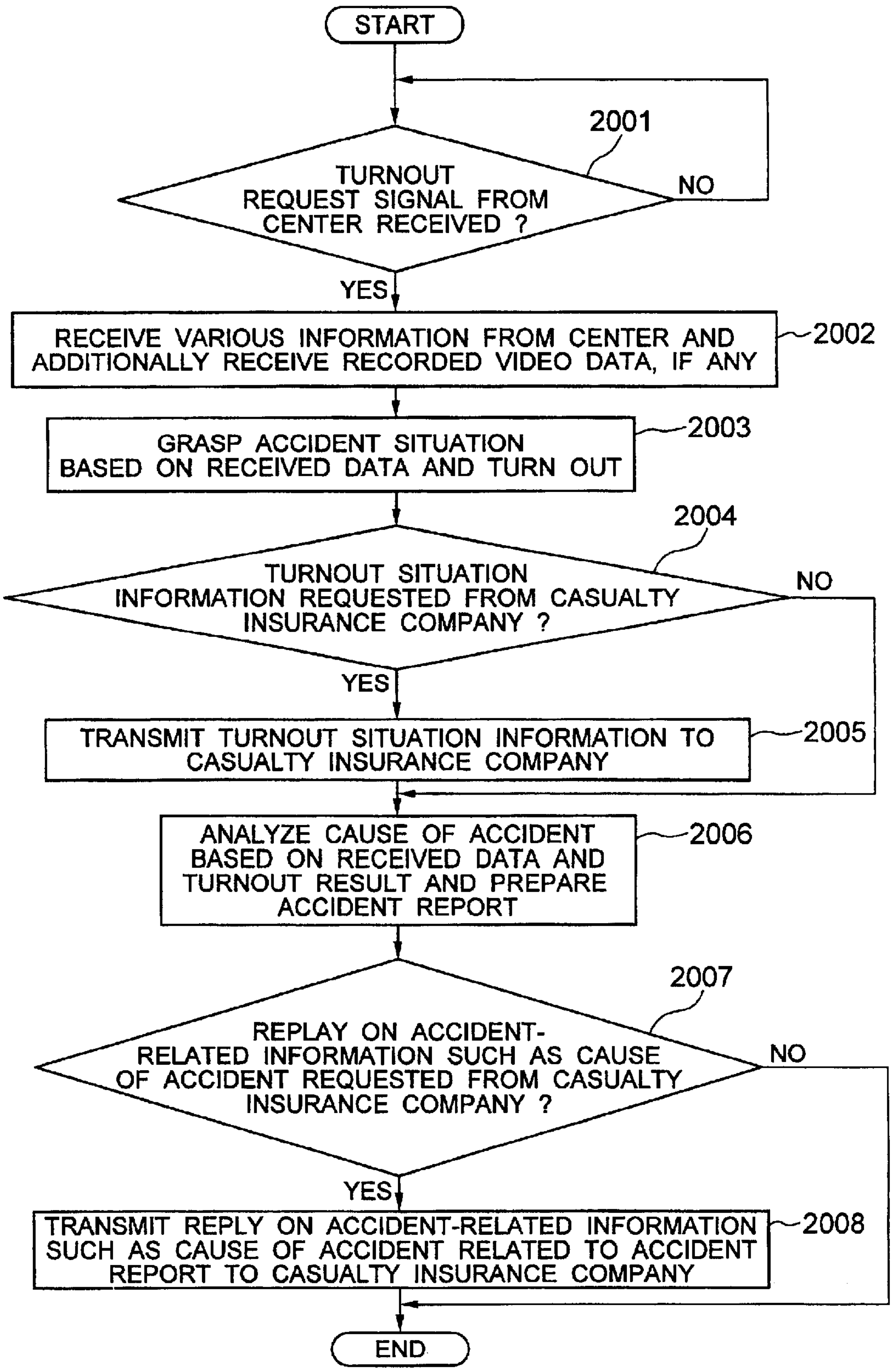
FIG. 20 is a diagram showing an example of an operation flowchart of the notifying system according to the present invention applied to a police organization or a fire defense organization.

Referring to FIG. 20, there is shown a diagram of an example of an operation flowchart of the notifying system according to the present invention applied to the police or fire defense organization 1311.

In the flowchart shown in FIG. 20, first in step 2001, the control unit 1315 of the police or fire defense organization 1311 determines whether there is a turnout request signal from the emergency notification center 1301. For example, if a communication line is established between the police or fire defense organization 1311 and the emergency notification center 1301 via the communication network 1300 and the organization receives the turnout request signal via the communication network, it is determined that the turnout is requested. If it is "No," the judgement operation is iterated. If it is "Yes," the control proceeds to step 2002. In the step 2002, the transmitter-receiver 1312 of the police or fire defense organization 1311 receives the information related to the turnout request, for example, "the position information," "the abnormal-condition time information," and "the video data" retained in the recording apparatus 1306 of the emergency center 1301 via the established communication line. Then, in step 2003, an accident situation related to the turnout request is grasped on the basis of the received information.

In step 2004, it is determined whether there is a turnout situation information request of the casualty insurance company. For example, if a communication line is established between the casualty insurance company A 1341 and the police or fire defense organization 1311 via the communication network 1300 and the organization receives a turnout situation information request signal through the communication line, the turnout situation information is determined to be requested. If it is determined that the information is requested, information of the turnout situation is transmitted via the above communication line or a communication line re-established to the casualty insurance company requesting the turnout situation information, in this example, the casualty insurance company A 1341 in step 2005.

In step 2006, a cause of the accident is investigated and analyzed on the basis of the information related to the turnout request received from the emergency notification center 1301 or a result of the turnout to prepare an accident report related to the accident.

In step 2007, it is determined whether there is a request of the casualty insurance company for a reply regarding the accident-related information, for example content information of the accident report. For example, if a communication line is established between the casualty insurance company A 1341 and the police or fire defense organization 1311 via the communication network 1300 and the organization receives the accident-related information reply request signal via the communication line, it is determined that the accident-related information reply is requested. If it is determined that the reply is requested, the accident-related information is transmitted to the casualty insurance company A 1341 via the above communication line or a re-established communication line in step 2008.

Figure 21:
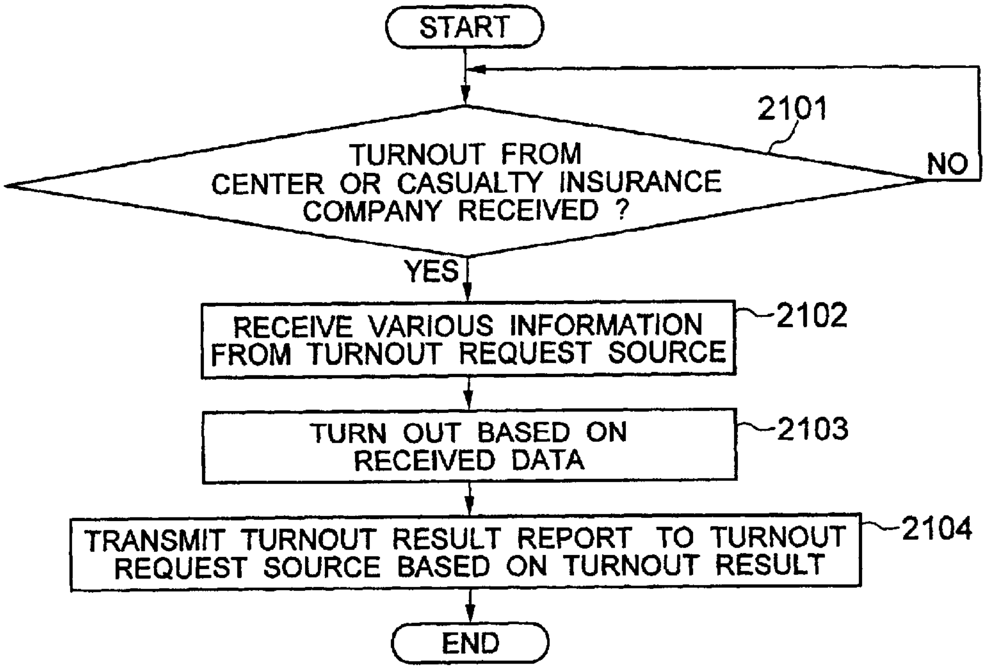
FIG. 21 is a diagram showing an example of an operation flowchart of the notifying system according to the present invention applied to a security company.

Referring to FIG. 21, there is shown a diagram of an example of an operation flowchart of the notifying system according to the present invention applied to the security company 1321.

In the flowchart shown in FIG. 21, in step 2101, it is first determined whether there is a turnout request of the emergency notification center 1301 or the casualty insurance company A 1341. For example, if a communication line is established between the emergency notification center 1301 and the security company 1321 or the casualty insurance company A 1341 and the security company 1321 via the communication network 1300 and the security company receives a turnout request signal via the communication line, it is determined that the turnout is requested. If it is "No," the determination is iterated. If it is "Yes," the control proceeds to step 2102. In the step 2102, the transmitter-receiver 1322 of the security company 1321 receives information related to the turnout request retained in the recording apparatus 1306 of the emergency center 1301, for a example, "the position information," "the abnormal-condition time information" and the like via the established communication line. In step 2103, the accident situation related to the turnout request is grasped on the basis of the received information to send appropriate security staff according to the accident situation. Then, in step 2104, information of the turnout result is transmitted to the turnout request source, in this example, the emergency notification center 1301 or the casualty insurance company A 1341 via the above communication line or a re-established communication line.

Figure 22:
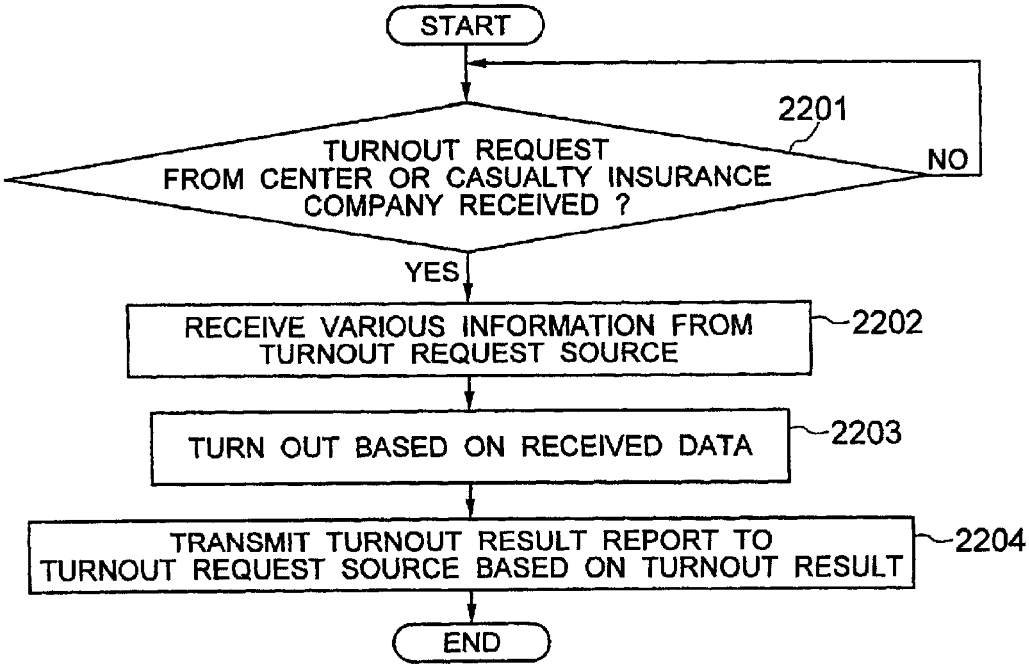
FIG. 22 is a diagram showing an example of an operation flowchart of the notifying system according to the present invention applied to a road service company.

Referring to FIG. 22, there is shown a diagram of an example of an operation flowchart of the notifying system according to the present invention applied to the road service company A 1331.

In the flowchart shown in FIG. 22, in step 2201, it is determined first whether there is a turnout request of the emergency notification center 1301 or the casualty insurance company A 1341. For example, if a communication line is established between the emergency notification center 1301 and the road service company A 1331 or between the casualty insurance company A 1341 and the road service company A 1331 via the communication network 1300 and the road service company receives a turnout request signal via the communication line, the company determines that the turnout is requested. If it is determined to be "No," the determination is iterated. If it is determined to be "Yes," the control proceeds to step 2202. In the step 2202, the transmitter-receiver 1332 of the road service company A 1331 receives information related to the turnout request retained in the recording apparatus 1306 of the emergency center 1301, for example, "the position information," "the abnormal-condition time information" and the like via the established communication line. Then, in step 2203, the accident situation related to the turnout request is grasped on the basis of the received information to send appropriate cars or staff for road services according to the accident situation, for example, services to tow and move the accident car. Subsequently in step 2204, information of the turnout result is transmitted to the turnout request source, in this example, the emergency notification center 1301 or the casualty insurance company A 1341 via the above communication line or a re-established communication line. The turnout result to be reported is a fact of the turnout, the turnout time, the number of sent automobiles, an accident situation at the site, and a content of accident management.

Figure 23:
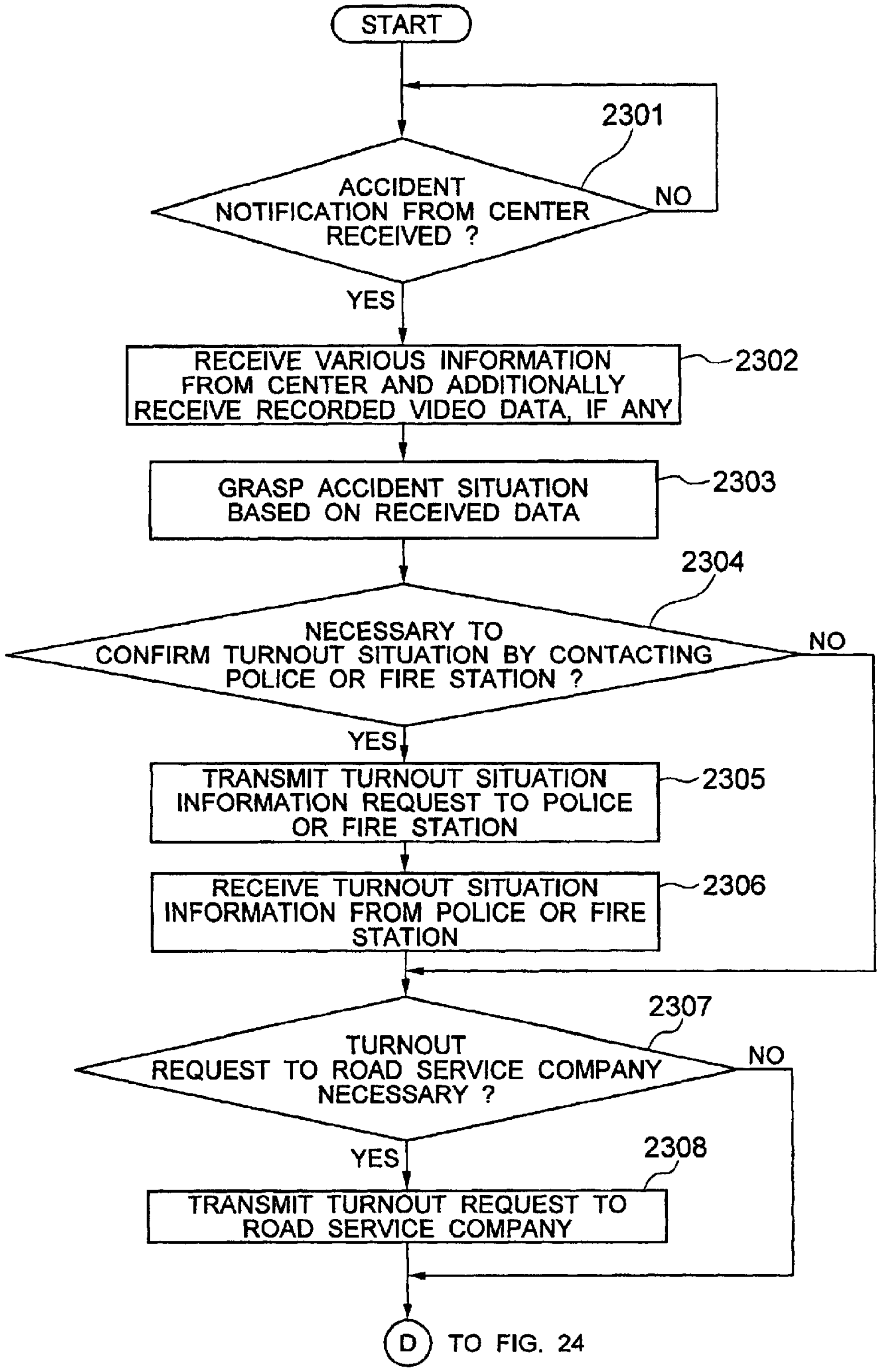
FIG. 23 is a diagram showing the beginning portion of an example of an operation flowchart of the notifying system of the present invention applied to a casualty insurance company.
Figure 24:
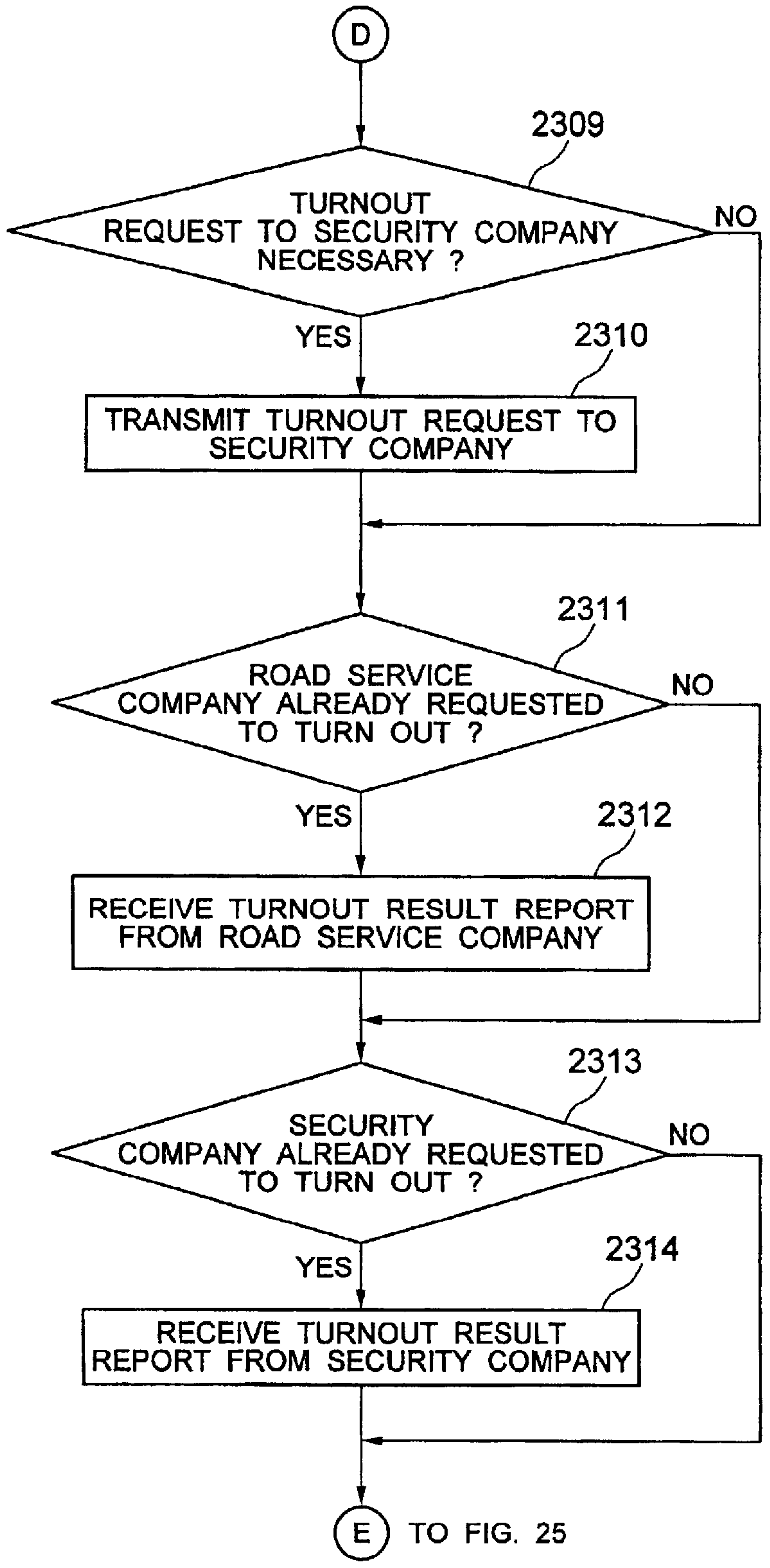
FIG. 24 is a diagram showing the middle portion of the operation flowchart according to FIG. 23.
Figure 25:
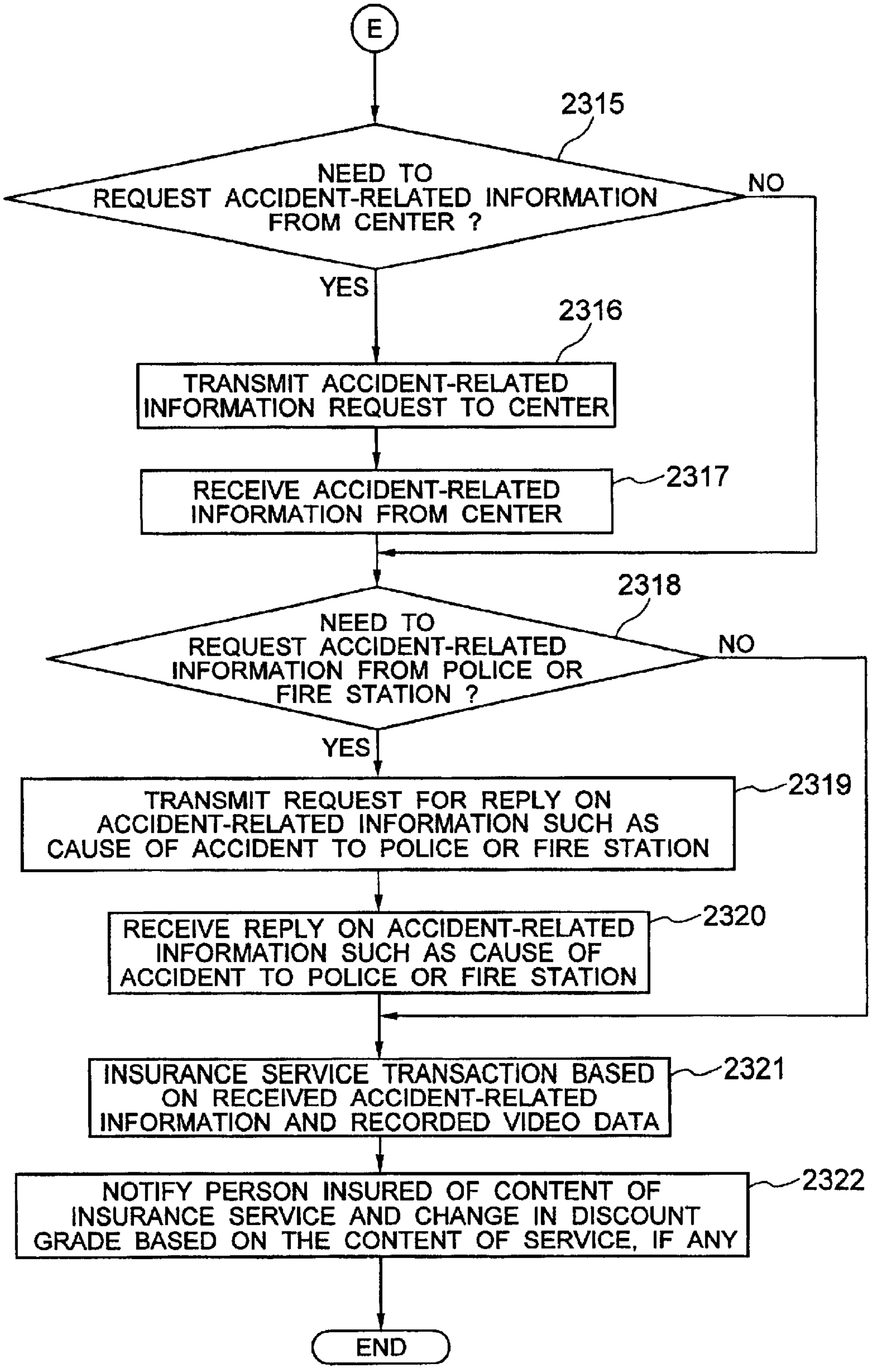
FIG. 25 is a diagram showing the end half of the the operation flowchart according to FIG. 23 and FIG. 24.

Referring to FIG. 23, there is shown a diagram of the beginning portion of an example of an operation flowchart that the notifying system of the present invention is applied to the casualty insurance company. Referring to FIG. 24, there is shown a diagram of the middle portion of the example of the operation flowchart according to FIG. 23. Referring to FIG. 25, there is shown a diagram of the remaining portion of the example of the operation flowchart according to FIG. 23 and FIG. 24. Hereinafter, there will be described a content of the operation of the casualty insurance company A 1341 in charge of the insurance services regarding the object vehicle 1433.

In the flowchart shown in FIG. 23, in step 2301, the control unit 1345 of the casualty insurance company A 1341 determines first whether there is an accident occurrence notification from the emergency notification center 1301. For example, if a communication line is established between the transmitter-receiver 1302 of the emergency notification center 1301 and the transmitter-receiver 1342 of the casualty insurance company A 1341 via the communication network and the transmitter-receiver 1342 receives a given accident occurrence notification signal via the communication line, the control unit determines that the accident occurrence is notified. If it is determined to be "No," the determination is iterated. If it is determined to be "Yes," the control proceeds to step 2302. In the step 2302, the transmitter-receiver 1342 receives various information retained in the recording apparatus 1406 of the emergency notification center 1301 such as, for example, "an emergency notification service contract number" or "a license plate number" unique to the object vehicle 1433 corresponding to the contract number, "an automobile insurance policy number of the object vehicle," "a mobile phone number" of the mobile phone 1421, and "the position information," "the abnormal-condition time information," and "the video data" transmitted from the object vehicle 1433 as received signals from the emergency notification center 1301 via the established communication line. The received signals are recorded into the recording apparatus 1346 via the signal bus 1344. Then, in step 2303, the control unit 1345 compares a content of the received signals with the related information retained in the damage insurance contract content database in the recording apparatus 1346 and then grasps the accident situation on the basis of the content of the received information.

Subsequently, according to a result of the considerations such as the grasped situation and the checked content of the damage insurance contract, the casualty insurance company asks the police or fire defense organization, the road service company, or the security company to turn out as shown at step 2304 to step 2310 in FIG. 24. Therefore, the turnout request signal is transmitted to the police or fire defense organization 1311, the road service company A 1341, or the security company 1321 via the communication network 1300. These operations are the same as those described above for the step 1806 in FIG. 18 to the step 1811 in FIG. 19.

In other words, in the step 2304, the control unit 1345 determines whether there is a need for asking the police or fire defense organization to turn out on the basis of the result of the considerations in the above; if so, the control proceeds to step 2305. In the step 2305, the control unit transmits a turnout request signal including information received from the emergency notification center 1301, for example, "the position information," "the abnormal-condition time information," and "the video data" together to the police or fire defense organization 1311 via the communication network 1300. Otherwise, a notification with a voice call may be made. Furthermore, one or both of the police and fire defense organizations can be notified. In step 2306, the casualty insurance company receives a report of the turnout situation result from the police or fire defense organization.

In step 2307, the control unit determines whether there is a need for asking the road service company to turn out on the basis of the above result of the considerations; if so, the control proceeds to step 2308. In the step 2308, a turnout request signal including information received from the emergency notification center 1301, for example, "the position information," "the abnormal-condition time information" and the like is transmitted to, for example, the road service company A 1331 via the communication network 1300. Otherwise, a notification with a voice call may be made.

In step 2309 shown in FIG. 24, it is determined whether there is a need for asking the security company to turn out on the basis of the above laid method of coping with the accident; if so, the control proceeds to step 2310. In the step 2310, a turnout request signal including information received from the emergency notification center 1301, for example, "the position information," "the abnormal-condition time information" and the like together is transmitted to, for example, the security company 1321 via the communication network 1300. Otherwise, a notification with a voice call may be made.

If the road service company and the security company have already been asked to turn out, the transmitter-receiver 1342 receives a turnout result report transmitted from the road service company A 1331 and the security company 1321 via the communication network 1300 as shown at step 2311 to step 2314 and then inputs and records it to the recording apparatus 1346 via the signal bus 1344.

Furthermore, in step 2315 to step 2320 in FIG. 25, there is described an operation for the casualty insurance company A 1341 to get accident-related information from the emergency notification center 1301 or the police or fire defense organization 1311, if necessary.

First, in the step 2315, it is determined whether to request the accident-related information from the emergency notification center 1301. If so, in step 2316, the transmitter-receiver 1342 of the casualty insurance company A 1341 transmits a request signal for requesting a transmission of the accident-related information retained in the emergency center 1301 to the transmitter-receiver 1302 of the emergency center 1301 via the communication network 1300. Then, in step 2317, the accident-related information recorded in the recording apparatus 1306 of the emergency center 1301 is transmitted via the transmitter-receiver 1302 according to the request signal received by the transmitter-receiver 1302 of the emergency center 1301. Subsequently, the transmitter-receiver 1342 of the casualty insurance company A 1341 receives the transmitted information. The received accident-related information is input to be recorded from the transmitter-receiver 1342 of the casualty insurance company A 1341 to the recording apparatus 1346 via the signal bus 1344 and then its content is displayed on the display unit 1347.

In step 2318, it is determined whether to request the accident-related information such as a cause of the accident from the police or fire defense organization 1311. If so, the transmitter-receiver 1342 of the casualty insurance company A 1341 transmits a request signal for requesting a transmission of accident-related information retained in the police or fire defense organization 1311 to the transmitter-receiver 1312 of the police or fire defense organization 1311 via the communication network 1300 in step 2319. Subsequently, in step 2320, the accident-related information recorded in the recording apparatus 1316 of the police or fire defense organization 1311 is transmitted via the transmitter-receiver 1312 according to the request signal received by the transmitter-receiver 1312 of the police or fire defense organization 1311. Then, the transmitter-receiver 1342 of the casualty insurance company A 1341 receives the transmitted information. The received accident-related information is input from the transmitter-receiver 1342 of the casualty insurance company A 1341 to the recording apparatus 1346 via the signal bus 1344 so as to be recorded there and a content of it is displayed on the display unit 1347.

In the next step 2321, the casualty insurance company negotiates for compensation with a negotiator of the other vehicle 1381, for example, the casualty insurance company B 1371 on the basis of the received accident-related information, the received recorded video signals, the related information in the damage insurance contract content database retained in the recording apparatus 1346 and the like and then assesses an amount of damage of the accident or determines a regrade of an insurance discount rate. In the next step 2322, various notices based on the content of the insurance service transactions performed in the step 2321, for example, a discount grade change notice and the like are transmitted to the object driver 1410 via the communication network 1300. Otherwise, these notices may be transmitted with a voice call. It should be noted that the operator or the computer (AI) executes the determination processes in the steps 2304, 2307, 2309, 2311, 2315, and 2318.

Figure 26:
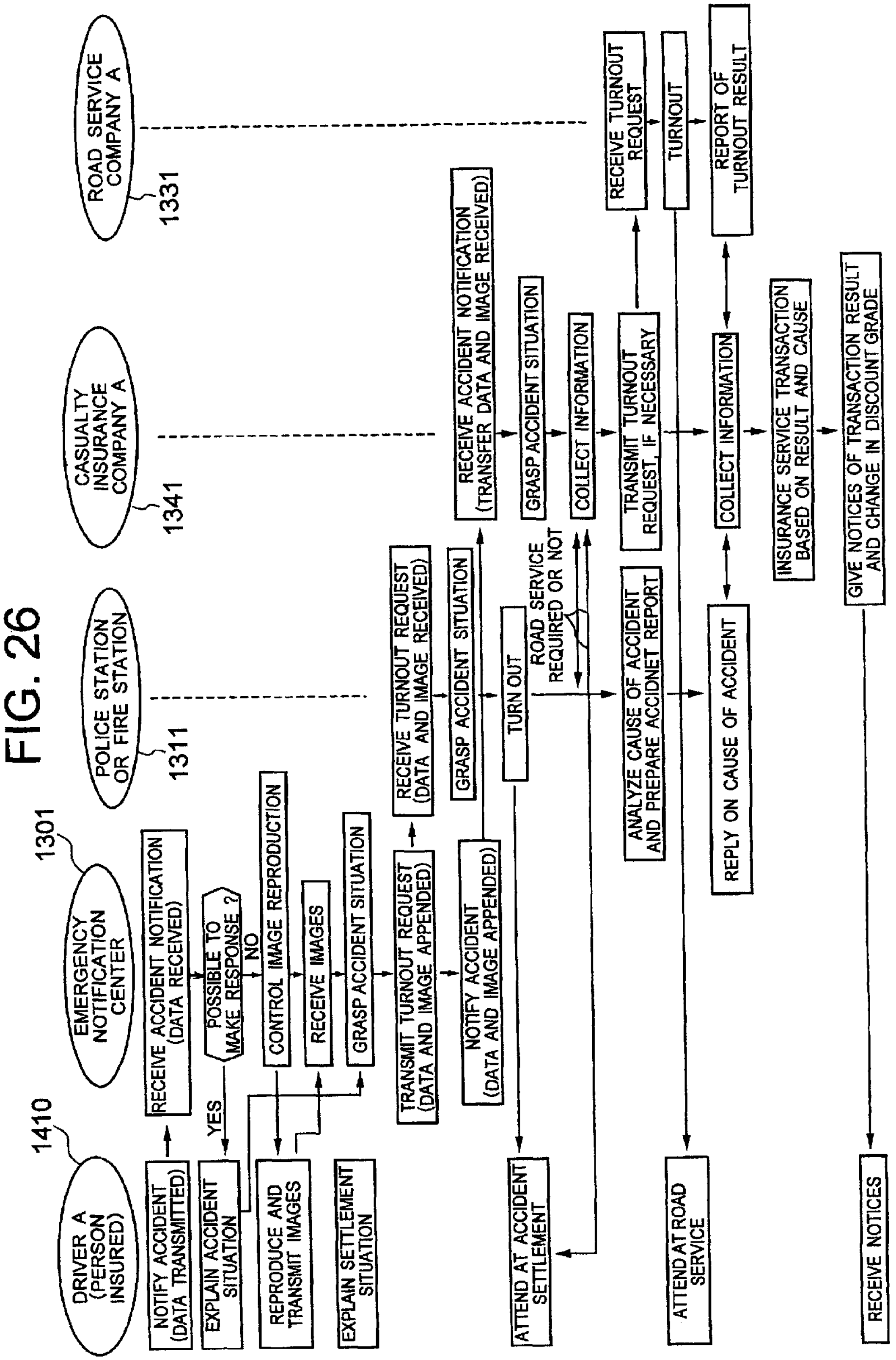
FIG. 26 is a diagram of assistance in explaining the other example of the communications in the emergency system applied with the present invention.

Referring to FIG. 26, there is shown a flowchart of assistance in explaining an example of communication in an emergency system applied with the present invention.

This chart shows names of the persons and organizations concerned; the object driver 1410, the emergency notification center 1301, a police or fire station that is the police or fire defense organization 1311, the casualty insurance company A 1341, and the road service company A 1331 from the topmost left side in this order. Furthermore, the content of the operation for each person or organization concerned is listed under the corresponding name. In addition, the contents of the operations are connected with arrows, thereby indicating relations between the connected contents of the operations. It enables a description of the relations of communications between the persons and organizations concerned.

Figure 27:
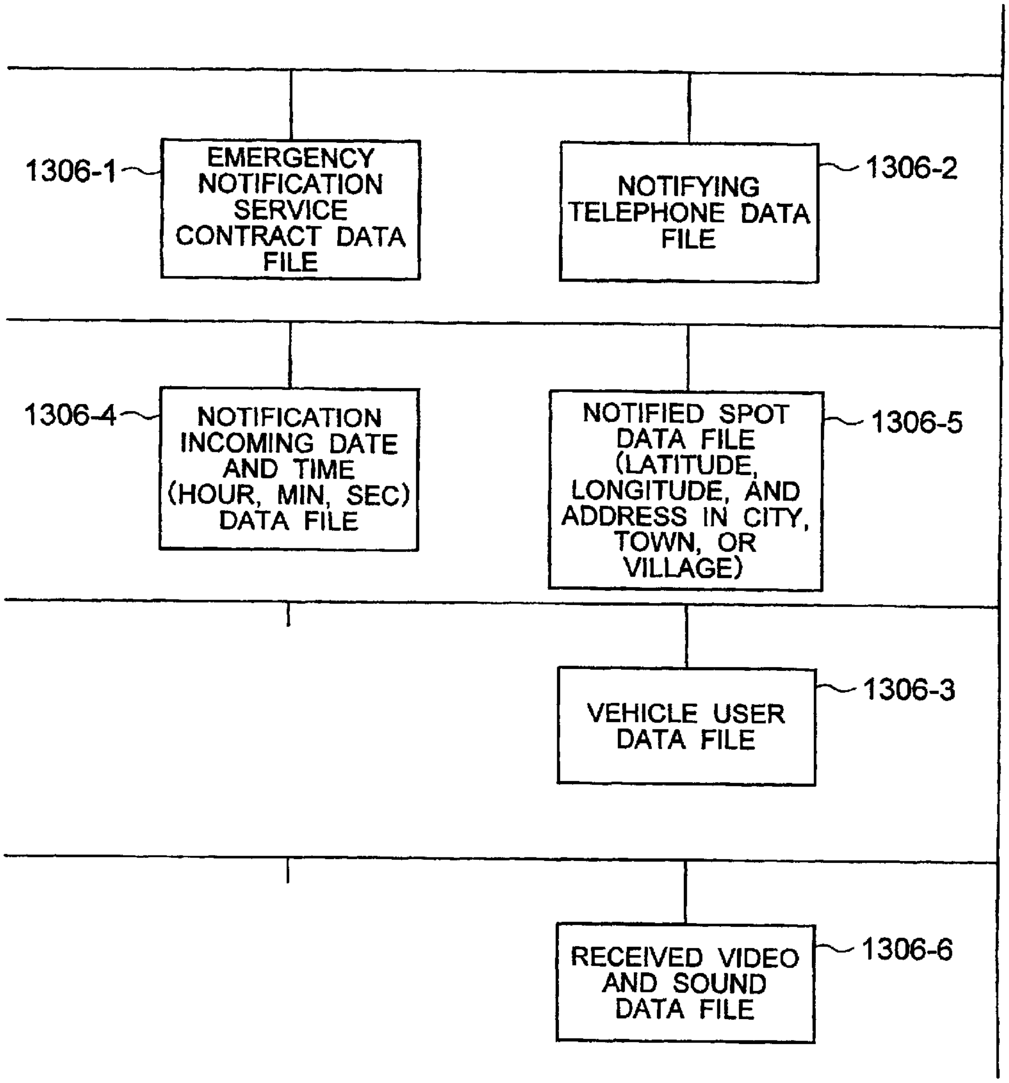
FIG. 27 is a data file diagram of a recording apparatus of an emergency notification center according to the present invention.

Referring to FIG. 27, there is shown a data file diagram of the recording apparatus 1306 of the emergency notification center 1301 according to the present invention. In this diagram, the recording apparatus 1306 has a registration of data files containing related information of the emergency notification service contract from the beginning of exchanging the emergency notification service contract between the contractors such as, for example, the object driver 1410 and the emergency notification center 1301. These data files are as follows:

"Emergency notification service contract data file" 1306-1
"Notifying telephone data file" 1306-2
"Vehicle user data file" 1306-3.

In addition, the following data files are registered as those containing data received or generated after the notification of the accident occurrence from the object driver 1410:

"Notification incoming date and time (hour, min, sec) data file" 1306-4
"Notified spot data file" 1306-5
"Received video and sound data file" 1306-6.

Figure 28:
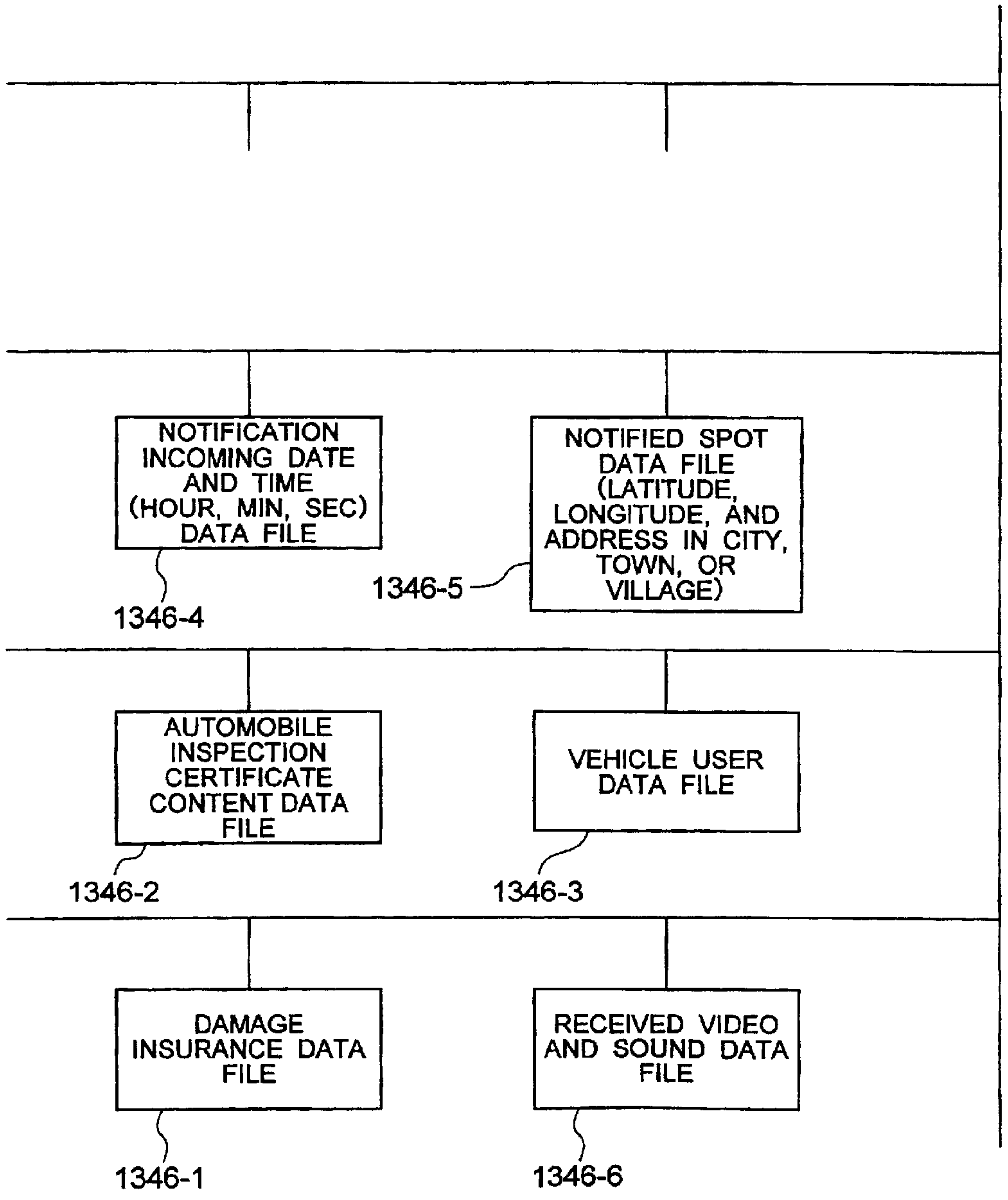
FIG. 28 is a data file diagram of a recording apparatus of a damage insurance company according to the present invention.

Referring to FIG. 28, there is shown a data file diagram of the recording apparatus 1346 of the damage insurance company A 1341 according to the present invention. In this diagram, the recording apparatus 1346 has a registration of data files containing related information of the damage insurance contract from the beginning of exchanging the damage insurance contract between the contractors such as, for example, the object driver 1410 and the casualty insurance company A 1341. These data files are as follows:

"Damage insurance data file" 1346-1
"Automobile inspection certificate content data file" 1346-2
"Vehicle user data file" 1346-3.

In addition, the following data files are registered as those containing data received or generated after the notification of the accident occurrence from the object driver 1410:

"Notification incoming date and time (hour, min, sec) data file" 1346-4
"Notified spot data file" 1346-5
"Received video and sound data file" 1346-6.

Figure 29A:
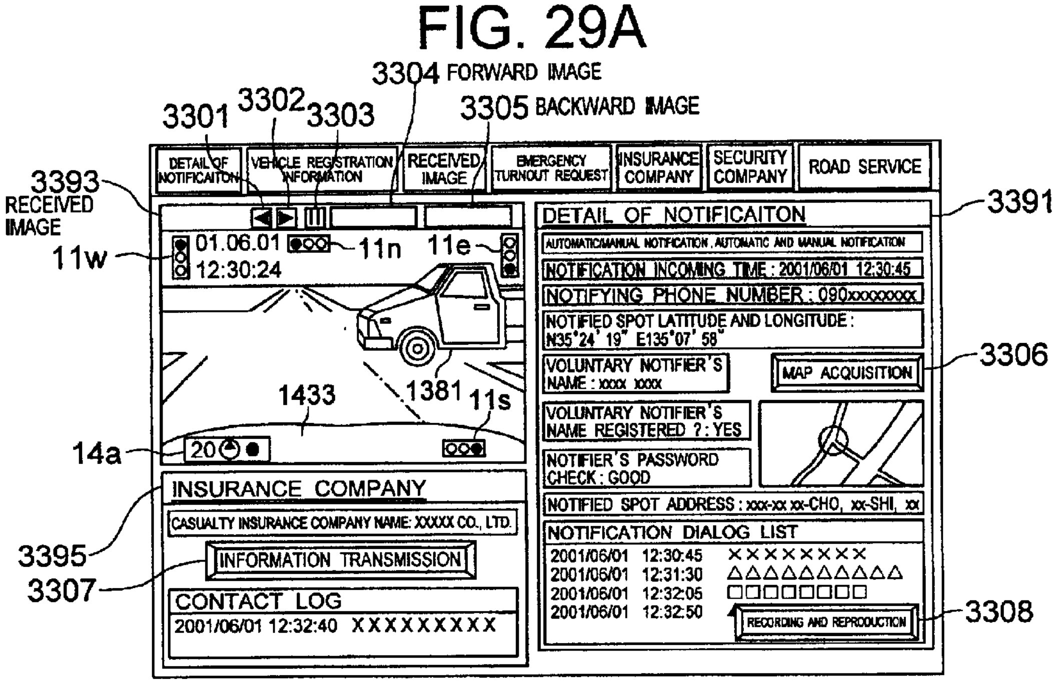
FIGS. 29A and 29B are diagrams showing typical input-output screens of a display unit used for an input-output device in the emergency notification center according to the present invention.
Figure 29B:
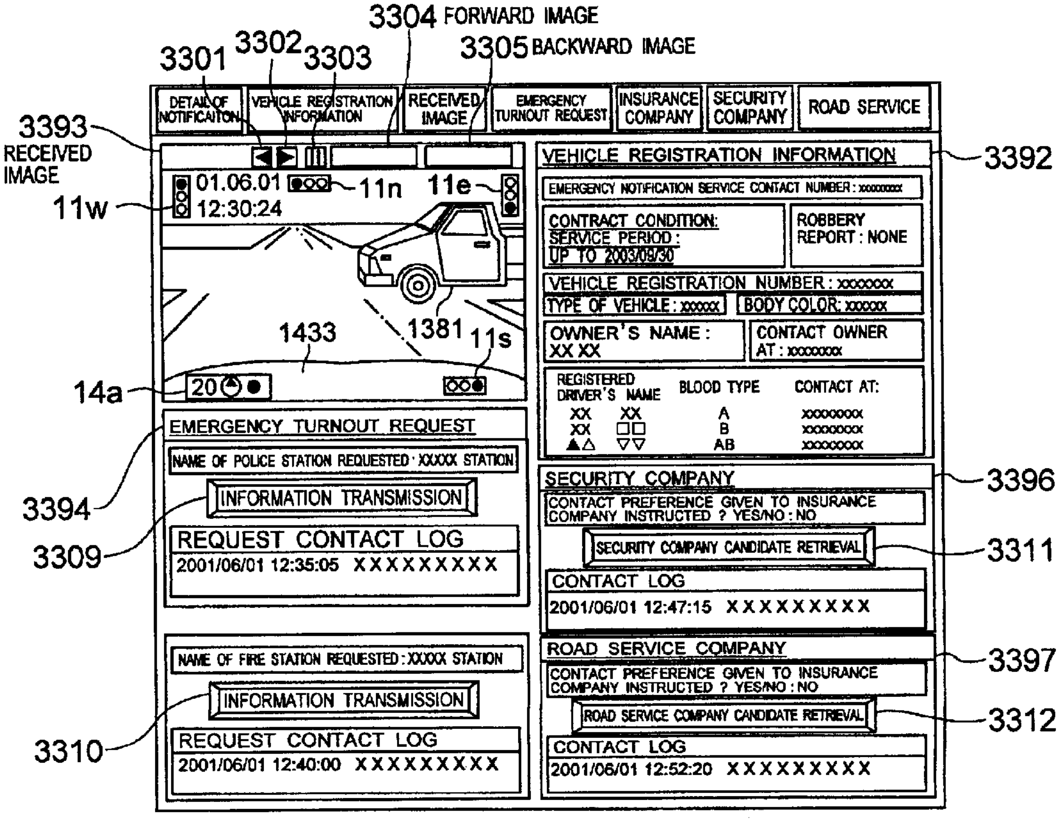

Referring to FIGS. 29A and 29B, there are shown diagrams of typical input-output screens of the display unit 1307 used for an input-output device of the operator in the emergency notification center 1301 according to the present invention. These diagrams show the sample input-output screens where the object vehicle 1433 has notified the emergency notification center 1301 of the accident occurrence. Both of FIGS. 29A and 29B are the sample input-output screens of the display unit 1307. A part of the displayed content is common to these diagrams. There is also a content displayed in one of these diagrams, but not in the other. The screen shown in FIG. 29A can be switched to the screen shown in FIG. 29B when they are displayed. In addition, they can be displayed on the screen in a combination other than that of the displayed contents shown in FIGS. 29A and 29B; for example, all displayed contents can be displayed on the screen at a time. Furthermore, it is possible to enable these displayed contents to be switched by scrolling. These display switching functions can be active in all input-output screen samples in the same manner.

In the examples shown in FIGS. 29A and 29B, the displayed content is displayed on each of seven display windows, namely, "Detail of notification," "Vehicle registration information," "Received image," "Emergency turnout request," "Insurance company," "Security company," and "Road service."

Figure 30:
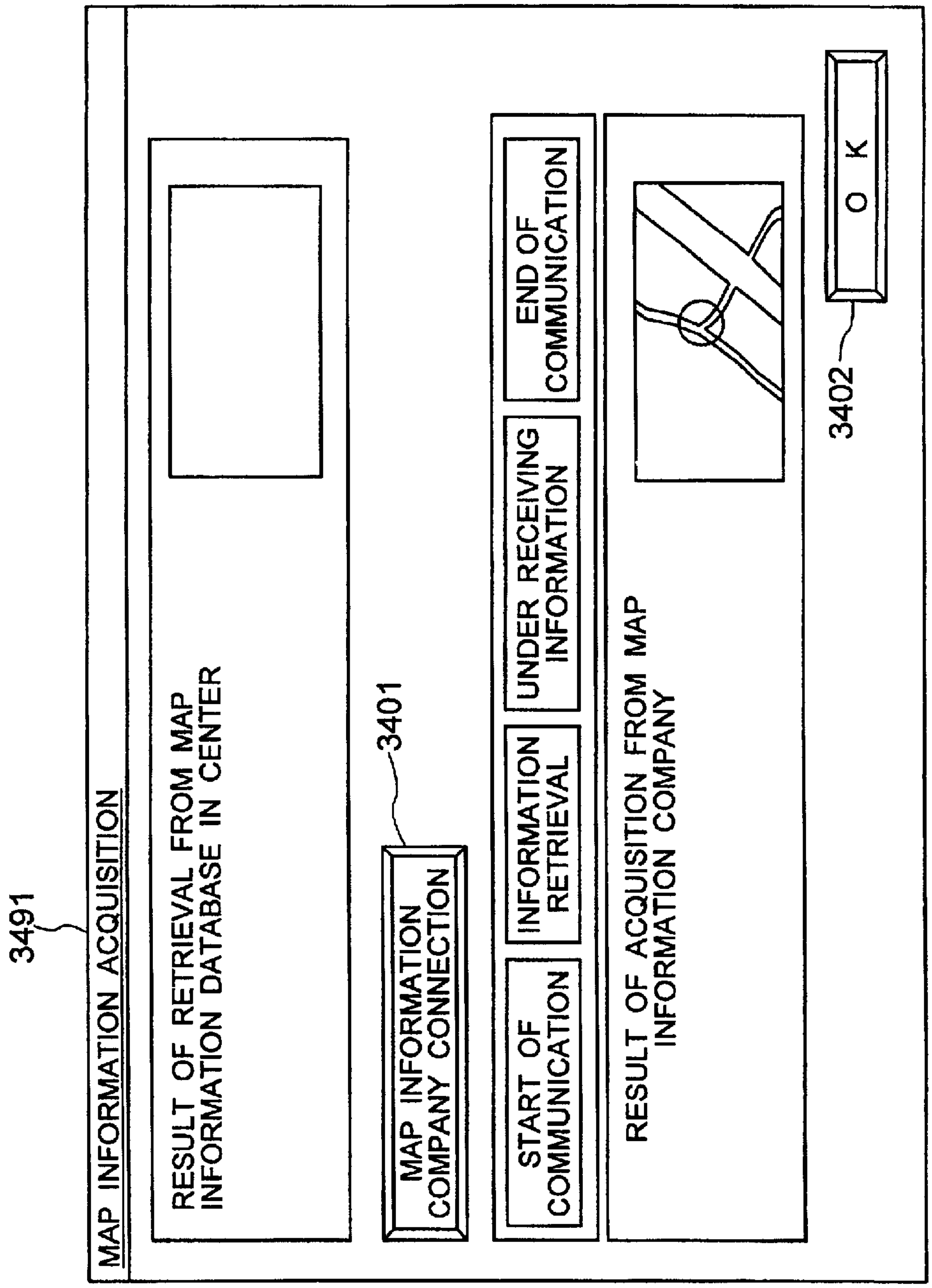
FIG. 30 is a diagram showing another typical input-output screen of the display unit used for the input-output device in the emergency notification center according to the present invention.

"Detail of notification" window 3391 shown in FIG. 29A displays whether the notification has been made automatically or manually on the basis of "the automatic/manual notification identification information" transmitted from the object vehicle 1433 by the above accident occurrence notifying operation. In addition, the time when the notification is received is detected and a result of the detection is recorded in the recording apparatus 1306, by which the notification incoming time is displayed. Furthermore, it displays a notification phone number by using "the mobile phone number" of the mobile phone 1421 received and recorded in the recording apparatus 1306 in connection with the notification. Still further, it displays notified spot latitude and longitude information by using "the position information (abnormal-condition position information)" received and recorded in the recording apparatus 1306. Additionally, a name of the calling party checked in the voice call mode is input as a voluntary notifier's name or recognized in voice, by which the input name is recorded in the recording apparatus 1306 and displayed. Additionally it is detected whether the obtained name as a result of the input or the recognition in voice is registered in a registered driver's name list of the object vehicle 1433 related to the notification recorded in the recording apparatus 1306 and then "Yes" or "No" is displayed as a result of the detection. In the same manner, it is checked that a password input by the calling party orally or with a key via the mobile phone is correct before the result of the check is input, and then the input result is recorded into the recording apparatus 1306 and displayed. Furthermore, map information related to "the abnormal-condition position information" is retrieved to display a map corresponding to a result of the retrieval. By operating a map information acquisition button 3306, "Map information acquisition" window 3491 shown in FIG. 30 is displayed, thereby enabling a map information retrieval. Furthermore, this operation is followed by a display of a place-name and an address of the notified spot extracted by using the map information. A content of a dialog between the object driver 1410 and the voice call operator of the center 1301 in the voice call is converted to a text with a speech recognition and the text is displayed on a notification dialog list. In addition, the speech can be reproduced by recording the dialog in the voice call and operating a recording and reproduction button 3308.

"Vehicle registration information" window 3392 shown in FIG. 29B displays various registration information on the vehicle 1433 to be provided with the notification service previously recorded in the recording apparatus 1306 in connection with the above notification. The various registration information includes "an emergency notification service contract number," "a contract situation," whether there is "a robbery reported," "a vehicle registration number," "a type of automobile," "a body color," "an owner's name," "an owner's contact address," and "a registered driver's name list."

"Received image" window 3393 shown in FIG. 29B displays a content of the image on the basis of the video and sound data transmitted from the object vehicle 1433. In the example of this diagram, the scene in the forward direction picked up by the TV camera 1429 of the object vehicle 1433 is selected for a display by operating a forward image button 3304. Additionally, a signal lighting color, driving information, and the front portion of the object vehicle are displayed. Furthermore, an image of the other vehicle is displayed on the right-hand side of the screen. This image information can be reproduced as animation by operating a backward reproducing button 3301 or a forward reproducing button 3302. Still further, a primary stop button 3303 is available to display a static image having a favorite image content. This "Received image" window 3393 is common to FIG. 29A and FIG. 29B on the display. In this manner the remote emergency notification center can immediately check the image including a part of the object vehicle 1433 before and after the occurrence of the abnormal condition, thereby enabling more appropriate notification transactions to be selected rapidly according to the checked content and more effective services to be focused on.

Figure 31:
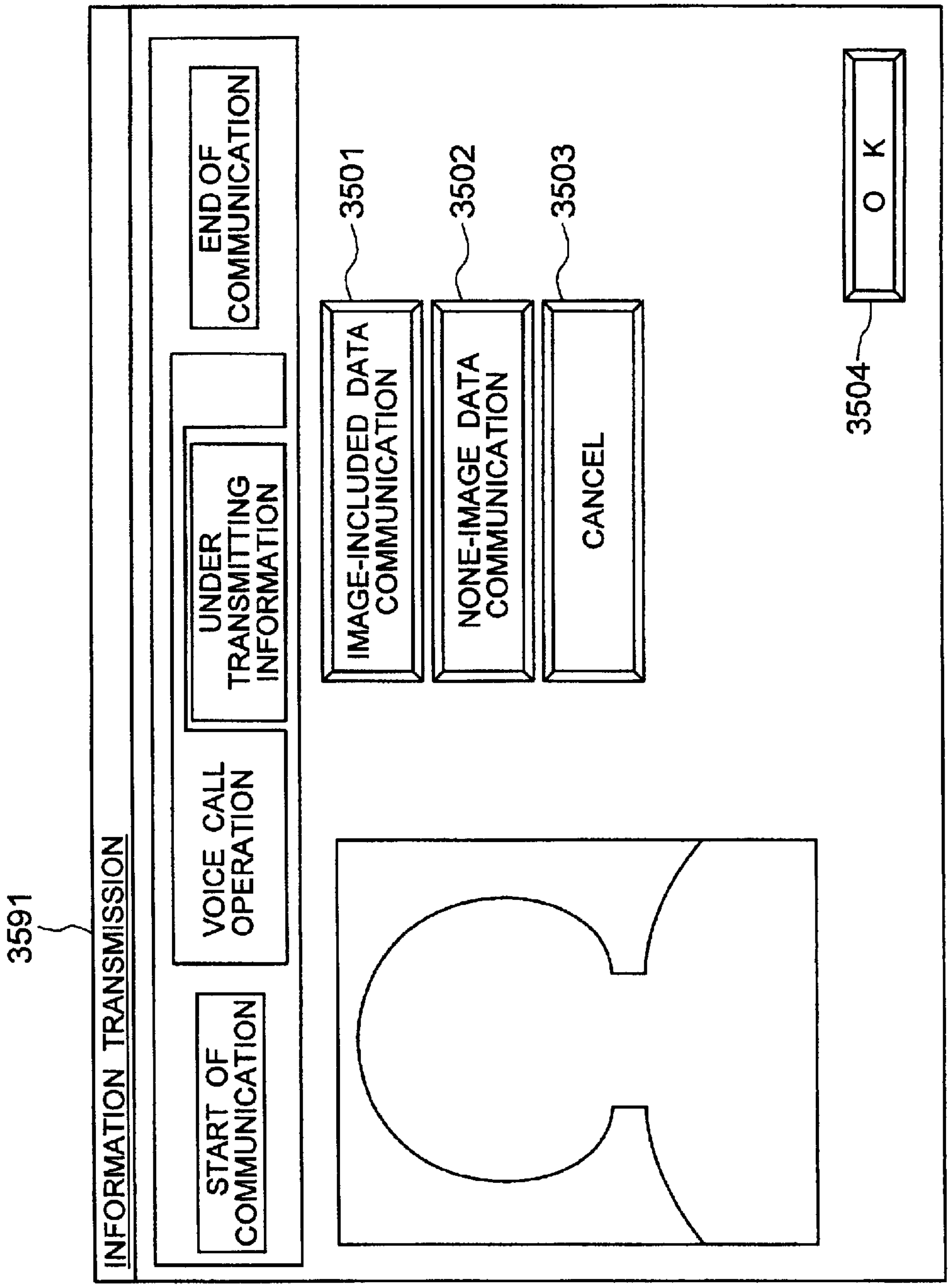
FIG. 31 is a diagram showing another typical input-output screen of the display unit used for the input-output device in the emergency notification center according to the present invention.

On "Emergency turnout request" window 3394 in FIG. 29B, the operator selects a police station and a fire station required to turn out according to "the abnormal-condition position information" out of those previously recorded on the database to display names of the selected police station and the fire station. After checking the display content, he or she operates an information transmission button 3309 or 3310 if the police station and the fire station are correct, by which "Information transmission" window 3591 shown in FIG. 31 is displayed and the operator can ask the stations to turn out. It is possible to display the transmitted or received data between the emergency notification center 1301 and the turnout requested stations or a dialog content acquired by a text conversion with a speech recognition of a voice communication between the voice call operator of the center 1301 and the turnout requested stations in the voice call in text form on the request contact log list.

"Insurance company" window 3395 in FIG. 29A displays a name of the casualty insurance company related to the accident notification. After checking the display content, an operation of the information transmission button 3309 causes the "Information transmission" window 3591 shown in FIG. 31 to appear, so that the accident can be notified by using the window. It is possible to display the transmitted or received data between the emergency notification center 1301 and the notified casualty insurance company or a dialog content acquired by a text conversion with an input or a speech recognition of a voice communication between the voice call operator of the center 1301 and the notified company in the voice call in text on the contact log list.

Figure 32:
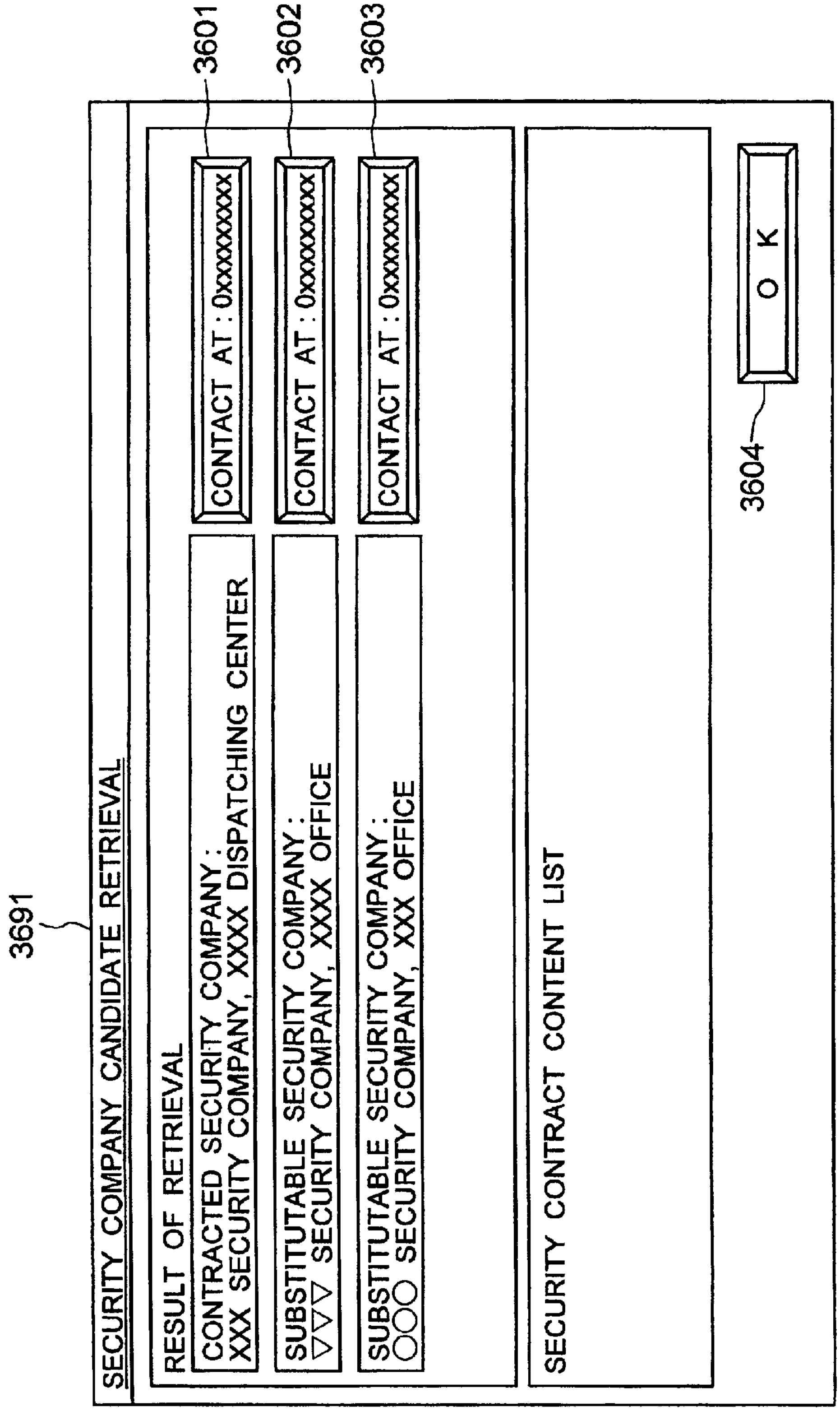
FIG. 32 is a diagram showing another typical input-output screen of the display unit used for the input-output device in the emergency notification center according to the present invention.
Figure 33:
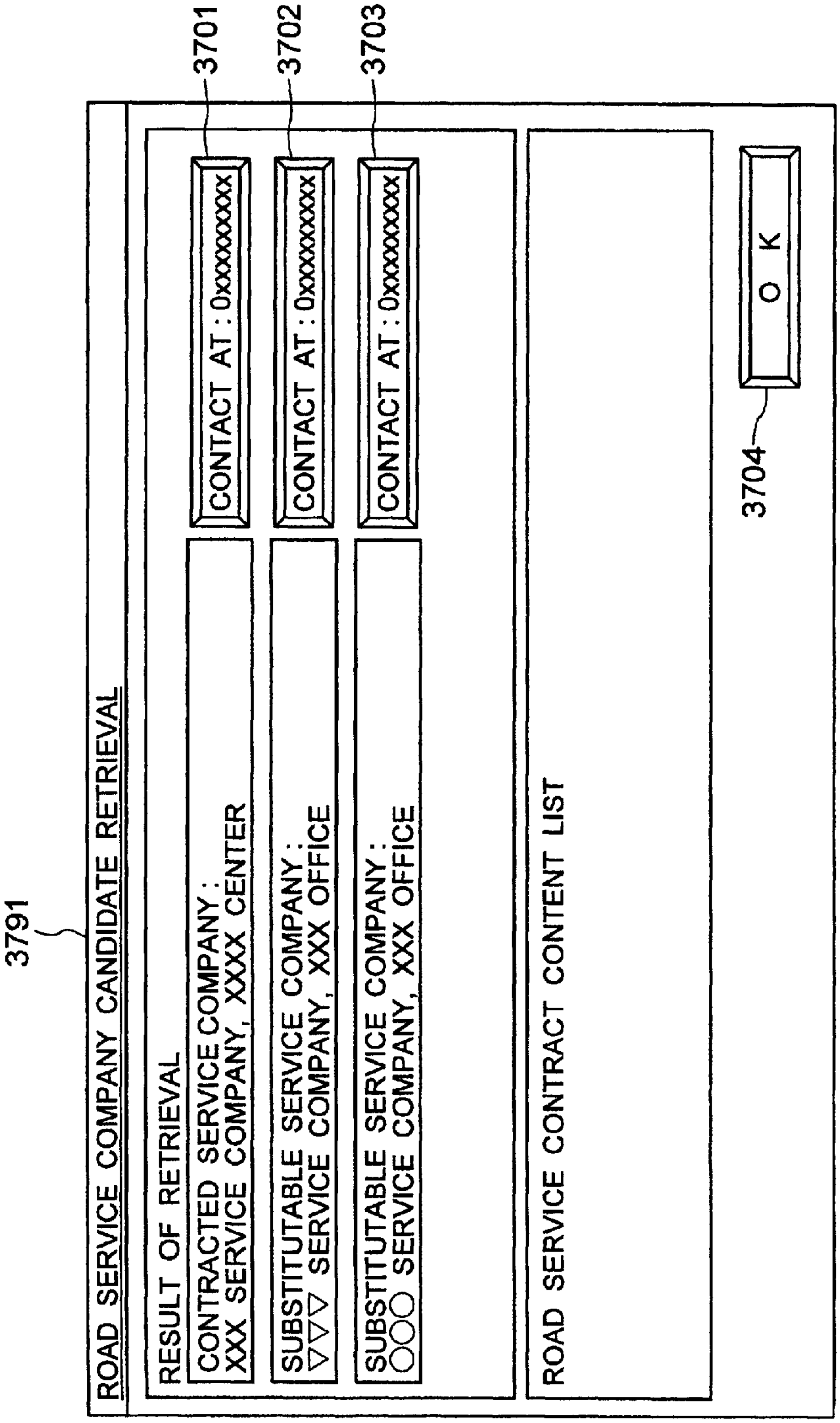
FIG. 33 is a diagram showing another typical input-output screen of the display unit used for the input-output device in the emergency notification center according to the present invention.

On "Security company" window 3396 and "Road service" window 3397 in FIG. 29B, an operation of a security company candidate retrieval button 3311 or a road service company candidate retrieval button 3312 causes each candidate retrieval window 3691 or 3791 shown in FIG. 32 or FIG. 33 to appear, so that a turnout can be requested by using the window. In addition, Yes/No for an item "Contact preference given to insurance company instructed? Yes/No" previously recorded in the database is displayed for each, by which it is possible to check that there is a need for contacting the casualty insurance company previous to contacting the security company or the road service company.

Referring to FIG. 30, there is shown a diagram of a typical input-output screen of the display unit 1307 used for the input-output device in the emergency notification center 1301 according to the present invention.

The "Map information acquisition" window 3491 shown in FIG. 30 is displayed by operating the map acquisition button 3306 on the "Detail of notification" window 3391 in FIG. 29A as described above. On this window 3491, map information is retrieved. In other words, map information related to "the abnormal-condition position information" is retrieved from a map information database in the center recorded into the recording apparatus 1306. Unless the related map information is found by the retrieval, a communication line is established via the communication network 1300 between the emergency notification center 1301 and the map company (map information company) 1361 by operating a map information company connection button 3401. A communication is started through the established communication line and first "the abnormal-condition position information" recorded into the recording apparatus 1306 of the emergency notification center 1301 is transmitted to the map company 1361. The map company 1361 retrieves map information related to the received "abnormal-condition position information" from its own map database. Then, the map company 1361 transmits the retrieved map information and the emergency notification center 1301 receives it. After the receiving, the above established communication line is ended and the communication is terminated. Then, the received map information is displayed in a display area "Result of acquisition from map information company" on the window 3491. Furthermore, it is also possible that receiving the map information automatically causes the map information to be recorded as additional data of the map information database into the recording apparatus 1306 of the emergency notification center 1301 with being associated with the transmitted "abnormal-condition position information." Still further, it is possible that the map information display in the "Result of acquisition from map information company" display area is recorded as additional data likewise by dragging it to "Result of retrieval from map information database in center" display area. When the operation is terminated, this window 3491 is closed by operating an OK button 3402.

Referring to FIG. 31, there is shown a diagram of a typical input-output screen of the display unit 1307 used for the input-output device in the emergency notification center 1301 according to the present invention.

The "Information transmission" window 3591 shown in this diagram is displayed by operating the information transmission button 3309 or 3310 on the "Emergency turn-out request" window 3394 or the information transmission button 3307 on the "Insurance company" window 3395. This window is used for an information transmission operation. In other words, a communication line is established via the communication network 1300 between the emergency notification center 1301 and one of the police station, the fire station, and the insurance company by operating an image-included data communication button 3501 or a none-image data communication button 3502. The communication is started through the established communication line and given information is exchanged. It is also possible that a voice call operation is enabled between them during or before and after the information exchange. In this diagram, an image 3505 is an image of the other voice calling party in the voice call, which has been received and displayed, thereby enabling a call while checking a face of the other calling party. When the information exchange or the voice call operation is terminated, this window 3591 is closed by operating an OK button 3504. If it is required to terminate the processing in the middle thereof, the processing can be interrupted by operating a cancel button 3503 to close the window 3591.

Referring to FIG. 32, there is shown a diagram of a typical input-output screen of the display unit 1307 used for the input-output device in the emergency notification center 1301 according to the present invention.

"Security company candidate retrieval" window 3691 shown in this diagram is displayed by operating the security company candidate retrieval button 3311 on the "Security company" window 3396 as described above. This window 3691 is used to determine a security company to be asked to turn out and to contact the determined security company. In other words, security companies are retrieved for the candidates according to the accident notification. Then, the window displays names of the extracted security company candidates and contact buttons corresponding to the candidates. FIG. 32 shows an example of three candidates listed and displayed. First, a name of a contracted security company which is a security company contracted with according to the object vehicle 1433 is displayed after retrieving the previously recorded database for the name and a contact button 3601 corresponding to it is displayed. Next, according to "the abnormal-condition position information," for example, a security company existing near the location indicated by the position information is considered to be a substitutable security company and the previously recorded database is retrieved or related information existing in sites of other companies is retrieved via a network as described later. Then, the name of the security company retrieved for and a contact button 3602 corresponding to it is displayed. In the same manner, the window displays a name of a security company retrieved for as another substitutable security company and a contact button 3603 corresponding to it. In the retrieval of the substitutable security company, it is also possible to establish a communication line between the emergency notification center 1301 and the security company, to make a transmission for the emergency notification center 1301 to inquire whether the security company can substitute for the contracted security company and to receive a response to the inquiry from the security company. With this, it is determined whether the security company can substitute on the basis of a content of the response and it can be further determined whether the security company is listed in the "Security company candidate retrieval" window 3691 according to a result of the determination.

Subsequently, a contact button is operated, which corresponds to a security company to be asked to turn out among the contact buttons 3601 to 3603. This causes a communication line to be established via the communication network 1300 between the emergency notification center 1301 and the security company so as to exchange information. Otherwise, they communicate with each other in a voice call. If the information exchange or the voice call operation is terminated, an OK button 3604 is operated to close this window 3691.

Referring to FIG. 33, there is shown a diagram of a typical input-output screen of the display unit 1307 used for the input-output device in the emergency notification center 1301 according to the present invention.

"Road service company candidate retrieval" window 3791 shown in this diagram is displayed by operating the road service company candidate retrieval button 3312 on the "Road service company" window 3397 as described above. This window 3791 is used to determine a road service company to be asked to turn out and to contact the determined road service company. In other words, candidates of the road service companies are retrieved for according to the accident notification. Then, the window displays names of the road service companies to be candidates retrieved for and contact buttons corresponding to the candidates. FIG. 33 shows an example of three candidates listed and displayed. First, a name of a contracted service company which is a road service company contracted with according to the object vehicle 1433 is displayed after retrieving the previously recorded database for the name and a contact button 3701 corresponding to it is displayed. Next, according to "the abnormal-condition position information," for example, a road service company existing near the location indicated by the position information is considered to be a substitutable service company and the previously recorded database is retrieved or related information existing in sites of other companies is retrieved via a network as described later. Then, the name of the road service company retrieved for and a contact button 3702 corresponding to it is displayed. In the same manner, the window displays a name of a road service company retrieved for as another substitutable service company and a contact button 3703 corresponding to it. In the retrieval of the substitutable service company, it is also possible to establish a communication line between the emergency notification center 1301 and the road service company, to make a transmission for the emergency notification center 1301 to inquire whether the service company can substitute for the contracted service company and to receive a response to the inquiry from the road service company. With this, it is determined whether the road service company can substitute on the basis of a content of the response and it can be further determined whether the road service company is listed on the "Road service company candidate retrieval" window 3791 according to a result of the determination.

Subsequently, is operated a contact button corresponding to a road service company to be asked to turn out among the contact buttons 3701 to 3703. This causes a communication line to be established via the communication network 1300 between the emergency notification center 1301 and the road service company so as to exchange information. Otherwise, they communicate with each other in a voice call. If the information exchange or the voice call operation is terminated, an OK button 3704 is operated to close this window 3791.

Figure 34:
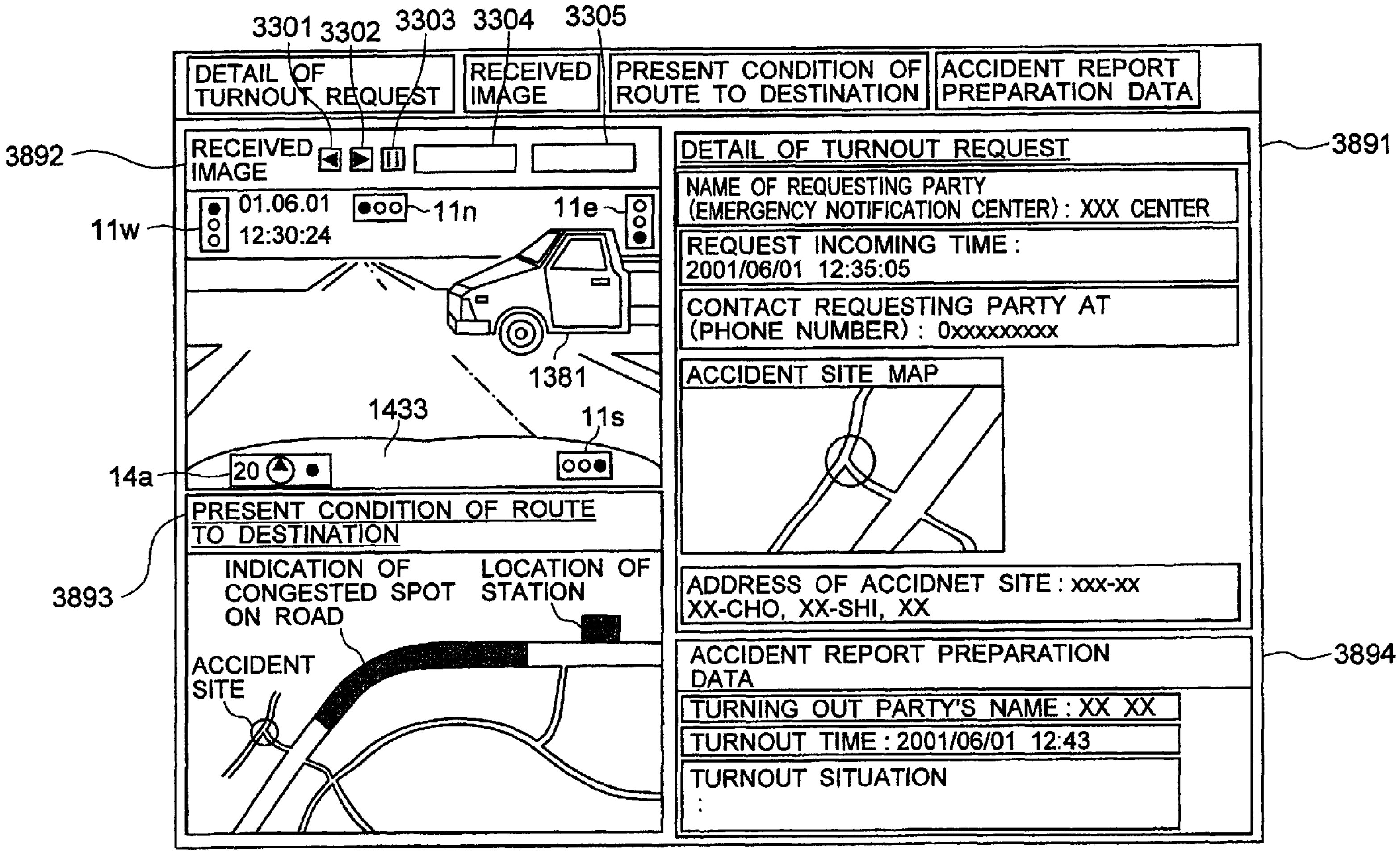
FIG. 34 is a diagram showing a typical input-output screen of a display unit used for an input-output device in a police organization or a fire defense organization according to the present invention.

Referring to FIG. 34, there is shown a diagram of a typical input-output screen of a display unit 1317 used for an input-output device of an operator in a police organization or a fire defense organization 1311 according to the present invention. In an example given in this diagram, there is shown an input-output screen displayed when the emergency notification center 1301 has asked the organization to turn out; this display contains four display windows, "Detail of turnout request," "Received image," "Present condition of route to destination," and "Accident report preparation data."

The "Detail of turnout request" window 3891 displays a name of a party requesting the turnout, for example, a center name of the emergency notification center. Furthermore, the window displays time when a request signal is received from the requesting party, a phone number by which the requesting party is contacted and the like. Still further, The display unit receives map information, a place-name of the accident site and its address transmitted by the emergency notification center 1301 which is a requesting party and displays a map according to the map information and the place-name of the accident site and its address.

On the "Received image" window 3892, there is received video and sound data transmitted by the emergency notification center 1301 which is the turnout requesting party and displayed contents of images according to the video and sound data. In this example, the window is similar to the "Received image" window 3393 in FIG. 29 in the above. Therefore, its description is omitted here.

In this manner the operator at the remote police or fire defense organization can immediately check the image including a part of the object vehicle 1433 before and after the occurrence of the abnormal condition, thereby enabling more appropriate accident settlement transactions or first aid and critical care services to be selected rapidly according to the checked content and more effective services to be focused on.

The "Present condition of route to destination" window 3893 displays a map further for displaying the accident site and the locations of the police station and the fire station to turn out. Furthermore, the current road situation, for example, congested spots are displayed on this map by using another road condition data. This enables a retrieval of an optimum route from the location of the police station or the fire station to the accident site. It should be noted that data generated by a road traffic information center or the like, which is not shown, can be received via the communication line 1300 as the road condition data.

The "Accident report preparation data" window 3892 is used to generate and display data for an accident report by combining various turnout records or obtained information.

Figure 35:
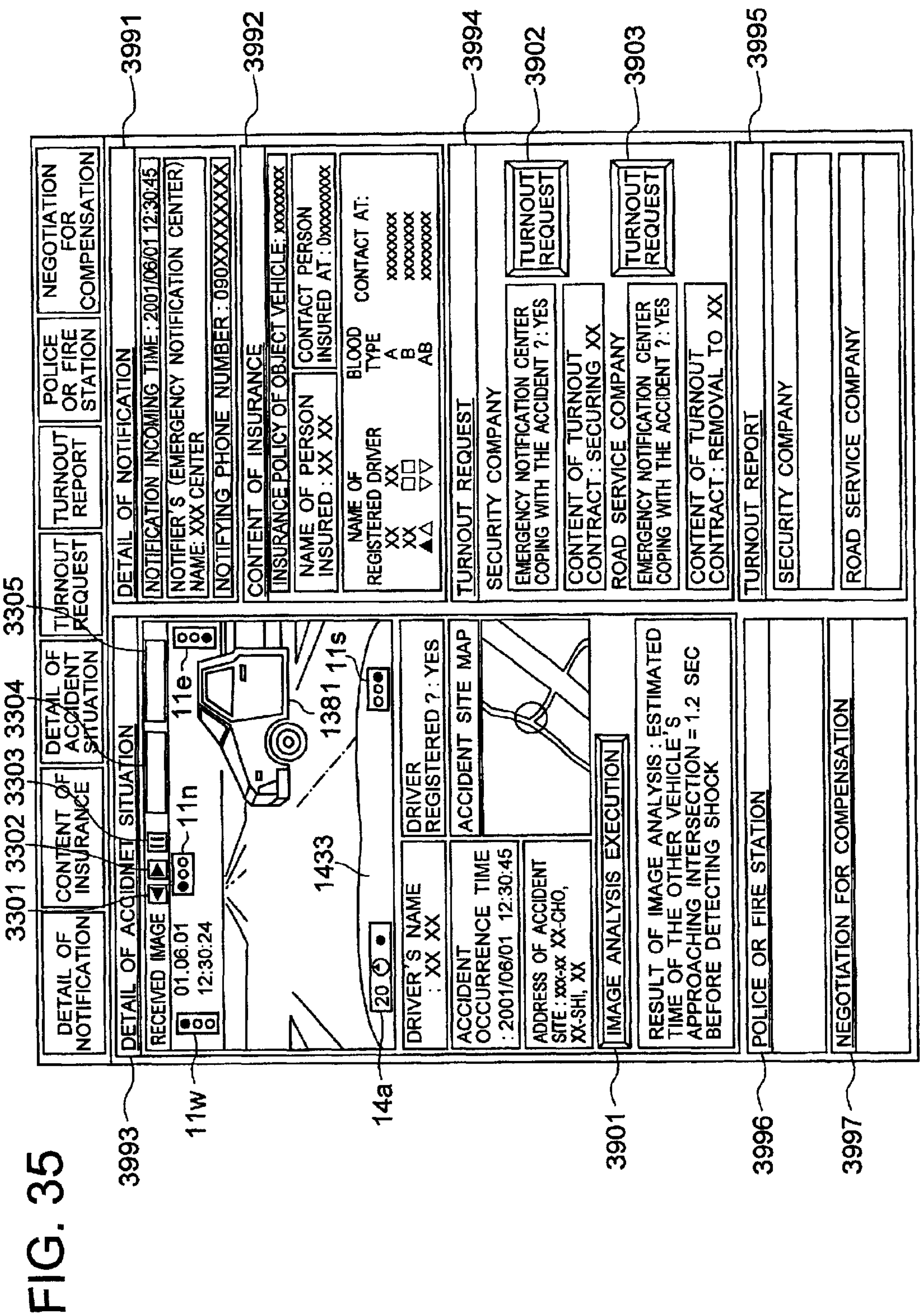
FIG. 35 is a diagram showing a typical input-output screen of a display unit used for an input-output device in the casualty insurance company according to the present invention.

Referring to FIG. 35, there is shown a diagram of a typical input-output screen of a display unit 1347 used for an input-output device of an operator in the casualty insurance company A 1341 according to the present invention. In an example given in this diagram, there is shown an input-output screen displayed when the emergency notification center 1301 has notified the insurance company of an accident; this display contains seven display windows, "Detail of notification," "Content of insurance," "Detail of accident situation," "Turnout request," "Turnout report," "Police or fire station," and "Negotiation for compensation."

When the emergency notification center 1301 which is a notifier transmits a given accident occurrence notification signal and the transmitter-receiver 1342 of the casualty insurance company A 1341 receives the signal via the communication network 1300, the "Detail of notification" window 3991 displays the receiving time as notification incoming time and the notification incoming time is input and recorded into the recording apparatus 1346 of the casualty insurance company A 1341. Furthermore, the window displays the center name of the emergency notification center 1301 included in the accident occurrence notification signal received as notifier's name and the notifier's name is input and recorded into the recording apparatus 1346. In the same manner, the window displays the notification phone number of the notifier and it is input and recorded into the recording apparatus 1346.

The "Content of insurance" window 3992 displays various information obtained by inputting and recording the "emergency notification service contract number" or its corresponding unique "license plate number" or "automobile insurance policy number of the object vehicle" related to the object vehicle 1433 transmitted by the emergency notification center 1301 and received via the communication network 1300 into the recording apparatus 1346 and extracting an automobile insurance policy number of the object vehicle, a name of a person insured, a contact address of a person insured, and a registered driver's name list from the related information retained in the casualty insurance contract content database in the recording apparatus 1346 on the basis of the recorded information.

When the transmitter-receiver 1342 receives a recorded video signal transmitted by the emergency notification center 1301 via the communication network 1300 and the signal is input and recorded into the recording apparatus 1346 via the signal bus 1344, the "Detail of accident situation" window 3993 displays the content of the image with the recorded video signal likewise the received image display shown in FIG. 29 and FIG. 34 in the above. In this manner the operator at the remote casualty insurance company can immediately check the image including a part of the object vehicle 1433 before and after the occurrence of the abnormal condition, thereby enabling more appropriate insurance services to be selected rapidly according to the checked content and more effective services to be focused on.

Furthermore, this window displays a driver's name, accident occurrence time, an address of an accident site, and an accident site map as information related to the accident situation when the emergency notification center 1301 transmits the information and the transmitter-receiver 1342 receives it via the communication network 1300.

It is checked that the above-received driver's name is registered on the registered driver's name list previously recorded in the recording apparatus 1346. It is also possible to change a part of the damage insurance services of the casualty insurance company A 1341 so as to enable more efficient services according to a result of the check.

Furthermore, the "Detail of accident situation" window 3993 displays an image analysis execution button 3901 for analyzing an image of each recorded video signal to detect a subject image taken in the video signal and activating a function of detecting a correlation of the objects for each detected subject image and a display area for displaying a result of the image analysis. The control unit 1345 performs data processing on the basis of the video signals recorded in the recording apparatus 1346 complying with image analysis program software retained in the recording apparatus 1646 and then the storage device 1346 stores a result of the processing, by which the image analysis processing is executed. At this point, an operation of the image analysis execution button 3901 causes "Image analysis execution" window 4091 shown in FIG. 36 to appear and an analysis operation is executed by using the window.

Figure 43:
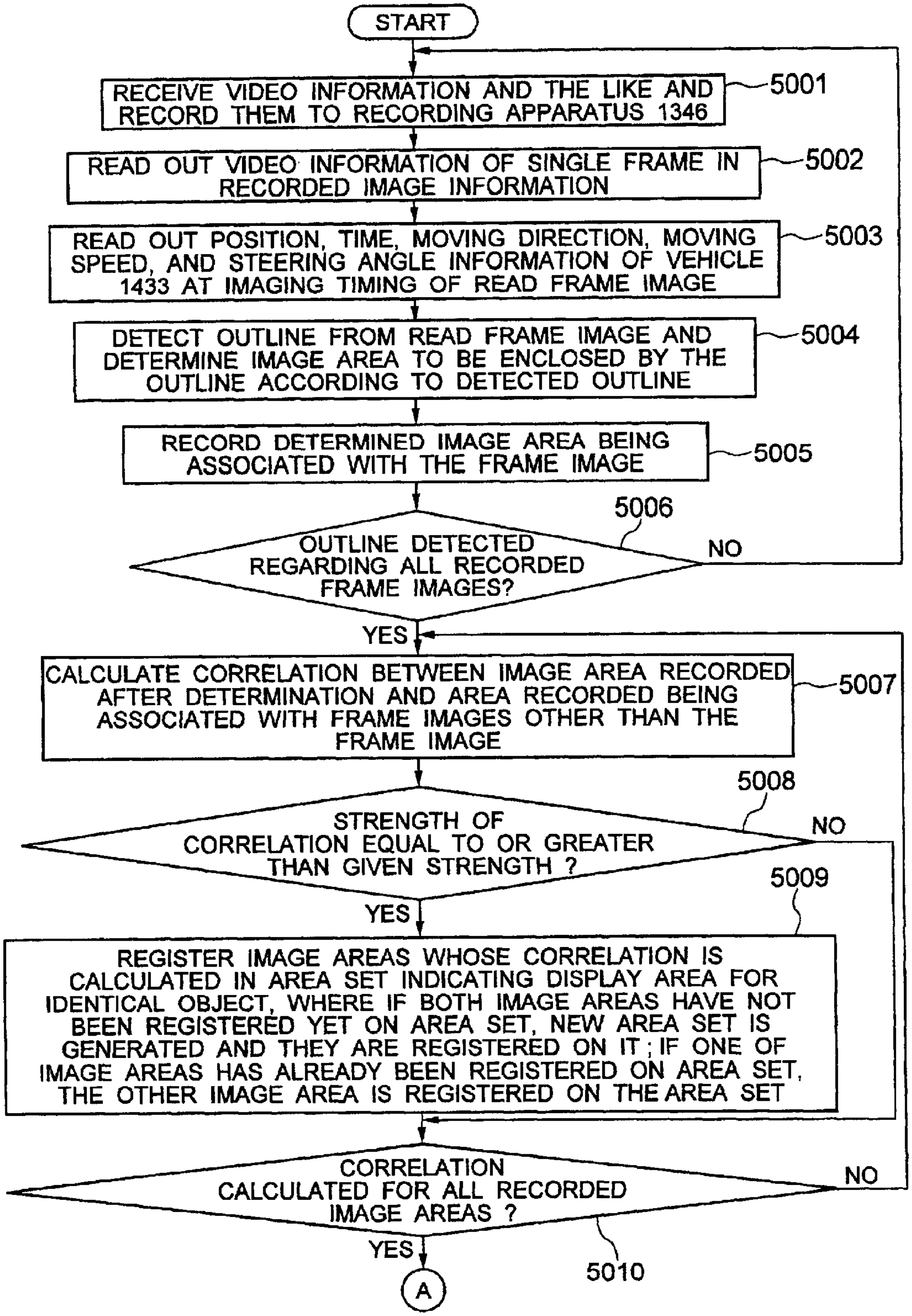
FIG. 43 is a flowchart of an image analysis operation according to the present invention.
Figure 44:
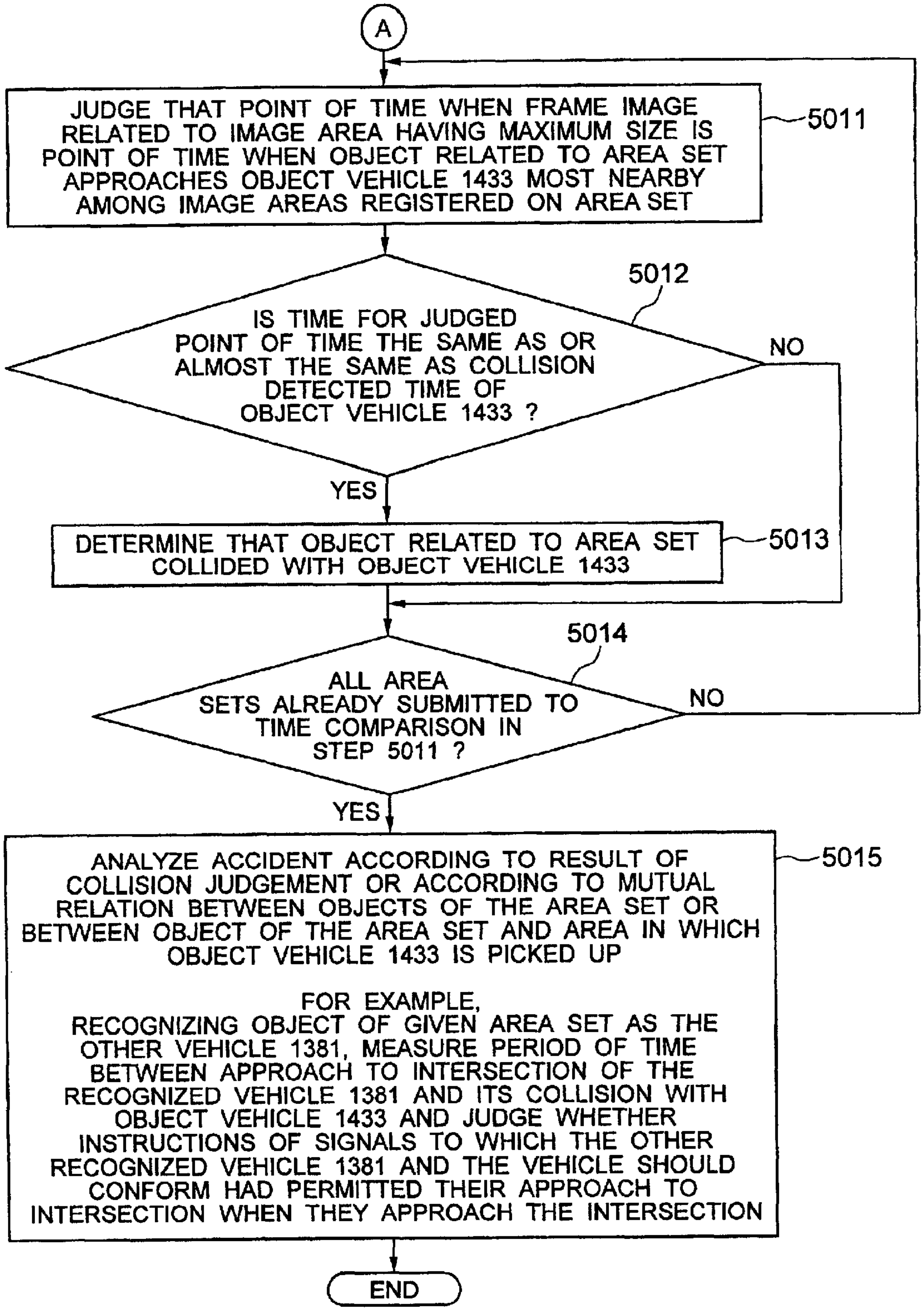
FIG. 44 is a continuation of the flowchart shown in FIG. 43.

Subsequently, a concrete example of the image analysis operation is described by referring to FIG. 43 to FIG. 45. Referring to FIGS. 43 and 44, there are shown diagrams of a sample image analysis operation flow of a casualty insurance company according to the present invention. In step 5001, the insurance company receives video information and other information such as, for example, position information of the object vehicle 1433, time information, moving direction information, moving speed information, and steering angle information from the emergency notification center 1301. Then, the received information is recorded into the recording apparatus 1346. The video information receiving in the step 5001 is the same as the recorded video data receiving in the step 2302 shown in FIG. 23. Subsequently in step 5002, video information of a single frame image, namely, frame image information is read out from the recorded video information to as to be used for information processing in the control unit 1345. In step 5003, the position information, the time information, the moving direction information, the moving speed information, and the steering angle information are read out at the picking up timing of the read frame image information in the same manner. Then, in step 5004, outline detecting processing is executed for the frame image of the read frame image information. An image area to be enclosed by the detected outline is determined according to the outline obtained as a result of the detection. In step 5005, the determined image area is recorded with being associated with the frame image information. The operation from the above steps 5002 to 5005 is performed for each frame image information until it is determined in step 5006 whether the operation is executed for all frame image information or for given frame image information.

Next, in step 5007, a correlation is calculated between the image area recorded after the determination in the above and the area recorded with being associated with frame image information other than the frame image information related to the image area. Then, if the strength of the correlation is equal to or greater than a given strength in step 5008, the control proceeds to step 5009. If not, the control proceeds to step 5010. In the step 5009, image areas whose correlation is calculated are registered in an area set indicating a display area for an identical object. If both of the image areas have not been registered yet on the area set at this point, a new area set is generated and they are registered on it. If one of the image areas has already been registered on an area set, the other image area is registered on the area set. Then, in step 5010, it is determined whether a correlation is calculated for all recorded image areas; if there are image areas whose correlation has not been calculated yet, the control proceeds to the step 5007 to repeat the operation in the step 5008 and the step 5009 for the areas. If it is determined that correlation is calculated for all recorded image areas in the step 5010, the control proceeds to step 5011. In the step 5011, the picking-up point of time when the frame image related to an area having the maximum size is judged to be a point of time when the object related to the area set approaches the object vehicle 1433 most nearby among the image areas registered on the area set. In step 5012, it is determined whether the time for the judged point of time is the same as or almost the same as a collision detected time of the object vehicle 1433; if so, the control proceeds to step 5013. If not, the control proceeds to step 5014. In the step 5013, a collision judgement is made as that the object related to the area set collided with the object vehicle 1433. In the step 5014, it is judged whether all area sets have already been submitted to the time comparison in the step 5011; if so, the control proceeds to step 5015. If not, the control returns to the step 5011. Then, in the step 5015, the accident is analyzed according to a result of the collision judgement or according to a mutual relation between objects of the area set or between an object of the area set and an area in which the object vehicle 1433 is picked up. For example, an object of a given area set is recognized as the other vehicle 1381. A period of time is measured between an approach to the intersection of the other vehicle 1381 having been recognized and its collision with the object vehicle 1433. Then, it is judged whether instructions of the signals which the other recognized vehicle 1381 and the vehicle should conform to had permitted their approach to the intersection when they approach the intersection.

Figure 45:
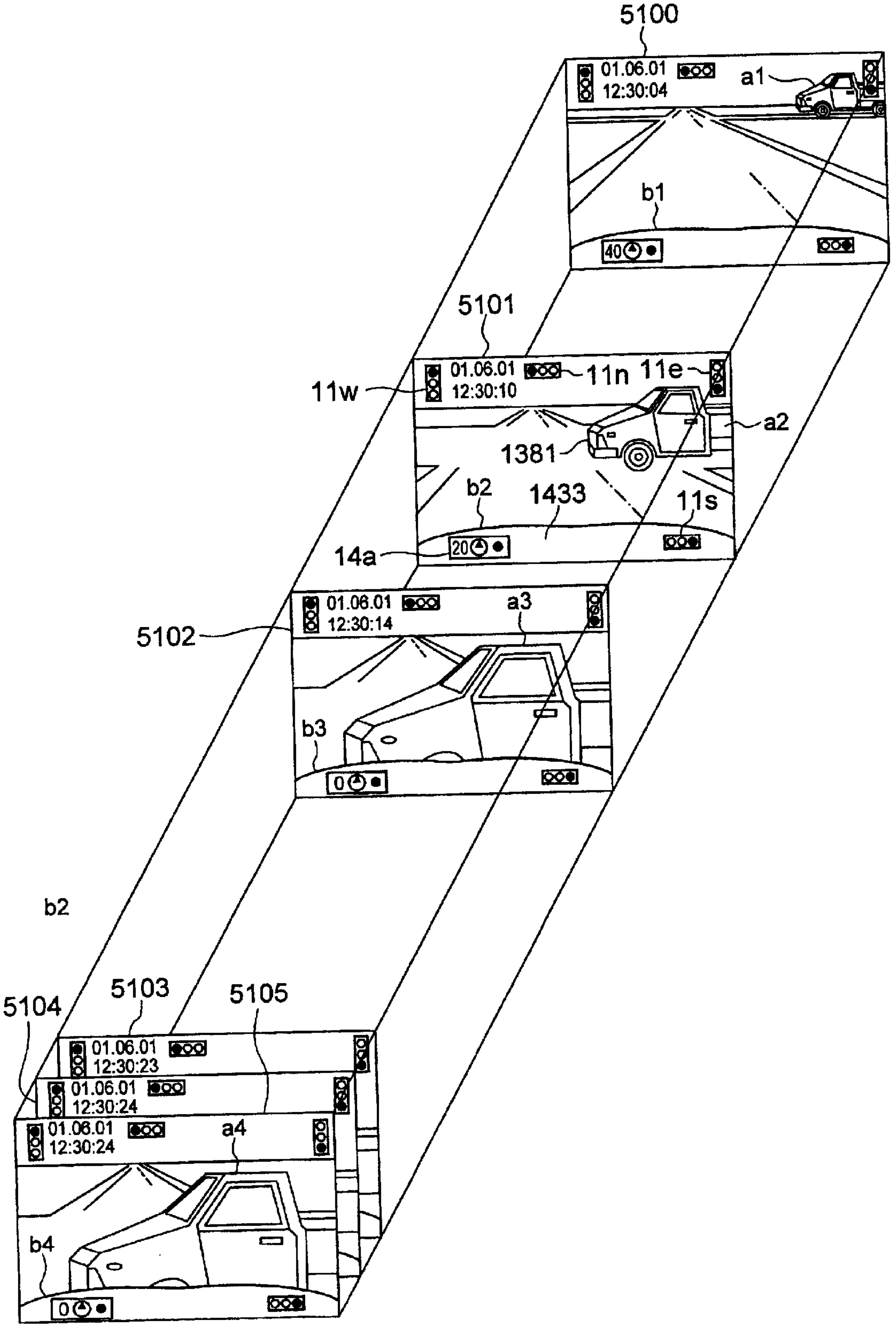
FIG. 45 is a time series display of frame images picked up by a TV camera mounted on a moving object.

Referring to FIG. 45, there is shown a content of video information comprising a plurality of frame images from the object vehicle 1433 represented by a display screen line of the frame images. FIG. 45 shows a part of the frame images of the video information, including a display screen 5100 which is a display screen of a frame image taken and recorded first, a display screen 5101 which is a display screen of a frame image taken and recorded approx. 6 sec thereafter, a display screen 5102 which is a display screen of a frame image taken and recorded when the collision is detected, and a display screen 5105 which is a display screen of a frame image taken and recorded last 10 sec after the collision detected time. This example assumes that almost the same scenes having no variation are picked up on the display screen 5102, the display screen 5103, the display screen 5104 of the frame image taken after a single frame period, and the display screen 5105 of the frame image taken after a single frame period further; particularly, there is no variation in a physical relationship between the object vehicle 1433 and the other vehicle 1381.

In FIG. 45, an image area of the other vehicle 1381 is picked up as shown by area al on the display screen 5100. Likewise, it is picked up as shown by area a2 on the display screen 5101, area a3 on the display screen 5102, and area a4 on the display screen 5105 and these areas a1, a2, a3, and a4 are registered on an area set of the other vehicle 1381 which is an identical area set according to the above analysis operation. As for the front portion of the object vehicle 1433, areas b1, b2, b3, and b4 are registered on an area set related to the front portion of the object vehicle.

Among the areas registered on the area set of the other vehicle 1381, the area b3 has the maximum size in comparison with other areas and further the first area having the maximum size in a condition that there are a plurality of areas having the same maximum size, and therefore it is determined that the time when the frame image of this area b3 is picked up is the first time when the other vehicle 1381 approaches the object vehicle 1433 the most nearby. Furthermore, the time when the frame image is picked up is 10 sec after the start of picking up of the video information and 10 sec before stopping the operation, and therefore it is determined to be the same as the shock detected time. Accordingly, according to these determinations, the object vehicle 1433 collided with the other vehicle 1381.

The frame images can be analyzed with receiving the video information as set forth hereinabove, by which the accident situation can be grasped in the very early stage of the accident occurrence on the basis of the video information and analysis result, thereby enabling more efficient insurance services such as various checking works according to the grasped situation.

Figure 37:
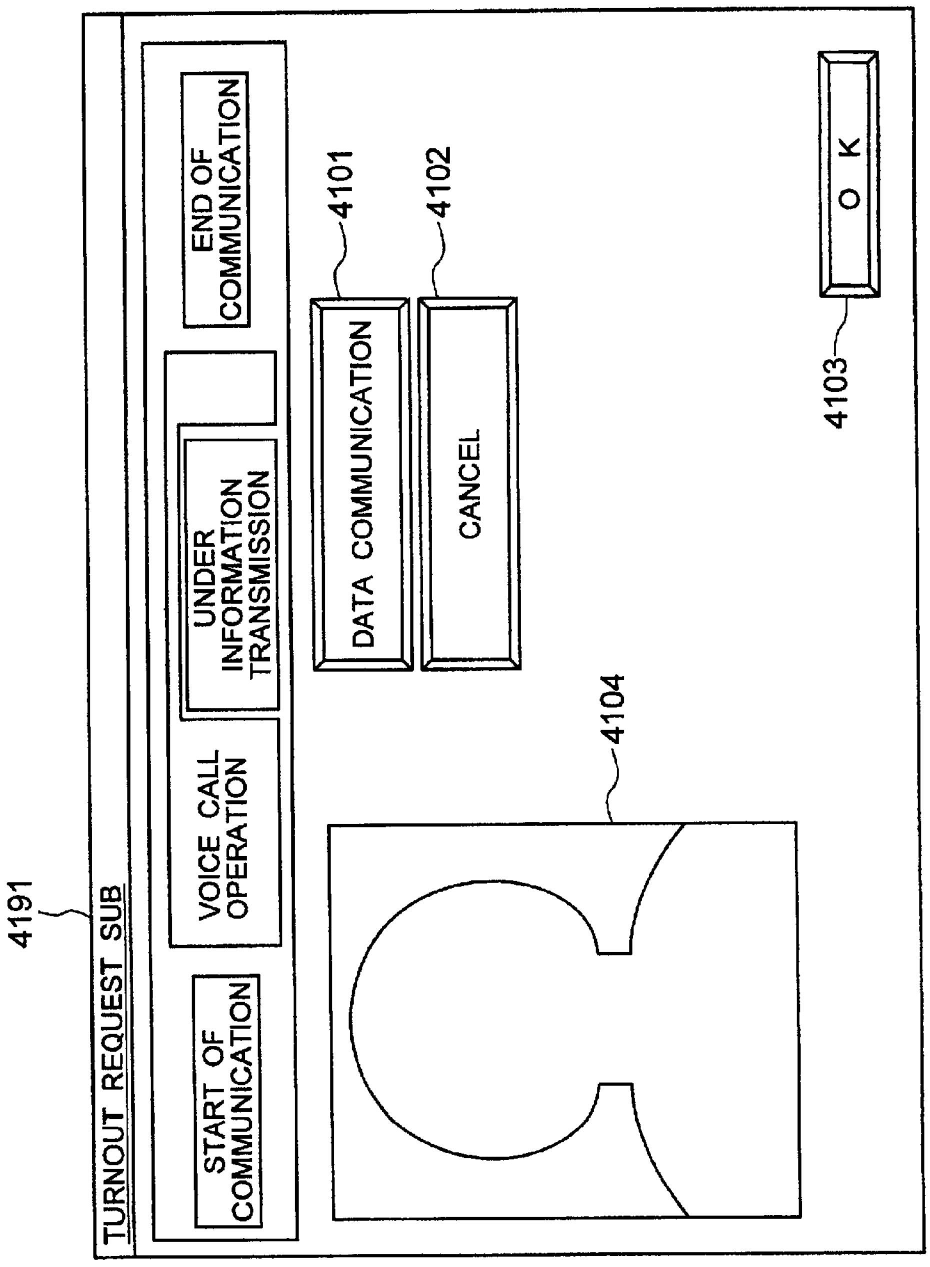
FIG. 37 is a diagram showing another typical input-output screen of the display unit used for the input-output device in the casualty insurance company according to the present invention.

On the "Turnout request" window 3994, a turnout request subwindow 4191 shown in FIG. 37 appears by operating a turnout request button 3902 or 3903 regarding a security company and a road service company and a turnout can be requested for each by using the subwindow.

On the "Turnout report" window 3995, each turnout result report transmitted by the security company or the road service company requested to turn out and received by the transmitter-receiver 1342 via the communication network 1300 is recorded into the recording apparatus 1346 and displayed.

On the "Police or fire station" window 3996, a content of communication exchanged between a police or fire defense organization 1311 and the casualty insurance company A 1341 via the communication network 1300 is recorded into the recording apparatus 1346 and displayed.

On the "Negotiation for compensation" window 3997, a content of communication exchanged between the casualty insurance company B 1371 and the casualty insurance company A 1341 via the communication network 1300, particularly, a content of the negotiation for compensation is recorded into the recording apparatus and displayed.

Figure 36:
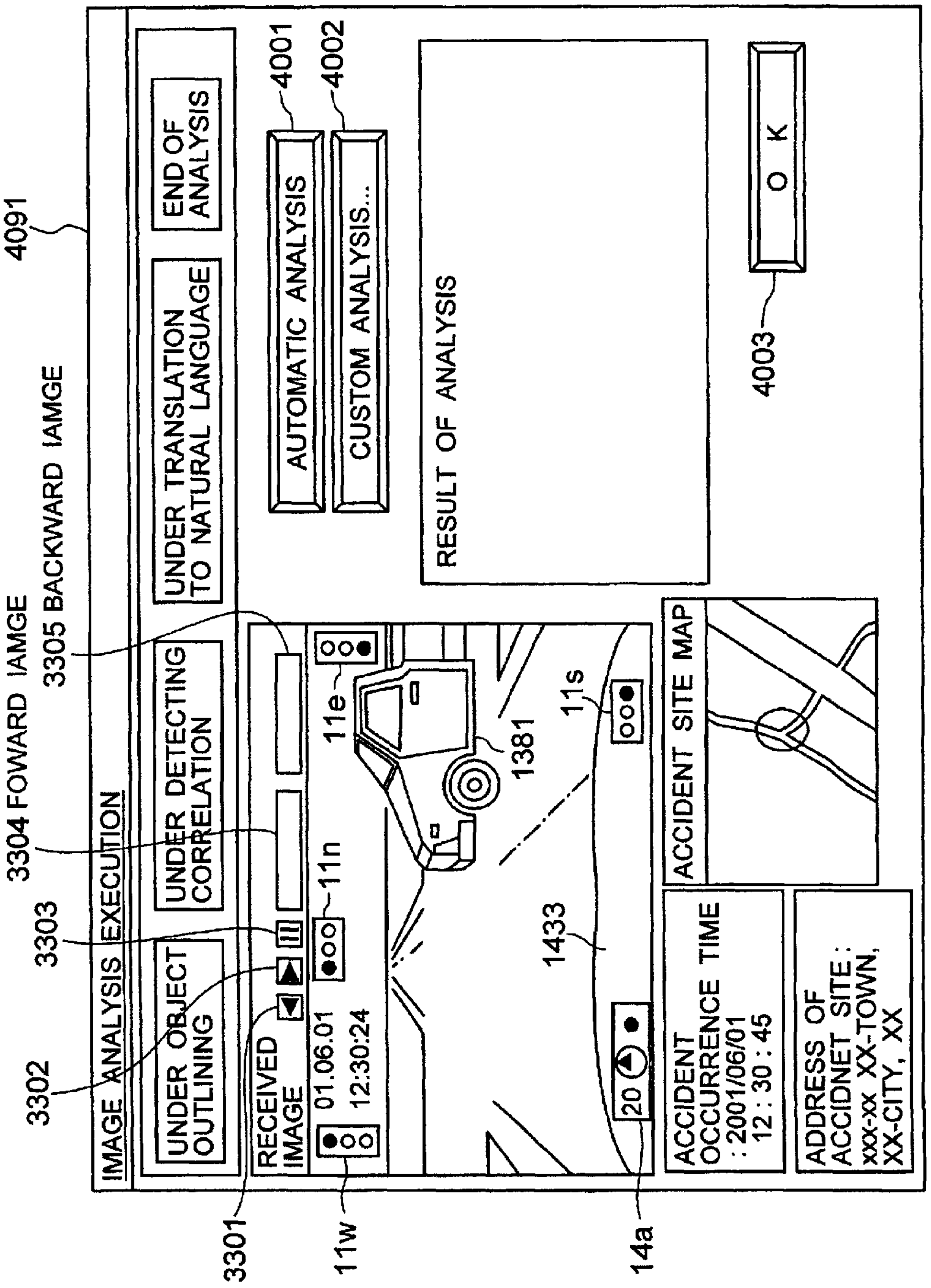
FIG. 36 is a diagram showing another typical input-output screen of the display unit used for the input-output device in the casualty insurance company according to the present invention.

Referring to FIG. 36, there is shown a diagram of a typical input-output screen of the display unit 1347 used for the input-output device in the casualty insurance company A 1341 according to the present invention, particularly, an example of "Image analysis execution" window 4091 for executing an image analysis. This diagram shows a display having the same content as for the "Detail of accident situation" window 3993 in the above FIG. 35, a received image, accident occurrence time, an address of an accident site, and an accident site map. Furthermore, this diagram shows a display of an automatic analysis button 4001 and a custom analysis button 4002 for executing the analysis operation and an image analysis is executed by operating one of these buttons.

On the "Turnout request" window 3994, the turnout request window 4191 appears by operating the turnout request button 3902 or 3903 regarding the security company or the road service company, and a turnout can be requested for each by using it.

Referring to FIG. 37, there is shown a diagram of a typical input-output screen of the display unit 1347 used for the input-output device in the casualty insurance company A 1341 according to the present invention.

The "Turnout request sub" window 4191 shown in this diagram appears by operating the turnout request button 3902 or 3903 of the "Turnout request" window 3994 as described above. This window 4191 is used for a turnout request operation. In other words, with operating a data communication button 4101, a communication line is established between the casualty insurance company A 1341 and a security company or a road service company via the communication network 1300. A communication is started via the established communication line and given information is exchanged. A mutual voice call operation can be enabled during the information exchange or before and after that. In this window, there is shown an image 4104, which is a taken image of the other voice calling party in the voice call, thereby enabling a communication while checking the face of the other calling party. When the information exchange or the voice call operation terminates, the OK button 4103 is operated to close the window 4191. If the processing is terminated in the middle of it, it is possible to operate a cancel button 4102 to interrupt the processing operation and to close the window 4191.

Figure 38:
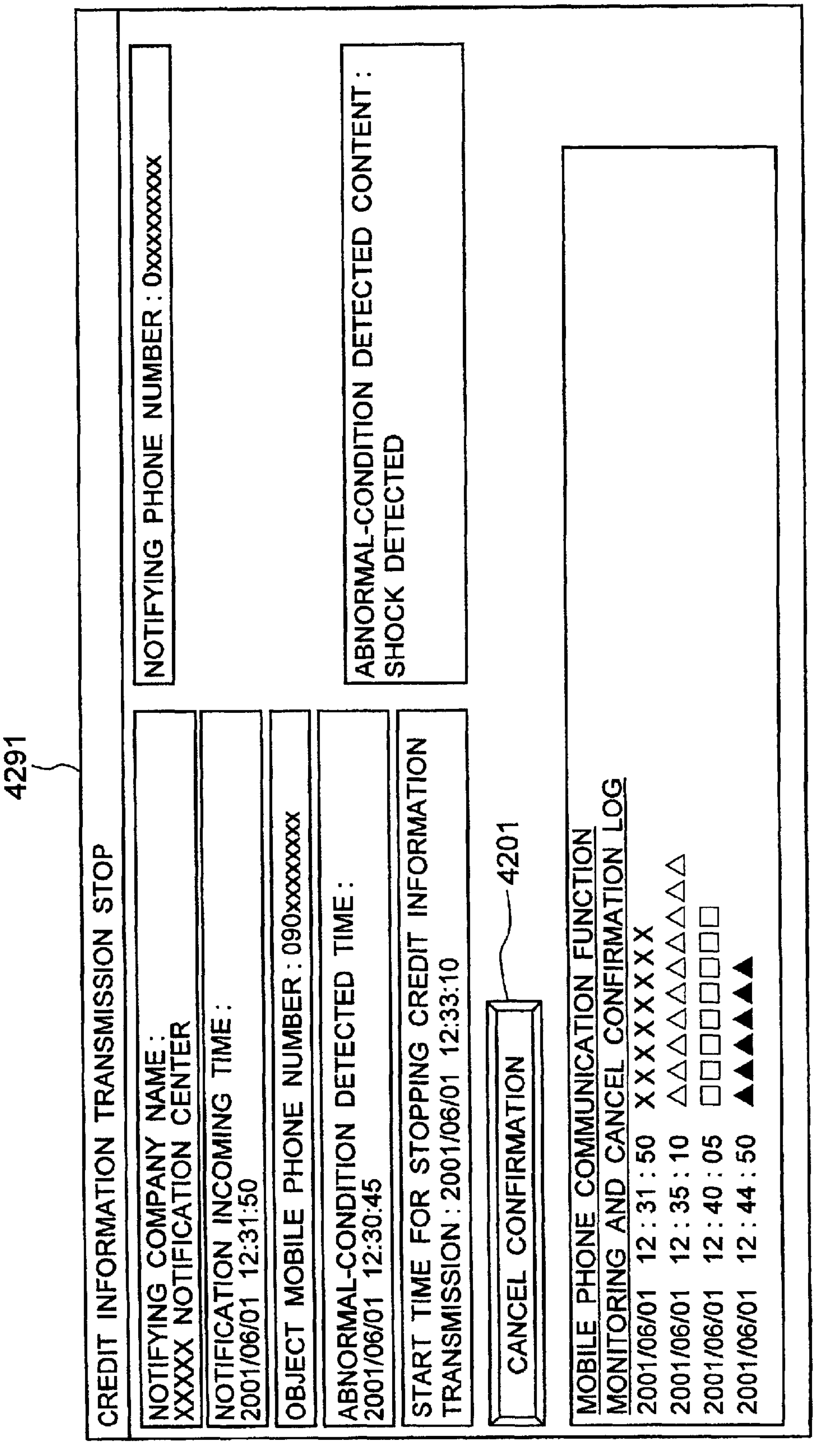
FIG. 38 is a diagram showing a typical input-output screen of a display unit in a mobile phone company according to the present invention.

Referring to FIG. 38, there is shown a diagram of a typical input-output screen of a display unit 1357 in the mobile phone company 1351 according to the present invention. Referring to this diagram, "Credit information stop" window 4291 in the diagram is displayed when a given abnormal-condition notification signal transmitted by the emergency notification center 1301 which is the notifier 1301 is received by the control unit 1355 via the communication network 1300. This window 4291 is useful to check the credit information stop operation. In other words, an abnormal-condition notification signal receiving time is displayed as notification incoming time. On this window, there is also displayed a center name of the emergency notification center 1301 included in the received abnormal-condition notification signal at the transmission as a notifying company name. In the same manner, it displays the notification phone number and further a phone number of the object mobile phone 1421 which is a source of the occurrence of the abnormal condition likewise received. Furthermore, the abnormal-condition detected time is received and displayed in the same manner. Still further, an abnormal-condition detected content is likewise received and displayed. Receiving the above abnormal-condition notification signal, the display unit 1355 establishes a communication line between the control unit 1355 of the mobile phone company 1351 and the object mobile phone 1421 via the communication network 1300. A communication is started through the established communication line and the control unit 1355 transmits a function limitation control signal to the object mobile phone 1421. Then, the object mobile phone 1421 receives the function limitation control signal, thereby limiting functions of the object mobile phone 1421 by inhibiting an operation of a credit information transmission function in the transmission function of the object mobile phone 1421. In another case, the functions of the communication network 1300 are limited by inhibiting an operation of a function of outputting credit information from the object mobile phone 1421 in the data transmission function related to the mobile phone 1421 in the communication network 1300. Subsequently, the window 4291 displays a starting time of stopping the credit information transmission, which is a starting time of stopping the function.

For canceling the function stop after the credit information transmission function is stopped as described above, there is provided a cancel confirmation button 4201 on this window 4291. To cancel the function stop, operate the cancel confirmation button 4201. Then, "Credit information transmission stop—Cancel confirmation" window 4391 shown in FIG. 39 appears.

While the emergency notification center 1301 transmits the abnormal-condition notification signal to the mobile phone company 1351 in the above example, it is also possible that the object mobile phone 1421 put in the abnormal condition transmits the abnormal-condition notification signal to the mobile phone company 1351.

Figure 39:
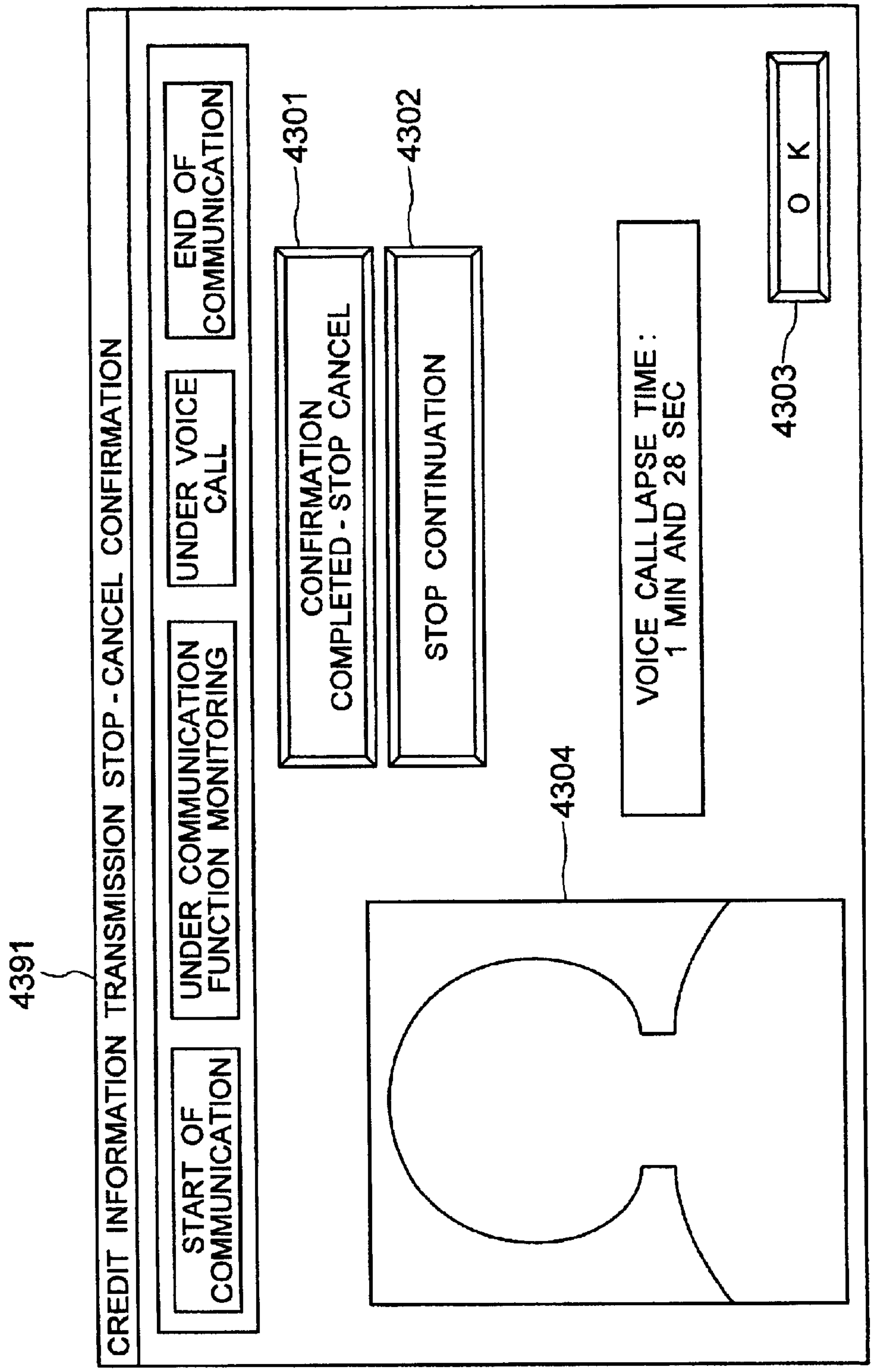
FIG. 39 is a diagram showing another typical input-output screen of the display unit in the mobile phone company according to the present invention.

Referring to FIG. 39, there is shown a diagram of another typical input-output screen of the display unit 1357 in the mobile phone company 1351 according to the present invention.

The "Credit information transmission stop—Cancel confirmation" window 4391 shown in this diagram appears by operating the cancel confirmation button 4201 on the "Credit information transmission stop" window 4291 as set forth in the above. This window 4391 is used to cancel the credit information transmission function stop operation. In other words, a communication line is established between the control unit 1355 of the mobile phone company 1351 and the object mobile phone 1421 via the communication network 1300 by operating a confirmation completed and stop cancel button 4301. A communication is started through the established communication line and the control unit 1355 transmits a function limitation cancel signal to the object mobile phone 1421. Then, the object mobile phone 1421 receives the function limitation cancel signal, thereby canceling the function limitation so that the object mobile phone 1421 recovers the credit information transmission function so as to operate. In another case, the function limitation of the communication network 1300 is canceled so as to recover a function for outputting the credit information from the object mobile phone 1421 to operate in the data transmission function related to the mobile phone 1421 in the communication network. After the communication line is established and the communication is started, the communication function of the object mobile phone 1421 is monitored for a given period and a voice call is started between the object mobile phone 1421 and the mobile phone company 1351. At that time, a voice call lapse time is measured and displayed. If it is considered that the voice calling party of the object mobile phone 1421 speaks nothing until after a given lapse of time, the stop cancel operation is abandoned and then a "Stop continuation" button 4302 is operated, thereby resuming the state previous to executing the stop cancel operation so as to leave the function in the limited condition. On other hand, when the stop function cancel operation or the voice call operation terminates, an OK button 4304 is operated to close this window 4391.

In this window, there is shown an image 4304, which is a taken image of the other voice calling party in the voice call, thereby enabling a communication while checking the face of the other calling party. This image is displayed when the object mobile phone 1421 has a picking up camera for picking up the voice calling party.

As set forth hereinabove, according to the present invention, rapid and appropriate first aid and critical care activities can be performed even at such a serious accident that a driver cannot make a response, thereby not only preventing a wound person from getting serious or seriously losing a life caused by a delay of coping with an accident, but also acquiring video and sound records before and after the occurrence of a traffic accident so as to be used for examining accident preventive measures or for determining liabilities for traffic accident compensation.

Furthermore, according to the second embodiment, both drivers tend to make opposite claims such that they are permitted to approach the intersection with an indication of a green signal at each signal on their traveling roads at the judgement of the liabilities for the traffic accident compensation and even if their claims are opposite to each other, it is possible to prevent unreasonable measures such as forcing a party having no liability to pay unnecessary share and to realize more effective system for analyzing the causes of the accident.

Still further, according to the third embodiment, the present invention provides higher effects on judgement of liabilities for traffic accident compensation or on analyzing causes of the accident.

Furthermore, according to the present invention, a casualty insurance company can grasp a situation before and after the accident occurrence rapidly and accurately, thereby analyzing causes of the traffic accident immediately.

Still further, according to the present invention, the credit information transmission function of a mobile phone after the accident can be temporarily limited to enhance an security of the credit information transmitted by the mobile phone.

It should be further understood by those skilled in the art that the foregoing description has been made on embodiments of the invention and that various changes and modifications may be made in the invention without departing from the spirit of the invention and the scope of the appended claims.

What is claimed is:

1. An emergency information notifying apparatus of a moving object, comprising:

at least one image pick-up device for picking up images where a part of said moving object comes in sight a range of a view field of said image pick-up device;

a first recording apparatus for recording video signals from said image pick-up device, said first recording apparatus having a function of iterative recording, a first transmitter for transmitting said video signals recorded in said first recording apparatus to a predetermined base station;

a first control unit for controlling an operation of said first recording apparatus and said first transmitter;

a signal generator for generating a command signal on the basis of a shock to said moving object, wherein said first control unit stops the recording operation of said first recording apparatus after a lapse of a predetermined time from the timing when the shock is applied to said moving object based on the signal from said signal generator;

a first receiver for receiving the command signal from said base station; and a global positioning system, wherein said first receiver further has a function of receiving a first signal indicating a lighting state of a traffic signal arranged at a place where said moving object passes and said first control unit superposes said first signal indicating the lighting state of said traffic signal and a position signal from said global positioning system on said video signals from said first recording apparatus and transmits them to said base station via said first transmitter when a level of the signal from said signal generator exceeds a predetermined value.

2. The apparatus according to claim 1, wherein said moving object is an automobile and further includes a second recording apparatus, and wherein said second recording apparatus records information relating to at least one of a speed of said automobile, its steering angle, and an amount of its brake pedal operation, and the information recorded in said second recording apparatus is transmitted from said first transmitter to said base station on the basis of a command from said first control unit.

3. An emergency information notifying system between an emergency information notifying apparatus of a moving object and a base station installed at an emergency notification center, said emergency information notifying apparatus, comprising:

at least one image pick-up device for picking up images where a part of said moving object comes in sight a range of a view field of said image pick-up device, a first recording apparatus for recording video signals from said image pick-up device, said first recording apparatus having a function of iterative recording, a first transmitter for transmitting said video signals recorded in said first recording apparatus to a predetermined base station, a first control unit for controlling an operation of said first recording apparatus and said first transmitter, and a signal generator for generating a command signal on the basis of a shock to said moving object, wherein said first control unit stops the recording operation of said first recording apparatus after a lapse of a predetermined time from the timing when the shock is applied to said moving object on the basis of the signal from said signal generator; and said base station, comprising:

a second receiver for receiving said video signal from said first transmitter, a second transmitter for transmitting a command signal from said base station, a third storage device for recording at least said video signal among signals transmitted from said first transmitter, a display unit for monitoring said video signals, and a second control unit for controlling said second receiver, said second transmitter, and said display unit, wherein, said second control unit notifies information relating to an accident which has occurred at moving object to at least one of a police station, a fire station, a security company, a mobile phone company, a casualty insurance company, and a road service company, when said second receiver receives a command signal generated based on the shock to said moving object, wherein said emergency information notifying apparatus further comprises a first receiver for receiving said command signal from said base station and a GPS positioning system, wherein said first control unit superposes a position signal from said GPS positioning system on said video signals from said first recording apparatus and transmits them to said base station via said first transmitter, when a level of the signal from said signal generator exceeds a predetermined value, wherein said base station displays said video signals and said position signal transmitted from said emergency information notifying apparatus on said display unit, wherein said first receiver further has a function of receiving a first signal indicating a lighting state of a traffic signal arranged at a place where said moving object passes, and said first transmitter superposes said first signal indicating the lighting state of said traffic signal and the position signal from said global positioning system on said video signals from said first recording apparatus and transmits them to said base station, and wherein said base station further comprises a lighting pattern signal generator for generating a lighting pattern signal based on said first signal indicating the lighting state of said traffic signal, and said display unit superposes and displays the lighting pattern of said traffic signal output from said lighting pattem signal generator on said video signals transmitted from said emergency information notifying apparatus.

4. The system according to claim 3, wherein said second transmitter of said base station transmits said video information to at least one of said police station, said fire station and said casualty insurance company.

5. An emergency information notifying system between an emergency information notifying apparatus of a moving object and a base station installed at an emergency notification center, said emergency information notifying apparatus, comprising:

at least one image pick-up device for picking up images where a part of said moving object comes in sight a range of a view field of said image pick-up device, a first recording apparatus for recording video signals from said image pick-up device, said first recording apparatus having a function of iterative recording, a first transmitter for transmitting said video signals recorded in said first recording apparatus to a predetermined base station, a first control unit for controlling an operation of said first recording apparatus and said first transmitter, and a signal generator for generating a command signal on the basis of a shock to said moving object, wherein said first control unit stops the recording operation of said first recording apparatus after a lapse of a predetermined time from the timing when the shock is applied to said moving object on the basis of the signal from said signal generator; and said base station, comprising:

a second receiver for receiving said video signal from said first transmitter, a second transmitter for transmitting a command signal from said base station, a third storage device for recording at least said video signal among signals transmitted from said first transmitter, a display unit for monitoring said video signals, and a second control unit for controlling said second receiver, said second transmitter, and said display unit, wherein, said second control unit notifies information relating to an accident which has occurred at moving object to at least one of a police station, a fire station, a security company, a mobile phone company, a casualty insurance company, and a road service company, when said second receiver receives a command signal generated based on the shock to said moving object, wherein said emergency information notifying apparatus further comprises a first receiver for receiving said command signal from said base station and a GPS positioning system, wherein said first control unit superposes a position signal from said GPS positioning system on said video signals from said first recording apparatus and transmits them to said base station via said first transmitter, when a level of the signal from said signal generator exceeds a predetermined value, wherein said base station displays said video signals and said position signal transmitted from said emergency information notifying apparatus on said display unit, wherein each of said first transmitter and said first receiver comprises a mobile device, said mobile device comprising a fourth storage device for recording private information of a passenger of said moving object and a control unit for controlling an input and an output of said fourth storage device, and said mobile phone company transmits a signal for limiting a readout of said fourth storage device to said mobile device in response to an accident occurrence notification from said moving object.

6. An emergency information notifying system between an emergency information notifying apparatus of a moving object and a base station installed at an emergency notification center, said emergency information notifying apparatus, comprising:

at least one image pick-up device for picking up images where a part of said moving object comes in sight a range of a view field of said image pick-up device, a first recording apparatus for recording video signals from said image pick-up device, said first recording apparatus having a function of iterative recording, a first transmitter for transmitting said video signals recorded in said first recording apparatus to a predetermined base station, a first control unit for controlling an operation of said first recording apparatus and said first transmitter, and a signal generator for generating a command signal on the basis of a shock to said moving object, wherein said first control unit stops the recording operation of said first recording apparatus after a lapse of a predetermined time from the timing when the shock is applied to said moving object on the basis of the signal from said signal generator; and said base station, comprising:

a second receiver for receiving said video signal from said first transmitter, a second transmitter for transmitting a command signal from said base station, a third storage device for recording at least said video signal among signals transmitted from said first transmitter, a display unit for monitoring said video signals, and a second control unit for controlling said second receiver, said second transmitter, and said display unit, wherein, said second control unit notifies information relating to an accident which has occurred at moving object to at least one of a police station, a fire station, a security company, a mobile phone company, a casualty insurance company, and a road service company, when said second receiver receives a command signal generated based on the shock to said moving object, wherein said emergency information notifying apparatus further comprises a first receiver for receiving said command signal from said base station and a GPS positioning system, wherein said first control unit superposes a position signal from said GPS positioning system on said video signals from said first recording apparatus and transmits them to said base station via said first transmitter, when a level of the signal from said signal generator exceeds a predetermined value, wherein said base station displays said video signals and said position signal transmitted from said emergency information notifying apparatus on said display unit, and wherein each of said first transmitter and said first receiver comprises a mobile device, said mobile device comprising a fourth storage device for recording private information of a passenger of said moving object and a control unit for controlling an input and an output of said fourth storage device, and said casualty insurance company transmits a control signal for controlling said fourth storage device to said mobile device in response to an accident occurrence notification from said moving object to acquire predetermined private information.

7. A method of notifying emergency information between a moving object and a base station, comprising the steps of:

picking-up images where a part of said moving object comes in a range of a view field of an image pick-up device;

iteratively recording video signals of said taken images to a recording apparatus for a predetermined period of time;

generating a command signal on the basis of a shock to said moving object;

stopping the iterative recording of said video signals after a lapse of a predetermined time from the timing when the shock is applied to said moving object on the basis of said command signal;

transmitting said video signals recorded for said predetermined period of time before and after the timing when the shock is applied to said moving object to said base station;

generating position information of said moving object from said global positioning system;

receiving a signal indicating a lighting state of a traffic signal arranged at a place where said moving object passes; and reading out said video signals from said recording apparatus on the basis of said command signal and superposing said first signal indicating the lighting state of the traffic signal and said position signal on said video signals and transmits them to said base station.

8. The method according to claim 7, wherein said moving object is an automobile, and further comprising the steps of:

recording information relating to at least one of a speed of the automobile, its steering angle, and an amount of its brake pedal operation; and transmitting said information relating to at least one of said speed of the automobile, said steering angle, and said amount of the brake pedal operation on the basis of said command signal.

9. A method of notifying emergency information between an emergency information notifying apparatus of a moving object and a base station installed at an emergency notification center, comprising the steps of:

in said emergency information notifying apparatus, picking-up images where a part of said moving object comes in a range of a view field of an image pick-up device;

iteratively recording video signals of said taken images to a recording apparatus for a predetermined period of time;

generating a first command signal on the basis of a shock to said moving object;

stopping the iterative recording of said video signals after a lapse of a predetermined time from the timing when the shock is applied to said moving object on the basis of said first command signal; and transmitting said video signals recorded in said recording apparatus to said base station;

in said base station, receiving said video signals from said emergency information notifying apparatus;

recording said received video signals and displaying them on a display unit; and notifying at least one of a police station, a fire station, a security company, a mobile phone company, a casualty insurance company, and a road service company information relating to an accident occurrence at said moving object, wherein said emergency information notifying apparatus comprises a receiver for receiving a second command signal from said base station and a global positioning apparatus and when a level of said first command signal exceeds a predetermined value, said emergency information notifying apparatus superposes a position signal from said global positioning apparatus on said video signals and transmits them to said base station, wherein said base station records said video signals transmitted from said emergency information notifying apparatus and said position signal and displays them on said display unit, and wherein said emergency information notifying apparatus includes a mobile device, said mobile device comprising a storage device for recording private information of a passenger of said moving object and a control unit for controlling an input and an output of said storage device, and said mobile phone company transmits a signal for limiting a readout of said storage device to said mobile device in response to an accident occurrence notification from said moving object.

10. A method of notifying emergency information between an emergency information notifying apparatus of a moving object and a base station installed at an emergency notification center, comprising the steps of:

in said emergency information notifying apparatus, picking-up images where a part of said moving object comes in a range of a view field of an image pick-up device;

iteratively recording video signals of said taken images to a recording apparatus for a predetermined period of time;

generating a first command signal on the basis of a shock to said moving object;

stopping the iterative recording of said video signals after a lapse of a predetermined time from the timing when the shock is applied to said moving object on the basis of said first command signal; and transmitting said video signals recorded in said recording apparatus to said base station in said base station, receiving said video signals from said emergency information notifying apparatus;

recording said received video signals and displaying them on a display unit; and notifying at least one of a police station, a fire station, a security company, a mobile phone company, a casualty insurance company, and a road service company information relating to an accident occurrence at said moving object, wherein said emergency information notifying apparatus comprises a receiver for receiving a second command signal from said base station and a global positioning apparatus and when a level of said first command signal exceeds a predetermined value, said emergency information notifying apparatus superposes a position signal from said global positioning apparatus on said video signals and transmits them to said base station, wherein said base station records said video signals transmitted from said emergency information notifying apparatus and said position signal and displays them on said display unit, and wherein said emergency information notifying apparatus includes a mobile device, said mobile device comprising a storage device for recording private information of a passenger of said moving object and a control unit for controlling an input and an output of said storage device, and said casualty insurance company transmits a signal for limiting the readout of said storage device to said mobile device in response to the accident occurrence notification from said moving object to acquire predetermined private information, in addition to said video signals information and the position information from said emergency information notifying apparatus.

* * * * *